(12) United States Patent
Androulakis et al.

(10) Patent No.: US 10,625,566 B2
(45) Date of Patent: Apr. 21, 2020

(54) SYSTEMS AND METHODS FOR CONTROLLING THERMAL CONDITIONING OF VEHICLE REGIONS

(71) Applicant: Gentherm Incorporated, Northville, MI (US)

(72) Inventors: Ioannis Androulakis, Azusa, CA (US); Scott Wolas, Newbury Park, CA (US)

(73) Assignee: Gentherm Incorporated, Northville, MI (US)

( * ) Notice: Subject to any disclaimer, the term of this patent is extended or adjusted under 35 U.S.C. 154(b) by 0 days.

(21) Appl. No.: 15/765,451

(22) PCT Filed: Jun. 21, 2016

(86) PCT No.: PCT/US2016/038566
§ 371 (c)(1),
(2) Date: Apr. 2, 2018

(87) PCT Pub. No.: WO2017/065847
PCT Pub. Date: Apr. 20, 2017

(65) Prior Publication Data
US 2018/0251008 A1 Sep. 6, 2018

Related U.S. Application Data

(60) Provisional application No. 62/241,514, filed on Oct. 14, 2015.

(51) Int. Cl.
*B60H 1/00* (2006.01)
*B60N 2/56* (2006.01)
*B60N 3/10* (2006.01)

(52) U.S. Cl.
CPC ..... *B60H 1/00742* (2013.01); *B60H 1/00271* (2013.01); *B60H 1/00285* (2013.01);
(Continued)

(58) Field of Classification Search
CPC ............ B60H 1/00742; B60H 1/00271; B60H 1/00285; B60H 1/00885; B60H 2001/00307
See application file for complete search history.

(56) References Cited

U.S. PATENT DOCUMENTS

| 413,136 A | 10/1889 | Dewey |
| 2,118,636 A | 5/1938 | Alexander et al. |

(Continued)

FOREIGN PATENT DOCUMENTS

| CN | 1094500 | 11/1994 |
| CN | 1158655 | 9/1997 |

(Continued)

OTHER PUBLICATIONS

U.S. Appl. No. 15/694,467, filed Sep. 1, 2017, Adldinger et al.
(Continued)

*Primary Examiner* — Ramsey Refai
(74) *Attorney, Agent, or Firm* — Knobbe Martens Olson & Bear LLP

(57) ABSTRACT

Systems and methods for controlling a thermal conditioning system of a vehicle are disclosed. The system services multiple components in a vehicle, including at least one passenger component, such as a first seat and/or a second seat, and at least one auxiliary component, such as a storage enclosure, a first cup holder and/or a second cup holder. The system uses a vapor compression system as the thermal energy source. The control methods prioritize thermal conditioning of one or more of the various components based on one or more thermal criterion and apply component-specific control routines to the thermal conditioning based on that prioritization.

20 Claims, 14 Drawing Sheets

(52) U.S. Cl.
CPC ..... *B60H 1/00295* (2019.05); *B60H 1/00885*
(2013.01); *B60N 2/5621* (2013.01); ***B60N
2/5678* (2013.01); *B60N 3/104*** (2013.01);
*B60H 2001/00307* (2013.01)

(56) References Cited

U.S. PATENT DOCUMENTS

| | | |
|---|---|---|
| 2,362,259 A | 11/1944 | Findley |
| 2,363,168 A | 11/1944 | Findley |
| 2,912,832 A | 11/1959 | Clark |
| 2,944,404 A | 7/1960 | Fritts |
| 2,949,014 A | 8/1960 | Belton, Jr. et al. |
| 2,984,077 A | 5/1961 | Gaskill |
| 2,997,514 A | 8/1961 | Roeder, Jr. |
| 3,040,538 A | 6/1962 | Alsing |
| 3,085,405 A | 4/1963 | Frantti |
| 3,125,860 A | 3/1964 | Reich |
| 3,136,577 A | 6/1964 | Richard |
| 3,138,934 A | 6/1964 | Roane |
| 3,165,900 A | 1/1965 | Huntington |
| 3,196,620 A | 7/1965 | Elfving et al. |
| 3,212,275 A | 10/1965 | Tillman, Jr. |
| 3,213,630 A | 10/1965 | Mole |
| 3,236,056 A | 2/1966 | Phillips et al. |
| 3,252,504 A | 5/1966 | Newton |
| 3,391,727 A | 7/1968 | Topouszian |
| 3,599,437 A | 8/1971 | Panas |
| 3,779,307 A | 12/1973 | Weiss et al. |
| 3,817,043 A | 6/1974 | Zoleta |
| 3,885,126 A | 5/1975 | Sugiyama et al. |
| 4,051,691 A | 10/1977 | Dawkins |
| 4,065,936 A | 1/1978 | Fenton et al. |
| 4,193,271 A | 3/1980 | Honigsbaum |
| 4,280,330 A | 7/1981 | Harris et al. |
| 4,402,188 A | 9/1983 | Skala |
| 4,459,466 A | 7/1984 | Nakagawa et al. |
| 4,565,072 A | 1/1986 | Fujiwara et al. |
| 4,570,450 A | 2/1986 | Takemi et al. |
| 4,572,430 A | 2/1986 | Takagi et al. |
| 4,637,220 A | 1/1987 | Sakano |
| 4,658,599 A | 4/1987 | Kajiwara |
| 4,665,707 A | 5/1987 | Hamilton |
| 4,665,971 A | 5/1987 | Sakurai |
| 4,707,995 A | 11/1987 | Assaf |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,922,721 A | 5/1990 | Robertson et al. |
| 4,922,998 A | 5/1990 | Carr |
| 4,923,248 A | 5/1990 | Feher |
| 4,947,735 A | 8/1990 | Guillemin |
| 4,988,847 A | 1/1991 | Argos et al. |
| 5,029,446 A | 7/1991 | Suzuki |
| 5,042,566 A | 8/1991 | Hildebrand |
| 5,092,129 A | 3/1992 | Bayes et al. |
| 5,097,829 A | 3/1992 | Quisenberry |
| 5,099,654 A | 3/1992 | Baruschke et al. |
| 5,111,664 A | 5/1992 | Yang |
| 5,119,640 A | 6/1992 | Conrad |
| 5,138,851 A | 8/1992 | Mardikian |
| 5,167,129 A | 12/1992 | Akasaka |
| 5,193,347 A | 3/1993 | Apisdorf |
| 5,198,930 A | 3/1993 | Muratomi |
| 5,269,145 A | 12/1993 | Krause et al. |
| 5,269,146 A | 12/1993 | Kerner |
| 5,279,459 A | 1/1994 | Single, II |
| 5,291,960 A | 3/1994 | Brandenburg et al. |
| 5,300,197 A | 4/1994 | Mitani et al. |
| 5,303,771 A | 4/1994 | Des Champs |
| 5,316,078 A | 5/1994 | Cesaroni |
| 5,385,020 A | 1/1995 | Gwilliam et al. |
| 5,386,823 A | 2/1995 | Chen |
| 5,399,120 A | 3/1995 | Burns et al. |
| 5,407,130 A | 4/1995 | Uyeki et al. |
| 5,431,021 A | 7/1995 | Gwilliam et al. |
| 5,448,891 A | 9/1995 | Nakagiri et al. |
| 5,450,894 A | 9/1995 | Inoue et al. |
| 5,483,807 A | 1/1996 | Abersfelder et al. |
| 5,499,504 A | 3/1996 | Mill et al. |
| 5,549,153 A | 8/1996 | Baruschke et al. |
| 5,556,028 A | 9/1996 | Khelifa |
| 5,564,276 A | 10/1996 | Abadilla et al. |
| 5,590,532 A | 1/1997 | Bachman |
| 5,605,047 A | 2/1997 | Park et al. |
| 5,626,021 A | 5/1997 | Karunasiri et al. |
| 5,641,016 A | 6/1997 | Isaji |
| 5,653,111 A | 8/1997 | Attey et al. |
| 5,673,964 A | 10/1997 | Roan et al. |
| 5,694,770 A | 12/1997 | Bruck et al. |
| 5,711,155 A | 1/1998 | DeVilbiss et al. |
| 5,715,695 A | 2/1998 | Lord |
| 5,722,249 A | 3/1998 | Miller, Jr. |
| 5,725,048 A | 3/1998 | Burk et al. |
| 5,740,681 A | 4/1998 | Karl |
| 5,802,856 A | 9/1998 | Schaper et al. |
| 5,816,236 A | 10/1998 | Moroi et al. |
| 5,878,589 A | 3/1999 | Tanaka et al. |
| 5,878,950 A | 3/1999 | Faccone et al. |
| 5,890,371 A | 4/1999 | Rajasubramanian et al. |
| 5,899,086 A | 5/1999 | Noda et al. |
| 5,901,572 A | 5/1999 | Peiffer et al. |
| RE36,242 E | 6/1999 | Apisdorf |
| 5,910,159 A | 6/1999 | Matsuo et al. |
| 5,918,930 A | 7/1999 | Kawai et al. |
| 5,921,088 A | 7/1999 | Imaizumi et al. |
| 5,921,314 A | 7/1999 | Schuller et al. |
| 5,955,772 A | 9/1999 | Shakouri et al. |
| 5,964,092 A | 10/1999 | Tozuka et al. |
| 5,975,856 A | 11/1999 | Welle |
| 5,977,785 A | 11/1999 | Burward-Hoy |
| 6,002,105 A | 12/1999 | Tamada |
| 6,016,662 A | 1/2000 | Tanaka et al. |
| 6,047,770 A | 4/2000 | Suzuki et al. |
| 6,059,198 A | 5/2000 | Moroi et al. |
| 6,105,659 A | 8/2000 | Pocol et al. |
| 6,119,463 A | 9/2000 | Bell |
| 6,138,749 A | 10/2000 | Kawai et al. |
| 6,158,225 A | 12/2000 | Muto et al. |
| 6,205,802 B1 | 3/2001 | Drucker et al. |
| 6,205,805 B1 | 3/2001 | Takahashi et al. |
| 6,213,198 B1 | 4/2001 | Shikata et al. |
| 6,223,539 B1 | 5/2001 | Bell |
| 6,247,530 B1 | 6/2001 | Mochizuki et al. |
| 6,254,179 B1 | 7/2001 | Kortum et al. |
| 6,270,015 B1 | 8/2001 | Hirota |
| 6,276,166 B1 | 8/2001 | Sarkisian |
| 6,293,107 B1 | 9/2001 | Kitagawa |
| 6,324,860 B1 | 12/2001 | Maeda et al. |
| 6,334,311 B1 | 1/2002 | Kim et al. |
| 6,346,668 B1 | 2/2002 | McGrew |
| 6,366,832 B2 | 4/2002 | Lomonaco et al. |
| 6,393,842 B2 | 5/2002 | Kim |
| 6,401,462 B1 | 6/2002 | Bielinski |
| 6,412,287 B1 | 7/2002 | Hughes et al. |
| 6,431,257 B1 | 8/2002 | Sano et al. |
| 6,435,273 B1 | 8/2002 | Futernik |
| 6,438,964 B1 | 8/2002 | Giblin |
| 6,453,993 B1 | 9/2002 | Bujak, Jr. |
| 6,457,324 B2 | 10/2002 | Zeigler et al. |
| 6,464,027 B1 | 10/2002 | Dage et al. |
| 6,474,081 B1 | 11/2002 | Feuerecker |
| 6,481,213 B2 | 11/2002 | Carr et al. |
| 6,505,886 B2 | 1/2003 | Gielda et al. |
| 6,510,696 B2 | 1/2003 | Guttman et al. |
| 6,530,842 B1 | 3/2003 | Wells et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,560,968 B2 | 5/2003 | Ko |
| 6,568,205 B2 | 5/2003 | Bureau et al. |
| 6,569,550 B2 | 5/2003 | Khelifa |
| RE38,128 E | 6/2003 | Gallup et al. |
| 6,598,403 B1 | 7/2003 | Ghoshal |

(56) References Cited

U.S. PATENT DOCUMENTS

| | | |
|---|---|---|
| 6,606,877 B2 | 8/2003 | Tomita et al. |
| 6,607,142 B1 | 8/2003 | Boggs et al. |
| 6,625,990 B2 | 9/2003 | Bell |
| 6,640,889 B1 | 11/2003 | Harte et al. |
| 6,682,844 B2 | 1/2004 | Gene |
| 6,715,307 B2 | 4/2004 | Hatakeyama et al. |
| 6,722,139 B2 | 4/2004 | Moon et al. |
| 6,732,534 B2 | 5/2004 | Spry |
| 6,779,348 B2 | 8/2004 | Taban |
| 6,793,016 B2 | 9/2004 | Aoki et al. |
| 6,807,811 B2 | 10/2004 | Lee |
| 6,812,395 B2 | 11/2004 | Bell |
| 6,854,286 B2 | 2/2005 | Bureau et al. |
| 6,862,892 B1 | 3/2005 | Meyer et al. |
| 6,883,602 B2 | 4/2005 | Drucker |
| 6,886,351 B2 | 5/2005 | Palfy et al. |
| 6,886,356 B2 | 5/2005 | Kubo et al. |
| 6,896,047 B2 | 5/2005 | Currle et al. |
| 6,907,739 B2 | 6/2005 | Bell |
| 6,910,345 B2 | 6/2005 | Horstmann et al. |
| 6,915,641 B2 | 7/2005 | Harvie |
| 6,951,114 B2 | 10/2005 | Grisham et al. |
| 6,959,555 B2 | 11/2005 | Bell |
| 6,962,195 B2 | 11/2005 | Smith et al. |
| 6,973,799 B2 | 12/2005 | Kuehl et al. |
| 7,007,491 B2 | 3/2006 | Grimm et al. |
| 7,063,139 B2 | 6/2006 | Horn et al. |
| 7,073,338 B2 | 7/2006 | Harwood et al. |
| 7,074,122 B2 | 7/2006 | Haupt et al. |
| 7,089,756 B2 | 8/2006 | Hu |
| 7,111,465 B2 | 9/2006 | Bell |
| 7,134,288 B2 | 11/2006 | Crippen et al. |
| 7,168,398 B2 | 1/2007 | Ap et al. |
| 7,171,955 B2 | 2/2007 | Perkins |
| 7,231,772 B2 | 6/2007 | Bell |
| 7,238,101 B2 | 7/2007 | Kadle et al. |
| 7,240,725 B2 | 7/2007 | Horn et al. |
| 7,246,496 B2 | 7/2007 | Goenka et al. |
| 7,263,835 B2 | 9/2007 | Lin |
| 7,264,046 B1 | 9/2007 | Futernik et al. |
| 7,272,936 B2 | 9/2007 | Feher |
| 7,290,400 B2 | 11/2007 | Heberle et al. |
| 7,310,953 B2 | 12/2007 | Pham et al. |
| 7,338,117 B2 | 3/2008 | Iqbal et al. |
| 7,350,368 B2 | 4/2008 | Heberle et al. |
| 7,363,766 B2 | 4/2008 | Eisenhour |
| 7,380,586 B2 | 6/2008 | Gawthrop |
| 7,416,138 B2 | 8/2008 | Ellison et al. |
| 7,426,835 B2 | 9/2008 | Bell |
| 7,530,390 B2 | 5/2009 | Feuerecker et al. |
| 7,533,535 B2 | 5/2009 | Kadle et al. |
| 7,578,341 B2 | 8/2009 | Ichishi et al. |
| 7,581,584 B2 | 9/2009 | Yoneno et al. |
| 7,587,901 B2 | 9/2009 | Petrovski |
| 7,587,902 B2 | 9/2009 | Bell |
| 7,603,205 B2 | 10/2009 | Barry et al. |
| 7,650,757 B2 | 1/2010 | Bhatti |
| 7,743,614 B2 | 6/2010 | Goenka et al. |
| 7,765,824 B2 | 8/2010 | Wong et al. |
| 7,779,639 B2 | 8/2010 | Goenka |
| 7,784,289 B2 | 8/2010 | Scherer et al. |
| 7,788,933 B2 | 9/2010 | Goenka |
| 7,828,050 B2 | 11/2010 | Esaki |
| 7,870,892 B2 | 1/2011 | Gawthrop |
| 7,905,278 B2 | 3/2011 | Sato et al. |
| 7,932,460 B2 | 4/2011 | Bell |
| 7,937,952 B2 | 5/2011 | Johnson |
| 7,942,010 B2 | 5/2011 | Bell |
| 7,946,120 B2 | 5/2011 | Bell |
| 7,950,735 B2 | 5/2011 | Major et al. |
| 8,015,835 B2 | 9/2011 | Lee et al. |
| 8,039,726 B2 | 10/2011 | Zhang et al. |
| 8,069,674 B2 | 12/2011 | Bell |
| 8,079,223 B2 | 12/2011 | Bell |
| 8,082,752 B2 | 12/2011 | Liu et al. |
| 8,104,294 B2 | 1/2012 | Reeve |
| 8,104,295 B2 | 1/2012 | Lofy |
| 8,136,874 B2 | 3/2012 | Negrini et al. |
| 8,261,868 B2 | 9/2012 | Goenka et al. |
| 8,359,871 B2 | 1/2013 | Woods et al. |
| 8,408,012 B2 | 4/2013 | Goenka et al. |
| 8,438,863 B2 | 5/2013 | Lofy |
| 8,490,412 B2 | 7/2013 | Bell et al. |
| 8,495,884 B2 | 7/2013 | Bell et al. |
| 8,613,200 B2 | 12/2013 | LaGrandeur et al. |
| 8,631,659 B2 | 1/2014 | Goenka |
| 8,640,466 B2 | 2/2014 | Bell et al. |
| 8,678,492 B2 | 3/2014 | Benton |
| 8,722,222 B2 | 5/2014 | Kossakovski et al. |
| 8,733,126 B2 | 5/2014 | Sekiya et al. |
| 8,783,397 B2 | 7/2014 | Goenka et al. |
| 8,784,166 B2 | 7/2014 | Mazzocco et al. |
| 8,806,882 B2 | 8/2014 | Bennion et al. |
| 8,839,632 B2 | 9/2014 | Goenka et al. |
| 8,915,091 B2 | 12/2014 | Goenka |
| 8,955,578 B2 | 2/2015 | Kwon et al. |
| 8,974,942 B2 | 3/2015 | Bell et al. |
| 9,038,400 B2 | 5/2015 | Goenka |
| 9,103,573 B2 | 8/2015 | Goenka |
| 9,310,112 B2 | 4/2016 | Bell et al. |
| 9,365,090 B2 | 6/2016 | Gawthrop et al. |
| 9,366,461 B2 | 6/2016 | Bell et al. |
| 9,445,524 B2 | 9/2016 | Lofy et al. |
| 9,447,994 B2 | 9/2016 | Barnhart et al. |
| 9,451,723 B2 | 9/2016 | Lofy et al. |
| 9,555,686 B2 | 1/2017 | Ranalli et al. |
| 9,719,701 B2 | 8/2017 | Bell et al. |
| 9,861,006 B2 | 1/2018 | Lofy et al. |
| 9,863,672 B2 | 1/2018 | Goenka |
| 10,106,011 B2 | 10/2018 | Goenka |
| 10,219,407 B2 | 2/2019 | Lofy et al. |
| 2002/0014330 A1 | 2/2002 | Guyonvarch |
| 2002/0173264 A1 | 11/2002 | Ottman et al. |
| 2003/0140636 A1 | 7/2003 | Van Winkle |
| 2003/0159455 A1 | 8/2003 | Aikawa et al. |
| 2004/0025516 A1 | 2/2004 | Van Winkle |
| 2004/0098991 A1 | 5/2004 | Heyes |
| 2004/0163395 A1 | 8/2004 | Ichishi et al. |
| 2004/0237541 A1 | 12/2004 | Murphy |
| 2005/0061497 A1 | 3/2005 | Amaral |
| 2005/0087333 A1 | 4/2005 | Horn et al. |
| 2005/0139692 A1 | 6/2005 | Yamamoto |
| 2005/0161193 A1 | 7/2005 | McKenzie et al. |
| 2005/0204768 A1 | 9/2005 | Di Vito et al. |
| 2005/0229629 A1 | 10/2005 | Burk et al. |
| 2005/0257545 A1 | 11/2005 | Ziehr et al. |
| 2005/0278863 A1 | 12/2005 | Bahash et al. |
| 2006/0000592 A1 | 1/2006 | Bosquet et al. |
| 2006/0005548 A1 | 1/2006 | Ruckstuhl |
| 2006/0011152 A1 | 1/2006 | Hayes |
| 2006/0016203 A1 | 1/2006 | Hayashi |
| 2006/0059933 A1 | 3/2006 | Axakov et al. |
| 2006/0075758 A1 | 4/2006 | Rice et al. |
| 2006/0102335 A1 | 5/2006 | Fujiki et al. |
| 2006/0137359 A1 | 6/2006 | Ghoshal |
| 2006/0137360 A1 | 6/2006 | Ghoshal |
| 2006/0137853 A1 | 6/2006 | Haller et al. |
| 2006/0150657 A1 | 7/2006 | Spurgeon et al. |
| 2006/0174633 A1 | 8/2006 | Beckley |
| 2006/0188418 A1 | 8/2006 | Park et al. |
| 2006/0254284 A1 | 11/2006 | Ito et al. |
| 2007/0000255 A1 | 1/2007 | Elliot et al. |
| 2007/0034356 A1 | 2/2007 | Kenny et al. |
| 2007/0056295 A1 | 3/2007 | De Vilbiss |
| 2007/0101737 A1 | 5/2007 | Akei et al. |
| 2007/0157630 A1 | 7/2007 | Kadle et al. |
| 2007/0272290 A1 | 11/2007 | Sims et al. |
| 2008/0223064 A1 | 9/2008 | Feuerecker et al. |
| 2009/0020620 A1 | 1/2009 | Douarre |
| 2009/0032080 A1 | 2/2009 | Kawauchi et al. |
| 2009/0118869 A1 | 5/2009 | Cauchy et al. |
| 2010/0031987 A1 | 2/2010 | Bell et al. |
| 2010/0101239 A1 | 4/2010 | LaGrandeur et al. |
| 2010/0155018 A1 | 6/2010 | Goenka et al. |

(56) References Cited

U.S. PATENT DOCUMENTS

| | | |
|---|---|---|
| 2010/0293966 A1 | 11/2010 | Yokomachi et al. |
| 2011/0061403 A1 | 3/2011 | Jun et al. |
| 2011/0107773 A1 | 5/2011 | Gawthrop |
| 2011/0114739 A1 | 5/2011 | Misumi et al. |
| 2011/0120146 A1 | 5/2011 | Ota et al. |
| 2011/0139397 A1 | 6/2011 | Haussmann |
| 2011/0164652 A1 | 7/2011 | ReFalo et al. |
| 2011/0165830 A1 | 7/2011 | Smith |
| 2011/0284202 A1 | 11/2011 | Hirai et al. |
| 2012/0202413 A1 | 8/2012 | Kawashima |
| 2012/0266608 A1 | 10/2012 | Kadle et al. |
| 2013/0068440 A1 | 3/2013 | Kamiyama |
| 2013/0192272 A1 | 8/2013 | Ranalli et al. |
| 2013/0206382 A1 | 8/2013 | Ichishi et al. |
| 2013/0239592 A1 | 9/2013 | Lofy |
| 2013/0299128 A1 | 11/2013 | Bergamini |
| 2013/0317728 A1 | 11/2013 | Hall et al. |
| 2014/0173946 A1 | 6/2014 | Gerrits et al. |
| 2014/0213168 A1 | 7/2014 | Goenka et al. |
| 2014/0250918 A1 | 9/2014 | Lofy |
| 2014/0338366 A1 | 11/2014 | Adldinger et al. |
| 2014/0338882 A1 | 11/2014 | Rollinson et al. |
| 2015/0298524 A1 | 10/2015 | Goenka |
| 2015/0375597 A1 | 12/2015 | Callahan |
| 2016/0355067 A1 | 12/2016 | Barnhart et al. |
| 2016/0361967 A1 | 12/2016 | Gawthrop |
| 2016/0361968 A1 | 12/2016 | Bell et al. |
| 2017/0164513 A1 | 6/2017 | Lofy et al. |
| 2017/0164515 A1 | 6/2017 | Lofy et al. |
| 2017/0259643 A1 | 9/2017 | Ranalli et al. |
| 2017/0328612 A1 | 11/2017 | Lofy |
| 2017/0361676 A1 | 12/2017 | Androulakis et al. |
| 2018/0001734 A1* | 1/2018 | Faust ................ B60H 1/00064 |
| 2018/0195777 A1 | 7/2018 | Goenka |
| 2018/0199464 A1 | 7/2018 | Lofy et al. |
| 2019/0152292 A1 | 5/2019 | Goenka |
| 2019/0261535 A1 | 8/2019 | Lofy et al. |

FOREIGN PATENT DOCUMENTS

| | | |
|---|---|---|
| CN | 1195090 | 10/1998 |
| CN | 2813357 | 9/2006 |
| CN | 2827781 | 10/2006 |
| CN | 101508236 | 8/2009 |
| CN | 101720414 | 6/2010 |
| CN | 102328569 | 1/2012 |
| CN | 202174959 | 3/2012 |
| CN | 202200804 | 4/2012 |
| CN | 102555870 | 7/2012 |
| CN | 103438629 | 12/2013 |
| DE | 1 301 454 | 8/1969 |
| DE | 2 220 009 | 11/1973 |
| DE | 2 319 155 | 10/1974 |
| DE | 4 238 364 | 5/1994 |
| DE | 196 45 544 | 5/1998 |
| DE | 197 30 678 | 1/1999 |
| DE | 299 04 238 | 6/1999 |
| DE | 198 29 440 | 1/2000 |
| DE | 199 51 224 | 5/2001 |
| DE | 201 05 487 | 10/2001 |
| DE | 102 37 420 | 9/2003 |
| DE | 103 37 889 | 12/2004 |
| DE | 20 2005 013 039 | 11/2005 |
| DE | 10 2006 001 304 | 7/2007 |
| DE | 10 2010 052 019 | 6/2011 |
| DE | 10 2009 003 737 | 12/2012 |
| EP | 0 206 151 | 12/1986 |
| EP | 0 389 407 | 9/1990 |
| EP | 0 545 021 | 6/1993 |
| EP | 0 791 497 | 8/1997 |
| EP | 0 834 421 | 4/1998 |
| EP | 1 038 701 | 9/2000 |
| EP | 1 462 281 | 9/2004 |
| EP | 1 088 696 | 11/2005 |
| EP | 1 932 695 | 6/2008 |
| FR | 2 419 479 | 10/1979 |
| FR | 2 806 666 | 9/2001 |
| FR | 2 907 064 | 4/2008 |
| GB | 231 192 A | 5/1926 |
| GB | 1 040 485 | 8/1966 |
| GB | 2 267 338 | 12/1993 |
| GB | 2 278 432 | 11/1994 |
| GB | 2 333 352 | 7/1999 |
| GB | 2 440 312 | 1/2008 |
| JP | 39-027735 | 12/1964 |
| JP | 56-018231 | 2/1981 |
| JP | 62-191212 | 8/1987 |
| JP | 01-131830 | 5/1989 |
| JP | 01-200122 | 8/1989 |
| JP | 01-281344 | 11/1989 |
| JP | 04-103925 | 4/1992 |
| JP | 04-165234 | 6/1992 |
| JP | 05-037521 U | 5/1993 |
| JP | 05-278451 | 10/1993 |
| JP | 06-024235 | 2/1994 |
| JP | 06-135218 | 5/1994 |
| JP | 07-089334 | 4/1995 |
| JP | 07-054189 | 6/1995 |
| JP | 07-253224 | 10/1995 |
| JP | 08-197937 | 8/1996 |
| JP | 08-316388 | 11/1996 |
| JP | 09-042801 | 2/1997 |
| JP | 09-092761 | 4/1997 |
| JP | 09-254630 | 9/1997 |
| JP | 09-276076 | 10/1997 |
| JP | 10-035268 | 2/1998 |
| JP | 11-042933 | 2/1999 |
| JP | 11-129735 | 5/1999 |
| JP | 11-301254 | 11/1999 |
| JP | 11-342731 | 12/1999 |
| JP | 2000-130883 | 5/2000 |
| JP | 2000-142095 | 5/2000 |
| JP | 2000-161721 | 6/2000 |
| JP | 2000-185542 | 7/2000 |
| JP | 2000-274788 | 10/2000 |
| JP | 2000-274871 | 10/2000 |
| JP | 2000-274874 | 10/2000 |
| JP | 2000-289451 | 10/2000 |
| JP | 2000-318434 | 11/2000 |
| JP | 2000-335230 | 12/2000 |
| JP | 2001-206053 | 7/2001 |
| JP | 2001-227840 | 8/2001 |
| JP | 2002-13758 | 1/2002 |
| JP | 2002-059736 | 2/2002 |
| JP | 2002-232028 | 8/2002 |
| JP | 2003-237357 | 8/2003 |
| JP | 2004-050874 | 2/2004 |
| JP | 2005-212564 | 8/2005 |
| JP | 2005-219700 | 8/2005 |
| JP | 2005-269738 | 9/2005 |
| JP | 2005-302851 | 10/2005 |
| JP | 2006-001530 | 1/2006 |
| JP | 2006-015965 | 1/2006 |
| JP | 2006-168463 | 6/2006 |
| JP | 2007-161110 | 6/2007 |
| JP | 2007-253947 | 10/2007 |
| JP | 2008-094366 | 4/2008 |
| JP | 2010-125997 | 6/2010 |
| JP | 2010-240045 | 10/2010 |
| JP | 2011-001048 | 1/2011 |
| JP | 2011-131871 | 7/2011 |
| JP | 2011-152855 | 8/2011 |
| JP | 2012-011928 | 1/2012 |
| KR | 1997-0000845 | 1/1997 |
| KR | 1998-0022458 | 7/1998 |
| KR | 1998-0040187 | 9/1998 |
| KR | 10-0189462 | 6/1999 |
| KR | 2001-111646 | 12/2001 |
| KR | 10-2002-0057600 | 7/2002 |
| KR | 10-2003-0082589 | 10/2003 |
| KR | 10-0503239 | 7/2005 |
| KR | 10 2007 0077546 | 7/2007 |
| KR | 10-0756937 | 9/2007 |
| KR | 10 2008 0010646 | 1/2008 |

(56) References Cited

FOREIGN PATENT DOCUMENTS

| | | |
|---|---|---|
| KR | 2008-0008875 | 1/2008 |
| KR | 10-2011-0013876 | 2/2011 |
| KR | 2011-0011230 | 12/2011 |
| KR | 2012-0041861 | 5/2012 |
| KR | 2012-0088042 | 8/2012 |
| LU | 66619 | 2/1973 |
| SE | 337 227 | 5/1971 |
| SU | 184886 | 7/1966 |
| SU | 1196627 | 12/1985 |
| WO | WO 94/020801 | 9/1994 |
| WO | WO 95/01500 | 1/1995 |
| WO | WO 95/014899 | 6/1995 |
| WO | WO 96/05475 | 2/1996 |
| WO | WO 97/47930 | 12/1997 |
| WO | WO 98/15420 | 4/1998 |
| WO | WO 99/09360 | 2/1999 |
| WO | WO 99/10191 | 3/1999 |
| WO | WO 99/58907 | 11/1999 |
| WO | WO 00/12948 | 3/2000 |
| WO | WO 02/00458 | 1/2002 |
| WO | WO 03/014634 | 2/2003 |
| WO | WO 2004/027328 | 4/2004 |
| WO | WO 2005/023571 | 3/2005 |
| WO | WO 2005/063567 | 7/2005 |
| WO | WO 2006/037178 | 4/2006 |
| WO | WO 2006/064432 | 6/2006 |
| WO | WO 2007/001289 | 1/2007 |
| WO | WO 2007/021273 | 2/2007 |
| WO | WO 2007/097059 | 8/2007 |
| WO | WO 2008/013946 | 1/2008 |
| WO | WO 2008/072251 | 6/2008 |
| WO | WO 2008/091293 | 7/2008 |
| WO | WO 2008/123663 | 10/2008 |
| WO | WO 2008/147305 | 12/2008 |
| WO | WO 2010/008158 | 1/2010 |
| WO | WO 2010/135363 | 11/2010 |
| WO | WO 2013/151903 | 10/2013 |
| WO | WO 2014/065702 | 5/2014 |
| WO | WO 2016/100697 | 6/2016 |
| WO | WO 2017/065847 | 4/2017 |

OTHER PUBLICATIONS

U.S. Appl. No. 15/842,563, filed Dec. 14, 2017, Goenka.
U.S. Appl. No. 15/851,591, filed Dec. 21, 2017, Lofy et al.
Bell, L.E., "Alternate Thermoelectric Thermodynamic Cycles with Improved Power Generation Efficiencies" Thermoelectrics, 2003 Twenty-Second International Conference on—ICT LA Grande Motte, France Aug. 17-21, 2003, Piscataway, NJ, USA, IEEE, Aug. 17, 2003 (Aug. 17, 2003), pp. 558-562, XP010697375, ISBN: 0-7803-8301-X.
Diller, R. W., et al.: "Experimental results confirming improved performance of systems using thermal isolation" Thermoelectrics, 2002. Proceedings ICT '02. Twenty-First International Conference on Aug. 25-29, 2002, Piscataway, NJ USA, IEEE, Aug. 25, 2002 (Aug. 25, 2002), pp. 548-550, XP010637541 ISBN: 0-7803-7683-8.
Heckenberger, Thomas, "Li-on Battery Cooling," BEHR Power Point Presentation, Technical Press Day, Stuttgart, May 20, 2009, 13 pages.
International Search Report and Written Opinion re PCT Application No. PCT/US2016/038566, dated Sep. 29, 2016.
International Preliminary Report on Patentability re PCT Application No. PCT/US2016/038566, dated Apr. 26, 2018.
Japanese Office Action re JP Patent Application No. 2006-305938, dated Jul. 21, 2009.
Lofy, John et al., "Thermoelectrics for Environmental Control Automobiles," 21st International Conference on Thermoelectronics, 2002, p. 471-476.
Stockholm, John G.: "Large-Scale Cooling: Integrated Thermoelectric Element Technology," CRC Handbook of Thermoelectrics, Chapter 53, pp. 657-666. 0-8493-0146, Jul. 1995.
U.S. Appl. No. 16/485,765, filed Aug. 13, 2019, Pine et al.

* cited by examiner

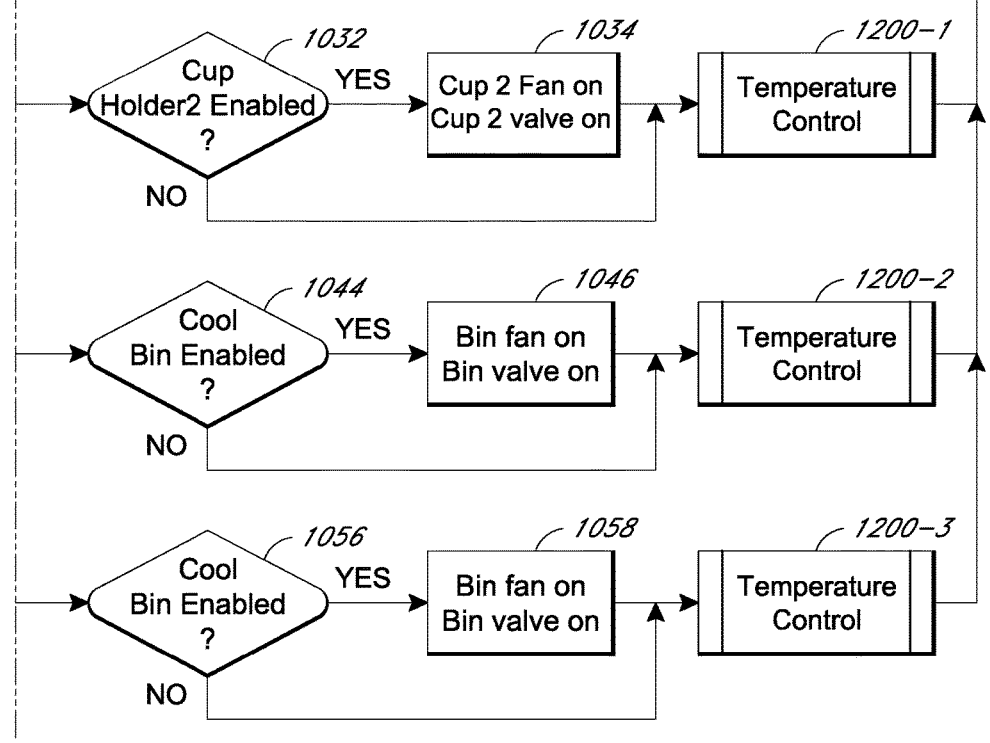

SYSTEMS AND METHODS FOR CONTROLLING THERMAL CONDITIONING OF VEHICLE REGIONS

CROSS-REFERENCE TO RELATED APPLICATIONS

This application is a U.S. National Phase Application of PCT International Application Number PCT/US2016/038566, filed on Jun. 21, 2016, designating the United States of America and published in the English language, which claims the benefit of priority to U.S. Provisional Application No. 62/241,514, filed Oct. 14, 2015, entitled SYSTEMS AND METHODS FOR CONTROLLING THERMAL CONDITIONING OF VEHICLE REGIONS. The disclosures of the above-referenced applications are hereby expressly incorporated by reference in their entireties for all purposes and form a part of this specification.

BACKGROUND

Field

This disclosure relates generally to control of thermal conditioning systems, in particular to systems and methods for controlling thermal conditioning systems for thermally conditioning one or more vehicle regions and/or components.

Description of the Related Art

Thermal conditioning, i.e. heating and/or cooling, of components in vehicles is desirable in many situations. For example, in cold climates, it is desirable to have a warmed seat. In hot climates, it is desirable to have cup holders that keep drinks cool. Typical approaches to thermally conditioning components within a vehicle use the vehicle's radiator to provide thermal conditioning to components in the vehicle, use thermal electric devices that are dedicated to a target device for conditioning, or use large compressors that are dedicated to the component they are conditioning.

Many of these and other thermal conditioning systems have control systems. However, the control systems are not efficient. Further, the control techniques for existing thermal conditioning systems are less than optimal for more advanced thermal conditioning systems that operate on different principles and/or use different setups from existing thermal conditioning systems.

SUMMARY

There is a need for controlling systems and methods for thermally conditioning vehicle components that overcome the drawbacks of conventional control approaches. Several embodiments of a control system and related methods of use for various thermal conditioning systems to service various components in a vehicle are described herein. The control systems and methods described herein may be used to control various thermal systems as well as various thermal methods associated with those thermal systems. Therefore, it is understood that discussion of using the disclosed control systems and methods for controlling a thermal system apply equally to controlling the thermal methods associated with those thermal systems.

The thermal system being controlled by the control system and/or control methods disclosed herein may have many different embodiments. For example, the thermally conditioned components may be one or more passenger components, such as seats, one or more auxiliary components, for example thermal convenience components, such as a storage bin, a first cup holder, a second cup holder etc., and/or other components in a vehicle. The components may be convective components, that are conditioned with thermal convection, and/or conductive components, that are conditioned with thermal conduction. The system being controlled may include a thermal energy source in thermal communication with a thermal bus that has a single main line for circulating a thermal medium, which may be a liquid or gas. The thermal medium may be heated or cooled by the thermal energy source, which may be a vapor compression system that has a miniature compressor, an evaporator and a condenser. In some embodiments, the thermal systems and/or methods being controlled may have the same or similar features as other thermal systems and methods, such as those described in, for example, U.S. Provisional Application No. 62/094,852, filed on Dec. 29, 2014, entitled "Thermal Conditioning Systems and Methods for Vehicle Regions," and PCT International Application No. PCT/US2015/066432, filed on Dec. 17, 2015, entitled "Thermal Conditioning Systems and Methods for Vehicle Regions," the entire contents of each which is hereby incorporated by reference for all purposes. Some example embodiments of the thermal conditioning system that may be controlled with the disclosed control system and methods are discussed in further detail herein.

The control system and/or control methods used to control these and various other suitable thermal systems may incorporate various control, prioritization, operating mode selection, and/or other techniques as described herein.

In one aspect, a method of controlling a vehicle thermal conditioning system is disclosed. The thermal conditioning system comprises a thermal energy source in thermal communication with a main line for circulating thermal medium, and the system is configured to thermally service at least one passenger component and at least one auxiliary component via respective branches fluidly coupled with the main circulation line. The method comprises obtaining at least one thermal conditioning criterion. The method further comprises determining at least one priority thermal component and at least one non-priority thermal component for thermal conditioning based on the at least one thermal conditioning criterion, the at least one priority thermal component comprising the at least one passenger or auxiliary component, and the at least one non-priority thermal component comprising the other of the at least one passenger or auxiliary component. The method further comprises thermally conditioning the at least one priority thermal component using a first control routine. The first control routine is based on determining the at least one passenger or auxiliary component as the at least one priority thermal component. The method further comprises thermally conditioning the at least one non-priority thermal component using a second control routine. The second control routine is different from the first control routine and based on determining the at least one passenger or auxiliary component as the at least one non-priority thermal component. In some embodiments, the at least one passenger component is one or more portions of a passenger seat. In some embodiments, the at least one auxiliary component is one or more of the following: a bin, a first cup holder and a second cup holder.

In some embodiments, determining at least one priority thermal component and at least one non-priority thermal component for thermal conditioning is based on one or more of a user preference, an available thermal energy, a required thermal energy, differences between set point temperatures of the at least one priority thermal component and the least one non-priority thermal component and respectively current temperatures of the at least one priority thermal component and the least one non-priority thermal component, estimated periods to reach the set point temperatures, and estimated periods to reach thermal thresholds of the at least one priority thermal component and the least one non-priority thermal component. In some embodiments, the method further comprises determining whether the at least one passenger component is enabled, determining whether the at least one auxiliary component is enabled, and prioritizing the at least one passenger component in response to determining that the at least one passenger component is enabled. In some embodiments, prioritizing further comprises prioritizing the at least one passenger component in response to determining that the at least one passenger component and the at least one auxiliary component are enabled.

In some embodiments, the method further comprises thermally conditioning the at least one priority thermal component prior to thermally conditioning the at least one non-priority thermal component. In some embodiments, the method further comprises thermally conditioning the at least one priority and non-priority thermal components simultaneously.

In some embodiments, the method further comprises determining the at least one priority thermal component is the at least one passenger component, analyzing a thermal setpoint for the at least one passenger component, analyzing a thermal region that includes the at least one passenger component, and setting a blower speed based on analyzing the thermal setpoint and the thermal region. In some embodiments, thermally conditioning the at least one priority thermal component further comprises comparing a detected temperature of the at least one passenger component with a first thermal threshold, the first thermal threshold based on a thermal setpoint for the at least one passenger component; comparing the detected temperature of the at least one passenger component with a second thermal threshold, the second thermal threshold based on a temperature of a thermal region that includes the at least one passenger component; and setting the speed of the first blower to a first speed or a second speed. The first blower is set to the first speed in response to determining that the detected temperature does not satisfy either the first or second thermal thresholds. The first blower is set to the second speed in response to determining that the detected temperature satisfies at least one of the first or second thermal thresholds. Further the first speed is greater than the second speed.

In some embodiments, thermally conditioning the at least one priority thermal component comprises determining the at least one priority thermal component is the at least one passenger component, and setting a blower speed for one or more stages. Each of the one or more stages comprises operating the blower at a stage-dependent blower speed and for a stage-dependent period of time, where the blower speed and period of time are based on analyses of thermal and accrued time thresholds. In some embodiments, thermally conditioning the at least one priority thermal component further comprises, in a first stage, setting the blower speed at a first speed setting for a first time period, comparing a first detected temperature of the at least one passenger component with a first temperature threshold, comparing a first accrued runtime for thermal conditioning of the at least one passenger component with a first runtime threshold, and entering a second stage based on determining i) that the first detected temperature satisfies the first temperature threshold or ii) that the first accrued runtime for thermal conditioning of the at least one passenger component satisfies the first runtime threshold. Further, thermally conditioning the at least one priority thermal component further comprises, in the second stage, setting the blower speed at a second speed setting for a second time period, wherein the second speed setting is less than the first speed setting, comparing a second detected temperature of the at least one passenger component with a second temperature threshold, comparing a second accrued runtime for thermal conditioning of the at least one passenger component with a second runtime threshold, and exiting the second stage based on determining i) that the second detected temperature satisfies the second temperature threshold or ii) that the second accrued runtime for thermal conditioning of the at least one passenger component satisfies the second runtime threshold.

In some embodiments, thermally conditioning the at least one priority thermal component further comprises analyzing a thermal setpoint threshold for the at least one passenger component and an accrued runtime threshold, and thermally conditioning the at least one passenger component based on analyzing the thermal setpoint threshold and the accrued runtime threshold. In some embodiments, thermally conditioning the at least one passenger component further comprises increasing a rate of transfer of thermal energy to the at least one passenger component, determining that a detected temperature of the at least one passenger component satisfies the thermal setpoint threshold, reducing the rate of transfer of thermal energy to the at least one passenger component in response to determining that the detected temperature of the at least one passenger component satisfies the thermal setpoint threshold, and thermally conditioning the at least one auxiliary component in response to determining that the detected temperature of the at least one passenger component satisfies the thermal setpoint threshold.

In some embodiments, thermally conditioning the at least one passenger component further comprises increasing a rate of transfer of thermal energy to the at least one passenger component, determining that a detected temperature of the at least one passenger component does not satisfy the thermal setpoint threshold, determining that an accrued runtime satisfies the accrued runtime threshold, and thermally conditioning the at least one auxiliary component in response to determining that the accrued runtime satisfies the accrued runtime threshold.

In some embodiments, thermally conditioning the at least one passenger component further comprises adjusting a rate of transfer of thermal energy to the at least one passenger component based on analysis of i) a temperature threshold for the at least one passenger component and ii) an accrued runtime. In some embodiments, the method further comprises increasing the rate of transfer of thermal energy to the at least one passenger component, determining that i) a detected temperature associated with the at least one passenger component satisfies the temperature threshold or that ii) the accrued runtime satisfies an accrued runtime threshold, and decreasing the rate of transfer of thermal energy to the at least one passenger component in response to determining that i) the detected temperature associated with the at least one passenger component satisfies the temperature threshold or that ii) the accrued runtime satisfies the accrued runtime threshold. In some embodiments, adjusting the rate of transfer of thermal energy to the at least one passenger component comprises increasing the flow of thermal medium to a heat transfer device associated with the at least one passenger component. In some embodiments, the method further comprises adjusting a rate of transfer of thermal energy to the at least one auxiliary component. In some embodiments, adjusting a rate of transfer of thermal energy to the at least one auxiliary component comprises decreasing the rate of transfer of thermal energy to the at least one auxiliary component. In some embodiments, decreasing the rate of transfer of thermal energy to the at least one auxiliary component comprises decreasing the flow of thermal medium to a heat transfer device associated with the at least one auxiliary component.

In some embodiments, the method further comprises determining the at least one priority thermal component is the at least one auxiliary component, where the at least one auxiliary component includes a single thermal component to be thermally conditioned; determining, for a period of time lasting at least until a thermal threshold for the at least one auxiliary component has been satisfied, one or more differences between a current temperature of the at least one auxiliary component and a thermal set point for the at least one auxiliary component; thermally conditioning the at least one auxiliary component by operating the compressor at a plurality of speeds over at least the period of time, each of the plurality of speeds based at least in part on one of the determined differences; and thermally conditioning the at least one passenger component in response to determining that the thermal threshold for the at least one auxiliary component has been satisfied. In some embodiments, the at least one auxiliary component is a bin or a cup holder.

In some embodiments, the method further comprises determining the at least one priority thermal component includes first and second auxiliary components, wherein the first auxiliary component is a convective thermal component and the second auxiliary component is a conductive thermal component; thermally conditioning the convective component by setting thermal parameters of the thermal conditioning system based on determining that the convective component is set to either a freeze or a refrigerate control mode; thermally conditioning the conductive component after setting the thermal parameters for the convective component; and thermally conditioning the at least one passenger component after thermally conditioning the convective and conductive auxiliary components. The at least one passenger component may be thermally conditioning in response to determining that thermal thresholds for the first and second auxiliary components have been satisfied. The at least one passenger component may be thermally conditioning in response to determining i) that thermal thresholds for the first and second auxiliary components have been satisfied or ii) that an accrued runtime for thermally conditioning the first and second auxiliary components satisfies an accrued runtime threshold. The convective thermal component may be a bin and the conductive thermal component may be at least one cup holder.

In another aspect, a vehicle thermal conditioning system is disclosed. The system comprises at least one passenger component to be thermally conditioned by the system, at least one auxiliary component to be thermally conditioned by the system, a thermal energy source in thermal communication with the at least one passenger and auxiliary components, the thermal energy source configured to provide thermal energy for thermally conditioning the at least one passenger and auxiliary components, and a controller in communication with the thermal energy source. The controller is configured to receive at least one thermal conditioning criterion; determine at least one priority thermal component and at least one non-priority thermal component for thermal conditioning based on the at least one thermal conditioning criterion, the at least one priority thermal component comprising the at least one passenger or auxiliary component, and the at least one non-priority thermal component comprising the other of the at least one passenger or auxiliary component; thermally condition the at least one priority thermal component using a first control routine, the first control routine based on determining the at least one passenger or auxiliary component as the at least one priority thermal component; and thermally condition the at least one non-priority thermal component using a second control routine, the second control routine different from the first control routine and based on determining the at least one passenger or auxiliary component as the at least one non-priority thermal component.

In some embodiments, the controller is further configured to analyze the thermal conditioning criteria based on one or more of the following: user preference, required thermal energy, difference between set point temperature and current temperature, timing to reach a thermal set point, and timing to reach a thermal threshold. In some embodiments, the controller is further configured to determine whether the at least one passenger component is enabled; determine whether the at least one auxiliary component is enabled; and prioritize the at least one passenger component in response to determining that the at least one passenger component is enabled. In some embodiments, the controller is further configured to determine the at least one priority thermal component is the at least one passenger component; analyze a thermal setpoint for the at least one passenger component; analyze a thermal region that includes the at least one passenger component; and set a blower speed based on analyzing the thermal setpoint and the thermal region. In some embodiments, the controller is further configured to determine the at least one priority thermal component is the at least one passenger component, and set a blower speed for one or more stages, each of the one or more stages comprising operating the blower at a stage-dependent blower speed and for a stage-dependent period of time, wherein the blower speed and period of time are based on analyses of thermal and accrued time thresholds. In some embodiments, the controller is further configured to determine the at least one priority thermal component is the at least one auxiliary component, wherein the at least one auxiliary component includes a single thermal component to be thermally conditioned; determine, for a period of time lasting at least until a thermal threshold for the at least one auxiliary component has been satisfied, one or more differences between a current temperature of the at least one auxiliary component and a thermal set point for the at least one auxiliary component; thermally condition the at least one auxiliary component by operating the compressor at a plurality of speeds over at least the period of time, each of the plurality of speeds based at least in part on one of the determined differences; and thermally condition the at leak one passenger component in response to determining that the thermal threshold for the at least one auxiliary component has been satisfied. In some embodiments, the controller is further configured to determine the at least one priority thermal component includes first and second auxiliary components, wherein the first auxiliary component is a convective thermal component and the second auxiliary component is a conductive thermal component; thermally condition the convective component by setting thermal parameters of the thermal conditioning system based on determining that the convective component is set to either a freeze or a refrigerate control mode; thermally condition the conductive component after setting the thermal parameters for the convective component; and thermally condition the at least one passenger component after thermally conditioning the convective and conductive auxiliary components.

In some embodiments, the at leak one passenger component is one or more portions of a passenger seat. In some embodiments, the at least one auxiliary component is one or more of the following: a bin, a first cup holder and a second cup holder.

In another aspect, a method of controlling a vehicle thermal conditioning system is disclosed. The thermal conditioning system comprises a thermal energy source in thermal communication with a main line for circulating thermal medium, and the system is configured to thermally service at least one passenger component and at least one auxiliary component via respective branches fluidly coupled with the main circulation line. The method comprise identifying the at least one passenger component or the at least one auxiliary component as an at least one priority thermal component for thermal conditioning, and thermally conditioning the at least one priority thermal component using a first control routine, the first control routine specific to the at least one passenger component or to the at least one auxiliary component determined to be the at least one priority thermal component.

In some embodiments, the method further comprises identifying the other of the at least one passenger component or the at least one auxiliary component as an at least one non-priority thermal component for thermal conditioning, and thermally conditioning the at least one non-priority thermal component using a second control routine, the second control routine different from the first control routine and specific to the at least one passenger or auxiliary component that is determined to be the at least one non-priority thermal component.

In some embodiments, identifying the at least one passenger component or the at least one auxiliary component as the at least one priority thermal component for thermal conditioning comprises receiving at least one thermal conditioning criterion, and identifying the at least one priority thermal component for thermal conditioning based on the at least one thermal conditioning criterion.

In some embodiments, identifying the other of the at least one passenger component or the at least one auxiliary component as the at least one non-priority thermal component for thermal conditioning comprises receiving at least one thermal conditioning criterion; and identifying the at least one non-priority thermal component for thermal conditioning based on the at least one thermal conditioning criterion.

In another aspect, a vehicle thermal conditioning system is disclosed. The system comprises at least one passenger component to be thermally conditioned by the system, at least one auxiliary component to be thermally conditioned by the system, a thermal energy source in thermal communication with the at least one passenger and auxiliary components, the thermal energy source configured to provide thermal energy for thermally conditioning the at least one passenger and auxiliary components, and a controller in communication with the thermal energy source. The controller is configured to identify the at least one passenger component or the at least one auxiliary component as an at least one priority thermal component for thermal conditioning, and thermally condition the at least one priority thermal component using a first control routine, the first control routine specific to the at least one passenger component or to the at least one auxiliary component determined to be the at least one priority thermal component.

In some embodiments, the controller is further configured to identify the other of the at least one passenger component or the at least one auxiliary component as an at least one non-priority thermal component for thermal conditioning, and thermally condition the at least one non-priority thermal component using a second control routine, the second control routine different from the first control routine and specific to the at least one passenger or auxiliary component that is determined to be the at least one non-priority thermal component. In some embodiments, to identify the at least one passenger component or the at least one auxiliary component as the at least one priority thermal component for thermal conditioning, the controller is further configured to receive at least one thermal conditioning criterion, and determine the at least one priority thermal component for thermal conditioning based on the at least one thermal conditioning criterion. In some embodiments, to identify the at least one passenger component or the at least one auxiliary component as the at least one non-priority thermal component for thermal conditioning, the controller is further configured to receive at least one thermal conditioning criterion, and determine the at least one non-priority thermal component for thermal conditioning based on the at least one thermal conditioning criterion.

In another aspect, a method of controlling a vehicle thermal conditioning system is disclosed. The system comprises a thermal energy source in thermal communication with a main line for circulating thermal medium, and the system is configured to thermally service at least one passenger component and at least one auxiliary component via respective branches fluidly coupled with the main circulation line. The method comprises prioritizing the thermal service to one of the at least one passenger component or to the at least one auxiliary component, wherein the thermal service is specific to the prioritized component.

In some embodiments, prioritizing the thermal service comprises identifying the at least one passenger component or the at least one auxiliary component as an at least one priority thermal component for thermal conditioning. In some embodiments, prioritizing the thermal service comprises determining which of the at least one passenger component and the at least one auxiliary component has a higher thermal load.

In another aspect, a vehicle thermal conditioning system is disclosed that comprises at least one passenger component to be thermally conditioned by the system, at least one auxiliary component to be thermally conditioned by the system, a thermal energy source in thermal communication with the at least one passenger and auxiliary components, the thermal energy source configured to provide thermal energy for thermally conditioning the at least one passenger and auxiliary components, and a controller in communication with the thermal energy source. The controller is configured to prioritize thermal service to one of the at least one passenger component or to the at least one auxiliary component, wherein the thermal service is specific to the prioritized component.

In some embodiments, to prioritize thermal service, the controller is further configured to identify the at least one passenger component or the at least one auxiliary component as an at least one priority thermal component for thermal conditioning. In some embodiments, to prioritize thermal service, the controller is further configured to determine which of the at least one passenger component and the at least one auxiliary component has a higher thermal load.

In another aspect, a method of controlling a vehicle thermal conditioning system is disclosed. The system is configured to thermally condition at least a first component and a second component. The method comprises determining whether the first component is enabled for thermal conditioning, determining whether the second component is enabled for thermal conditioning, thermally conditioning the first component if it is determined that the first component is enabled for thermal conditioning, and thermally conditioning the second component if it is determined that the second component is enabled for thermal conditioning.

In another aspect, another method of controlling a vehicle thermal conditioning system is disclosed. The thermal conditioning system is configured to thermally condition at least a first main component, a second main component, and an auxiliary component. The method comprises determining whether the first main component is enabled for thermal conditioning, determining whether the second main component is enabled for thermal conditioning, determining whether the auxiliary component is enabled for thermal conditioning, thermally conditioning the first main component if it is determined that the first main component is enabled for thermal conditioning, thermally conditioning the second main component if it is determined that the second main component is enabled for thermal conditioning, and thermally conditioning the auxiliary component if it is determined that the auxiliary component is enabled for thermal conditioning.

In another aspect, another method of controlling a vehicle thermal conditioning system is disclosed. The thermal conditioning system is configured to thermally condition at least a first component and a second component and comprises a thermal energy source that includes a miniature vapor compressor. The method comprises determining whether the first component is enabled for thermal conditioning, determining whether the second component is enabled for thermal conditioning, prioritizing thermal conditioning of the first or second component based at least in part on whether either, neither or both of the first and second components are enabled for thermal conditioning, and varying the speed of the compressor based at least in part on whether the first or second component was prioritized for thermal conditioning.

In another aspect, another method of controlling a vehicle thermal conditioning system is disclosed. The thermal conditioning system is configured to thermally condition at least a first component and a second component using first and second blowers and comprises a thermal energy source that includes a miniature vapor compressor. The method comprises determining whether the first component is enabled for thermal conditioning, determining whether the second component is enabled for thermal conditioning, prioritizing thermal conditioning of the first or second component based at least in part on whether either, neither or both of the first and second components are enabled for thermal conditioning, setting a speed of the first blower based at least in part on whether the first or second component was prioritized for thermal conditioning, setting a speed of the second blower based at least in part on whether the first or second component was prioritized for thermal conditioning, and varying the speed of the compressor based at least in part on whether the first or second component was prioritized for thermal conditioning.

In another aspect, another method of controlling a vehicle thermal conditioning system is disclosed. The thermal conditioning system is configured to thermally condition a first seat, a second seat, a first cup holder, a second cup holder and an enclosure, and comprises a thermal energy source that includes a miniature vapor compressor. The method comprises determining whether the first seat is enabled for thermal conditioning, determining whether the second seat is enabled for thermal conditioning, setting a first seat blower speed based at least in part on whether the first seat was enabled for thermal conditioning, setting a second seat blower speed based at least in part on whether the second seat was enabled for thermal conditioning, determining whether the first cup holder is enabled for thermal conditioning, determining whether the second cup holder is enabled for thermal conditioning, determining whether the enclosure is enabled for thermal conditioning, and varying the speed of the compressor based at least in part on whether the first cup holder, the second cup holder or the enclosure are enabled for thermal conditioning.

In another aspect, another method of controlling a vehicle thermal conditioning system is disclosed. The thermal conditioning system is configured to thermally condition at least a first component and a second component. The method comprises determining whether the first component is enabled for thermal conditioning, determining whether the second component is enabled for thermal conditioning, thermally conditioning the first component if it is determined that the first component is enabled for thermal conditioning, wherein thermally conditioning the first component comprises thermally conditioning the first component until at least (i) a first temperature of the first component satisfies a first temperature threshold or (ii) a first accrued amount of time while thermally conditioning the first component satisfies a first time threshold, and thermally conditioning the second component if it is determined that the second component is enabled for thermal conditioning, wherein thermally conditioning the second component comprises thermally conditioning the second component until at least (i) a second temperature of the second component satisfies a second temperature threshold or (ii) a second accrued amount of time while thermally conditioning the second component satisfies a second time threshold.

In some embodiments, the first temperature of the first component satisfies the first temperature threshold based at least in part on the first temperature being less than or equal to a first thermal setpoint. In some embodiments, the first accrued amount of time while thermally conditioning the first component satisfies the first time threshold based at least in part on the first amount of time spent thermally conditioning the first component being greater than or equal to a first set time limit. In some embodiments, the second temperature of the second component satisfies the second temperature threshold based at least in part on the second temperature being less than or equal to a second thermal setpoint. In some embodiments, the second accrued amount of time while thermally conditioning the second component satisfies the second time threshold based at least in part on the second amount of time spent thermally conditioning the second component being greater than or equal to a second set time limit.

DETAILED DESCRIPTION

Figure 1A:
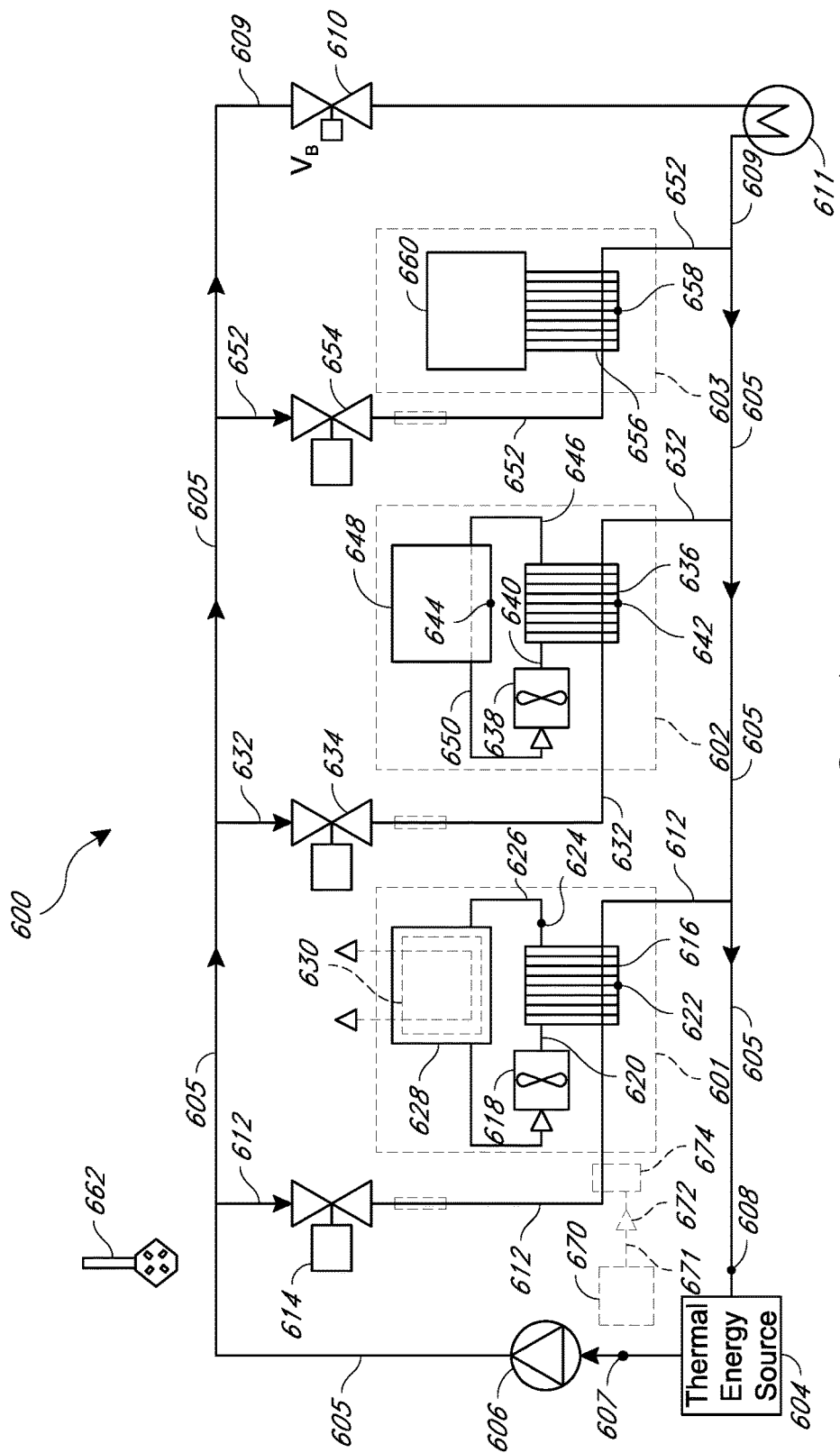
FIG. 1A is a schematic of an embodiment of a vehicle thermal conditioning system that thermally services multiple components and that may be controlled using the control systems and methods disclose herein.

Reference throughout this specification to "one embodiment," "some embodiments," "an embodiment," and the like, means that a particular feature, structure, or characteristic described in connection with the embodiment is included in at least one embodiment of claimed subject matter. Thus, the appearances of the phrase "in one embodiment," "some embodiments," "an embodiment," and the like, in various places throughout this specification are not necessarily all referring to the same embodiment. Furthermore, the particular features, structures, or characteristics may be combined in one or more embodiments (e.g., some embodiments).

The control systems and methods disclosed herein provide features for controlling vehicle thermal conditioning systems that thermally service multiple components and/or regions of a vehicle. Although presented in the context of controlling vehicle thermal conditioning systems, the control systems may be used in other contexts as well, such as homes and offices.

The thermal system may include at least one region having one or more components serviced by a thermal energy source that uses, for example, a vapor compressor. In some embodiments, the thermal system has two, three, or more regions with each region having several components that are thermally conditioned. The thermal system can include a single fluid loop for servicing the one or more regions and the components therein. In some embodiments, the single loop circulates liquid thermal medium conditioned by a vapor compression system as the thermal energy source, e.g., a miniature vapor compressor, to each of the one or more regions. The liquid medium may branch off of the loop to each region. Each region can include a heat transfer device (e.g., a heat exchanger) that transfers heat to or from the various components. For example, a first region may have one or more seats, a second region may have a storage bin, and a third region may have a cup holder. The single, liquid medium loop can service all such regions. Further, each region may thermally condition their respective components with a variety of mechanisms, including "open loop air," "closed loop air," conductive, or other types, including fluid thermal system with circuits and conduits conveying, for example, liquid.

Such thermal conditioning systems may be controlled using the control systems and methods disclosed herein. In some embodiments, the thermal systems may be controlled for optimal and/or efficient use of the thermal system. Efficient and/or optimal use may refer to, for example, high efficiency and/or optimal use of the required power, of the speed of thermal servicing of the components, of adaptation of the thermal system to varying demands of the various components and/or regions for instance based on ambient, existing and/or changing external temperatures, of adaptation of the thermal system to varying user demands for example desired temperature or desired speed of reaching the desired temperature, other suitable parameters or factors, other efficiency and optimization goals, and/or combinations thereo.

FIG. 1A is a schematic of an embodiment of a vehicle thermal conditioning system or bus 600 that thermally services multiple components and that may be controlled using the control systems and methods disclosed herein. The thermal conditioning system 600 may be used for heating or cooling multiple thermal zones or regions of a vehicle. The thermal conditioning system includes a thermal bus 600 with thermal medium that is conditioned by a thermal energy source 604 comprising a miniature vapor compression system. The thermal bus 600 includes a single main line or circuit 605 that services three different regions 601, 602, 603 within the vehicle. The bus 600 and thermal energy source 604 may be used in a variety of embodiments for thermally conditioning one or more components in a vehicle, such as those described in, for example, U.S. Provisional Application No. 62/094,852, filed on Dec. 29, 2014, entitled "Thermal Conditioning Systems and Methods for Vehicle Regions," and PCT International Application No. PCT/US2015/066432, filed on Dec. 17, 2015, entitled "Thermal Conditioning Systems and Methods for Vehicle Regions," the entire contents of each which is hereby incorporated by reference for all purposes.

As shown in FIG. 1A, the thermal bus 600 includes a first region 601, a second region 602 and a third region 603. The regions 601, 602, 603 include corresponding components of a vehicle that are thermally conditioned, such as a seat, a bin and a cup holder, respectively. For example, the first region 601 may correspond to a first front seat of a vehicle. The second region 602 may correspond to a bin, such as a storage bin or cooler, of a vehicle. The third region 603 may correspond to one or more cup holders in a vehicle. As shown, the regions 601, 602, 603 are indicated by dashed lines that surround various components included with the respective regions. These are merely examples of the components that may be included with the regions. The regions 601, 602, 603 may also include fewer or more components than are shown and described herein. Further, in some embodiments, there may be more or fewer than three regions. There may be one, two, four or more regions in the thermal bus 600.

As shown, the thermal bus 600 includes thermal medium that is heated and/or cooled by the thermal energy source 604. The thermal energy source 604 can provide heating or cooling via an evaporator or a condenser of a vapor compression system. In some embodiments, an evaporator is used in the thermal energy source 604 to provide cooling. In some embodiments, a condenser is used in the thermal energy source 604 to provide heating. Further detail of the thermal energy source 604 is described herein, for example with respect to the mini vapor compression system 700 shown in FIG. 1B.

As shown in FIG. 1A, the thermal bus 600 has a single main line or circuit 605 that carries a thermal medium. The thermal medium is heated and/or cooled by the thermal energy source 604 and is used to condition the various regions 601, 602, 603. The line 605 is, for example, a tube or piping comprising conduits that carries fluid such as a liquid, gas, vapor or other thermal media to the various regions. The line 605 extends from the thermal energy source 604 in a loop and returns to the thermal energy source 604. The line 605 may include a pump 606 or other fluid moving device designed to circulate the thermal media. The pump 606 causes the thermal medium within the line 605 to circulate through the bus 600.

The thermal bus 600 further includes various temperature sensors. An outgoing temperature sensor 607 can be coupled to the line 605 at a location adjacent the thermal energy source 604 as illustrated, for example downstream in a direction of flow of the thermal medium through the line 605. The outgoing temperature sensor 607 senses the temperature of the thermal medium within the line 605 as the thermal medium leaves thermal communication with the thermal energy source 604. An incoming temperature sensor 608 can be coupled to the line 605 at a location adjacent the thermal energy source 604 as illustrated, for example upstream of the direction of flow. The incoming temperature sensor 608 senses the temperature of the thermal medium in the line 605 as the thermal medium comes into thermal communication with the thermal energy source 604. The sensors 607, 608 may be used to determine if adjustments to the thermal energy source 604 are necessary. For example, if the temperatures sensed by the sensors 607, 608 are too low or too high, operation of the thermal energy source 604 may be adjusted to increase or decrease the amount of heating or cooling provided and thereby adjust the temperature of the thermal medium, respectively.

As shown, the thermal bus 600 can also include a bypass line 609. The bypass line 609 may be a continuation of the line 605 beyond the three regions 601, 602, 603. The bypass line 609 may also be a separate line coupled with the line 605. The bypass line 609 can include a flow control device 610, such as a valve or other device, that regulates the flow of the thermal medium through the bypass line 609. In some embodiments, the flow control device 610 is normally open. The bypass line 605 can be used to help regulate thermal conditioning of the regions 601, 602, 603 as discussed herein.

As shown, the bypass line 609 can connect to a thermal battery 611. The thermal battery 611 is heated or cooled, i.e. thermally charged, by the thermal energy source 604. The thermal battery 611 can condition one or more of the interior components during periods when the thermal energy source 604 is not operating. The thermal battery 611 can be charged via one or more of a refrigerant circuit, a liquid circuit, and an air circuit, such as the main line 605 via the bypass line 609. The thermal battery 611 can be a reservoir within the bypass line 609. The thermal battery 611 may be cooled by the thermal medium within the bypass line 609. The thermal battery 611 may be used to provide smaller amounts of cooling to the bus 600. For example, if the car is off, an auxiliary pump may be run to provide some thermal conditioning to various components of the vehicle. As another example, when the bus 600 is providing cooling, a fan may be run for a period of time after the car has been shut off to provide air to the evaporator in the thermal energy source 604 and prevent it from icing. In some embodiments, the thermal battery 611 may be or include a thermal storage device that, for example, contains either or both a high and low temperature phase change material, such as for example, wax (a higher temperature phase change material) and water (a lower temperature phase change material) to store thermal energy for later use.

The bypass line 609 may continue beyond the thermal battery 611 and couple with (e.g., return to) the main line 605. In some embodiments, the bypass line 609 and the main line 605 may be different regions of the same, monolithic line.

The thermal bus 600 thermally services the regions 601, 602, 603. As shown, the main line 605 may service each region via one or more branches. A first branch 612 is connected to the line 605 and services the first region 601. A second branch 632 is connected to the line 605 and services the second region 602. A third branch 652 is connected to the line 605 and services the third region 603. In some embodiments, more than one branch may service a single region, and/or a single branch may service more than one region.

The first region 601 receives thermal medium that flows through the first branch 612 from the line 605. The first branch 612 includes a fluid flow control device 614, such as, for example, a valve. The flow control device 614 is configured to control, direct, allow, inhibit, prevent or otherwise regulate a flow of the thermal medium flowing through the first branch 612 to the first region 601. In some embodiments, the flow control device 614 may selectively open and/or close to regulate the flow of the medium through the first branch 612. Further, the flow control device 614 may be configured to be normally closed and then opened as needed. In some embodiments, the flow control device 614 could be replaced or work with an in-line pump for variable control. A commercially available pump may be used, such as, for example, the Micro AC/DC Water Pump manufactured by Alita Industries. Inc., of Arcadia, Calif.

The first region 601 includes a heat transfer device 616, a fan 618 and a first passenger component or first thermal node 628. The first thermal node 628 is a passenger component intended to be thermally conditioned. The first thermal node 628 may be, for example, a seat in a vehicle, or one or more portions of a seat. In some embodiments, the first thermal node 628 is any component, used by or otherwise related to a passenger or other occupant of the vehicle, that is thermally conditioned. There may be more than one such passenger component, for example two seats. The passenger component may be a convective component and/or a conductive component, i.e. a component that is thermally conditioned via, respectively, convection and/or conduction. The thermal medium within the first branch 612 is circulated to the heat transfer device 616. The heat transfer device 616 is a heat exchanger or other similar device configured to exchange heat between a) the thermal medium within the first branch 612 and b) the air supplied by the fan 618 to the first thermal node 628. For example, the heat transfer device 616 may have multiple fins coupled to the branch 612 through, on, around, or otherwise within proximity of which the air flows. The thermal medium then flows through and exits the heat transfer device 616 in the first branch 612 and reconnects with the main line 605, through which the thermal medium returns to the thermal energy source 604.

The heat transfer device 616 is in thermal communication (e.g., thermally coupled or connected) with the first branch 612 such that the thermal medium flowing through the first branch 612 thermally conditions a fluid, such as air, flowing through an adjacent or conditioning line 620, such as a duct, that is in thermal communication (e.g., thermally coupled or connected) with the heat transfer device 616. As shown, the line 620 connects the fan 618 to the heat transfer device 616. The fan 618 blows air through the line 620 such that it is thermally conditioned by the heat transfer device 616.

The temperature of the heat transfer device 616 depends on a set, predetermined, or desired temperature point for the first thermal node 628. For instance, controls may be set manually or automatically to a desired temperature. Based on the set temperature, a particular amount of thermal power, i.e. thermal energy transfer with respect to time, may be applied. For instance, for the first node 628, the temperature of the heat transfer device 616 may be set to be at twenty six degrees Celsius (26° C.) and to deliver sixty watts (60 W) of thermal power to the first node 628. Dedicated control valves, such as the flow control device 614, may be selectively opened and closed to regulate the temperature of the heat transfer device 616. In some embodiments, the temperature of the heat transfer device 616 may be limited to maintain condensation production below a predetermined amount that can be evaporated inside the vehicle interior. The temperature limit may be based on sensors providing data on ambient air temperature and/or humidity. The desired temperature may affect the working fluid temperature, e.g. the thermal medium temperature, and/or the flow rate of the working fluid. For instance, the working fluid temperature and/or flow rate may depend on peak or total thermal power requirements. The temperature of the conditioned fluid, such as the air blown out from the first node 628, may depend on the desired temperature for the node 628. Further details of a control system and associated methods that may be used to control the thermal conditioning system 600 and/or portions thereof are discussed herein, for example with respect to FIGS. 2-8.

The thermally conditioned air then flows from the heat transfer device 616 and into the line 626 that thermally connects the heat transfer device 616 to the first thermal node 628. The thermally conditioned air then circulates through the first thermal node 628 and exits the first thermal node 628, as shown. In this manner, a person near the first thermal node 628, such as a person sitting on a seat, may receive heated or cooled air. For example, for receiving cold air, the first branch 612 may have cold thermal medium flowing to the heat transfer device 616 such that the air blown by the fan 618 through the heat transfer device 616 via the line 620 is cooled. The cooled air then flows through the line 626 to the first thermal node 628. The first thermal node 62.8 may include various parts of a single component. For instance, for a vehicle seat, the first thermal node 628 may include a seat bottom portion and/or a seat back portion.

In some embodiments, the first region 601 also includes a heater mat 630 with the first thermal node 628. The heater mat 630 may be used to provide heat to the first thermal node 628. The mat 630 may heat up conditioned or unconditioned air that is blown over and around the mat 630. The mat 630 may be used to heat air which has been cooled to a desired temperature to remove moisture for conditioning the first thermal node 628.

The first region 601 also includes various temperature sensors. As shown, a first temperature sensor 622 is located at the heat transfer device 616. The temperature sensor 622 senses the temperature of the heat transfer device 616, for example, for diagnostic, operational and/or control purposes. If the temperature is too high or too low, adjustments may be made to the bus 600, such as adjustments to the thermal energy source 604 or maintenance or repairs to parts of the bus 600. A second temperature sensor 624 can he connected to the line 626 which extends from the heat transfer device 616 to the first thermal node 628. The second temperature sensor 624 senses the temperature of the fluid, such as air, flowing through the line 626, which may be for similar purposes. This is merely one example of how various temperature sensors may be arranged for providing temperature feedback and control, and other suitable configurations may be implemented. Further, there may be one, three or more such sensors located within the first region 601. The temperature sensors 622, 624 may provide feedback to a control system that can adjust, for example, the level of thermal conditioning provided, as is discussed in further detail herein, for example with respect to FIGS. 2-8.

The first region 601 is shown as an "open loop air" system, where the conditioned air exits the node. However, other types of systems, such as a "closed loop air" system, or others as discussed herein, may be implemented. The second region 602 is shown as such a "closed loop air" system. That is, the air used in the second region 602 is recirculated and reused within the second region 602 and does not exit the second region 602. It is understood that this is merely an example of the system 600, and other suitable configurations may be implemented. For example, the first region 601 may include a closed loop air system, and/or the second region 602 may include an open air lop system, etc.

The second region 602 is conditioned by the second branch 632 connected to the line 605. The second branch 632 includes a fluid flow control device 634 such as, for example, a valve, which may be similar to the flow control device 614 related to the first region 601, or it may be a pump or other fluid moving device. The flow control device 634 controls, directs, allows, inhibits, prevents or otherwise regulates a flow of the thermal medium circulating through the second branch 632 and to the second region 602.

The second region 602 includes a heat transfer device 636, a fan 638 and a first auxiliary component or second node 648 such as, for example, a bin. The bin may be a storage container, enclosure cooler, or the like. In some embodiments, the bin is a storage container in a center console of a vehicle. In some embodiments, the second thermal node 648 is any auxiliary component that is thermally conditioned, which may be all other thermally conditioned components other than the passenger components of the vehicle. There may be more than one such auxiliary component, for example a bin and a cup holder. The auxiliary component may be a convective component and/or a conductive component, i.e. a component that is thermally conditioned via, respectively, convection and/or conduction. In some embodiments, the one or more passenger components are convective components (thermally conditioned with convection), one of the one or more auxiliary components are conductive components, and another of the one or more auxiliary components are convection components. These are just some examples and various other suitable combinations of convective and conductive components may be used.

The heat transfer device 636 is a heat exchanger or similar device configured to transfer heat between the thermal medium within the second branch 632 and air circulated by the fan 638. The heat transfer device 636 may be similar to the heat transfer device 616 in the first region 601. As shown, the second branch 632 extends through and exits the heat transfer device 636 and reconnects with the line 605, which returns the thermal medium to the thermal energy source 604. Thermal medium circulates through the second branch 632 from the line 605 to the heat transfer device 636 and back to the line 605. The heat transfer device 636 uses the thermal medium to thermally condition the second region 602. The temperature of the heat transfer device 636 depends on a set, predetermined, or desired temperature point for the second thermal node 628. For instance, controls may be used to manually or automatically set a desired temperature. Based on the set temperature, a particular amount of thermal power, i.e. thermal energy transfer with respect to time, may be applied. For instance, the temperature of the heat transfer device 636 for conditioning the second node 648 may be set to four degrees Celsius (4° C.) and to provide forty watts (40 W) of thermal power. Similar controls and control systems as described with respect to the first region 601, such as the control systems described with respect to FIGS. 2-8, may be implemented with the second region 602.

As shown in FIG. 1A, the fan 638 blows air through a line 640 connected to the heat transfer device 636. The air blown through the heat transfer device 636 by the fan 638 via the line 640 is thermally conditioned by the heat transfer device 636 and then exits the heat transfer device 636 via the line 646. The line 646 thermally connects the heat transfer device 636 to the second node 648. In this manner, thermally conditioned air circulated by the fan 638 reaches the second node 648 through the line 646. The second node 648 is also thermally connected to a line 650. The line 650 connects the second node 648 to the fan 638, thereby completing a closed loop air circuit. In this manner, thermally conditioned fluid such as air within the second node 648 recirculates back through the second region 602 to the fan 638 via the line 650. For example, a bin may have thermally conditioned air therein recirculated back through the second region 602 as discussed herein.

The second region 602 can also include various temperature sensors. As shown, the second region 602 includes a first temperature sensor 642 coupled with the heat transfer device 636. The first sensor 642 senses the temperature of the heat transfer device 636 for diagnostic, operational, and/or control purposes, similar to the temperature sensors 622, 624 described above with respect to the first region 601. The second region 602 can also include a second temperature sensor 644. The second temperature sensor 644 is connected to the second node 648. The temperature sensor 644 senses the temperature of the air inside the second node 648 for similar purposes. This is merely one example of how various temperature sensors may be arranged, and other suitable configurations may be implemented.

The temperature sensors 642, 644 may provide feedback to a control system that can adjust, the level of thermal conditioning provided, as is discussed in further detail herein, for example with respect to FIGS. 2-8. Feedback from the temperature sensors 642, 644 can be used by the control system to determine whether an article has been placed in the second region 602. For example, the control system can detect a new article within the second region 602 based on a change or rate of change in the temperature sensed by the temperature sensor 644. Articles at a temperature different than a temperature of the second region 602, for example a temperature of the air inside the second node 648, can cause a change or increase in a rate of change in the temperature of the inside air. The control system may be set to respond accordingly, as further described herein.

As further shown in FIG. IA, the third region 603 is conditioned by the third branch 652 connected to the line 605. The third branch 652 includes a fluid flow control device 654 such as, for example, a valve, which may be similar to the valves 634, 614 or pumps in the other respective regions 602, 601. The fluid flow control device 654 may control, direct, allow, inhibit, prevent or otherwise regulate a flow of the thermal medium flowing through the third branch 652 and to the third region 603.

The third region 603 includes a heat exchanger 6:56 and a second auxiliary component or third thermal node 660 such as, for example, one or more cup holders. In some embodiments, the third thermal node 660 is any auxiliary component that is thermally conditioned, which may be all other thermally conditioned components other than the passenger components and the first auxiliary component of the vehicle. There may be more than one such second auxiliary component, for example two cup holders. The heat exchanger 656 is connected to the line 605 via the third branch 652. Thermal medium flows to and exits the heat exchanger 656 through the third branch 652. The third branch 652 reconnects with the line 605 and returns the thermal medium to the thermal energy source 604.

The thermal medium flowing through the heat exchanger 656 is used to thermally condition the third node 660. As shown, the third node 660 contacts the heat exchanger 656. Therefore, the third region 603 can be conditioned by conduction. That is, thermal conditioning may be provided via conduction of heat from the third node 660 to the heat exchanger 656. For example, cooled thermal medium may flow through the third branch 652 and to the heat exchanger 656. The cooled thermal medium in the heat exchanger 656 removes heat from the third node 660 by conduction, thereby cooling the third node 660. For example, the third node 660 may be a cup holder that is conductively cooled to provide cooling to a cavity formed by the cup holder.

Although the third region 603 is shown as a conductive system, it may also be implemented with other types of thermal systems. In some embodiments, the third region 603 may incorporate convective cooling. The third region 603 may therefore use the "open loop air" system used in the first region 601, the "closed loop air" system used in the second region 602, or other systems. Control of the thermal conditioning system 600 as discussed herein, for example as discussed with respect to FIGS. 2-8, is discussed primarily in the context of a convective third region 603. However, it is understood that the control systems and methods disclosed may also be used with thermal conditioning systems 600 that employ a conductive or other thermal system for the third region 603. For the convective embodiments of the third region 603, these may operate in the same or similar manner as described with respect to the first and second regions 601, 602, for instance by incorporating conditioned air moved through conduits via a fan, as described above.

The temperature of the heat transfer device 656 depends on a set, predetermined, or desired temperature point for the third thermal node 660. For instance, controls may be set manually or automatically to a desired temperature. Based on the set temperature, a particular amount of thermal power, i.e. thermal energy transfer with respect to time, may be applied. For instance, the temperature of the heat transfer device 656 for conditioning the third node 660, may be set to four degrees Celsius (4° C.) and to provide twenty-five watts (25 W) of thermal power. Similar controls as described with respect to the first and/or second regions 601, 602 may be implemented with the third region 603.

The third region 603 can also include various temperature sensors. As shown, the third region 603 includes a temperature sensor 658 coupled with the heat transfer device 656. The temperature sensor 658 may have similar features and functionality as the temperature sensors 622, 642. The temperature sensor 658 senses the temperature of the heat transfer device 656 for diagnostic, operational and/or control purposes. The temperature sensor 658 may provide feedback to a control system that can, for example, adjust the level of thermal conditioning provided, as is discussed in further detail herein, for example with respect to FIGS. 2-8.

Generally, the thermal bus 600 has been described with respect to a single thermal energy source 604 for conditioning the various regions 601, 602, 603. In some embodiments, the thermal bus 600 can be coupled with a second heat source 670 and a second thermal bus 671 including branches through which a thermal medium flows. A pump 672 or other fluid moving device can cause, control, pump, move, convey, direct, or otherwise regulate a flow of the thermal medium. A fluid flow control device 674 such as, for example, a two-position control valve, can inhibit flow to one of the thermal buses 600, 671 while allowing flow through the other of the thermal buses 600, 671. In this way, each of the thermal buses can be dedicated to providing heating or cooling, and the fluid flow control device 674 can be used to selectively use the thermal buses 600, 671 for independently servicing the various regions 601, 602, 603 based on desired temperatures within the regions 601, 602, 603.

In some embodiments, the thermal bus 600 can be coupled with more than one thermal energy source 604. There may be two, three, four or more thermal energy sources 604. There may thus be multiple thermal energy source 604 thermally coupled with the thermal bus 600, for example, to offer more cooling power when needed. For instance, a first thermal energy source 604 may be initially activated and a second, third, etc. thermal energy source 604 may be brought on line as the need arises. The need may be due to thermal demand, increased settings by the user, atypical thermal conditioning like sustained very low temperatures, and the like. In some embodiments, multiple thermal energy sources 604 may be alternatively used during subsequent usages of the system, for example to reduce wear on the parts. In some embodiments, a second, third, etc. thermal energy sources 604 may be employed as a backup source(s) if the primary thermal energy source 604 is not functioning, is not functioning properly, etc.

Heating may also be provided with a separate heater or heat source in other locations of the bus 600. For instance, a separate heater or heat source may be implemented to be in thermal communication with the lines 620 or 626 to provide heating to the first thermal node 628. In some embodiments, a fan, such as the fan 618 or another separate fan, may run to move the heated air in the lines 620 or 626 to the first thermal node 628. Further, the bus 600 may also be operated in conjunction with a separate heat source, such as with the aforementioned separate heater and/or with the heater mat 630. For instance, the thermal bus 600 may be operated to condition or precondition (e.g. dry out the which may then be moved to one or more of the separate heat sources to provide heating to the first thermal node 628.

The thermal bus 600 may also include a humidity sensor 662. The humidity sensor 662 senses a humidity of air, such as vehicle interior air, used to condition the various regions 601, 602, 603. The sensor 662 may be used to adjust a temperature of the thermal medium within the main line 605 and/or individual branches 612, 632, 652 of the bus 600 to prevent excessive condensate removal from the conditioning air. The humidity sensor 662 may be in communication with a control system that is used to control the thermal conditioning system 600. For example, the humidity sensor 662 may be in communication with the control systems described herein with respect to FIGS. 2-8 for controlling the thermal conditioning system 600. The humidity sensor 662 may be in wireless or wired communication with the control system.

Further, the various lines of the bus 600 may include insulation to prevent excessive condensation from forming on the lines. For instance, the line 605 may include insulation to prevent condensation from forming on the outside of line 605. The other lines in the bus 600 may likewise include insulation. In some embodiments, commercially available insulated lines or bundles may be used, such as, for example, the Parflex Multitube® manufactured by Parker Hannifin Corp. of Stafford, Tex., or the Point of Use tubing manufactured by Saint Clair Systems of Washington, Mich.

In some embodiments, condensation may be removed using drain tubes. The drain tubes may route any condensation through one or more of the vehicle body drain plugs. Vehicles typically include one or more drain plugs to seal drain holes located in the vehicle underbody. The drain holes are used during vehicle manufacture, and they may be used in some embodiments here to route any condensation from the interior to outside the vehicle.

Figure 1B:
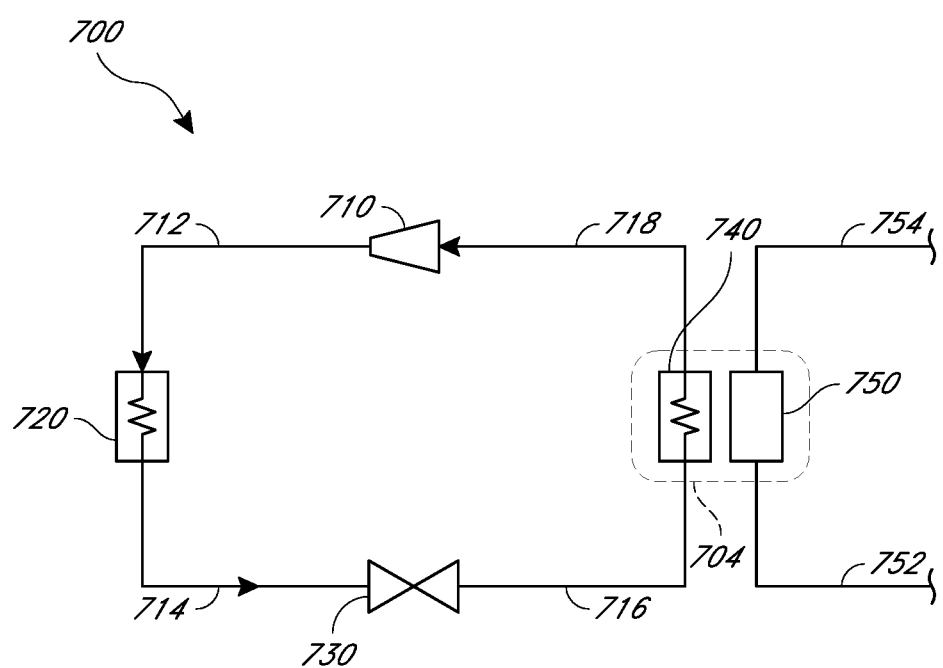
FIG. 1B is a schematic of an embodiment of a thermal energy source, that may be used with the thermal conditioning system of FIG. 1A, and that may be controlled using the control systems and methods disclose herein.

FIG. 1B is a schematic of an embodiment of a miniature vapor compression system 700. The system 700 may be used with the thermal conditioning system 600 of FIG. 1A. For instance, the system 700 may be used as the thermal energy source 604 of the thermal conditioning system 600. As shown, the system 700 includes a miniature vapor compressor 710, a condenser 720, an expansion valve 730 and an evaporator 740. The system 700 may be controlled using the control systems and methods disclose herein, for example as discussed with respect to FIGS. 2-7B.

Circulating thermal media, such as a refrigerant, enters the miniature compressor 710 from the evaporator 740 via a line 718 as a vapor. The miniature compressor 710 compresses the media to a higher pressure and temperature. The media then exits the miniature compressor 710 as a superheated vapor at a temperature and pressure at which it can be condensed.

The miniature compressor 710 is connected with the condenser 720 via a line 712. The miniature compressor 710 circulates the superheated vapor to the condenser 720 via the line 712. The compressed vapor is then cooled and condensed into a liquid by the condenser 720. Heat is thus rejected from the medium in the condenser 720, and the medium becomes a saturated liquid and vapor mixture.

The heat rejected by the condenser 720 may be controlled to reduce or eliminate heating of the vehicle from the rejected heat. In some embodiments, conditioned air from a central air conditioning system may be ducted to the condenser 720 to cool it down. In some embodiments, the heat from the condenser 720 may be routed out of the vehicle. For instance, the condenser 720 may be thermally insulated and coupled with a duct, tubing, or the like, that extends to the exterior of the vehicle, such as to body vents in the trunk or doors of the vehicle. The tubing may also include a one-way valve to allow the heated air to exit the vehicle but prevent outside air from entering the vehicle through the tubing. The tubing may also include a fan that can be selectively turned on or off to circulate the air. In some embodiments, the tubing may extend to a radiator or fan at the front of the vehicle in the engine compartment. When the vehicle moves or when the fan is turned on, the air that passes through it may expel the heated air from the tubing.

The condenser 720 is connected to an expansion valve 730 via a line 714. The expansion valve 730 may be anyl type of metering device, including but not limited to a thermostatic expansion valve, capillary tube, or any other suitable means for controlling expansion. The saturated liquid from the condenser 720 flows through the line 714 to the expansion valve 730, The saturated liquid and vapor mixture undergoes a reduction in pressure in the expansion valve 730 that lowers the temperature of the mixture.

The expansion valve 730 is connected to an evaporator 740 by a line 716, which is connected back with the compressor 710 by the line 718. The liquid and vapor mixture in the evaporator 740 evaporates and thereby draws in heat from the surroundings. A conductive plate 750, such as a cold plate, is coupled to the evaporator 740. The cold plate 750 is cooled due to heat being drawn out of the conductive plate 750 by the evaporator 740.

The evaporator 740 may also be used to form part of a dehumidifier. The dehumidifier may employ the evaporator 740 to cool intake air below its dew point and supply dehumidified air to an air circuit, such as in the "open loop air" or "closed loop air" systems described herein.

In some embodiments, the evaporator 740 may act as a condenser to provide heating when the direction of flow of the thermal medium is reversed. As shown in FIG. 1B, the thermal medium flows counterclockwise as illustrated by the arrowheads on lines 712, 714, and 718. However, the thermal medium may flow in the opposite direction, whereby the flow would be in the clockwise direction, as oriented.

A second thermal medium circulates through the conductive plate 750 via a line 752 and exits the conductive plate 750 via a line 754. In this manner, the evaporator 740 and the conductive plate 750 together provide the thermal energy which may be used with another system, such as in the thermal conditioning system 600. In some embodiments, the condenser 720 may instead be used to provide heated thermal energy. For instance, the conductive plate 750 or other heat transfer device may be provided with or near the condenser 720.

The system 700 may be controlled by one or more thermal controls to regulate the temperatures of the various components in the vehicle that are thermally conditioned. The controls may regulate the temperatures by controlling operation of the vapor compression system 700 and/or the thermal bus 600. The controls may also regulate heat exchange between the vapor compression system 700, the thermal bus 600, and the various thermally conditioned components. The controls may also adjust various system control parameters, such as compressor speed, condenser and evaporator temperatures, and temperature and flow rate of fluid circulating in the thermal bus 600. The controls regulate the temperatures based on inputs, such as vehicle occupant inputs, and based on feedback from various sensors which measure these and other system parameters. The controls may sense condenser temperature and/or an ambient temperature at vehicle and/or system startup, and regulate operation based on the condenser temperature. For example, the controls may select a heating or cooling mode of operation and/or a heating or cooling profile, and/or regulate a rate of heating or cooling. Further details of control systems and methods that may be implemented are discussed herein, for example with respect to FIGS. 2-8.

The vapor compression system 700 may be used in the various thermal systems described herein. As mentioned, the vapor compression system 700 may provide the thermal energy source 604 of FIG. 1A. In some embodiments, the vapor compression system 700 is implemented within the thermal energy source 604 Referring to FIGS. 1 and 2, the vapor compression system 700 may be in thermal communication with the main line 605 of the thermal bus 600. For example, the lines 752 and 754 of the vapor compression system 700 may be the entering and exiting portions of the line 605 of the thermal bus 600 that enter and exit, respectively, the thermal energy source 604. The vapor compression system 700 may also be used in many embodiments. In some embodiments, the thermal energy source 604 may use the evaporator 740 of the vapor compression system 700, for example to provide cooling. In some embodiments, the thermal energy source 604 may use the condenser 720 of the vapor compression system 700, for example to provide heating, as discussed herein.

Therefore, there may be multiple thermal buses 600 and vapor compression systems 700 implemented in a single vehicle, each dedicated to servicing respective components within respective regions. For example, a vehicle may include two thermal buses 600, one for each of two different thermal zones of a vehicle, with each thermal bus 600 including a vapor compression system 700. In this manner, there may be multiple miniature compressors, such as the compressor 710, within a single vehicle. Therefore, in some embodiments, a segmented compression system may be embodied where there are multiple such miniature compressors each servicing several thermal components in close proximity to the compressor. Such an arrangement allows for a more efficient and less costly thermal system, as less thermal energy and infrastructure, for example shorter fluid lines, is required to thermally service the nearby components.

Figure 2:
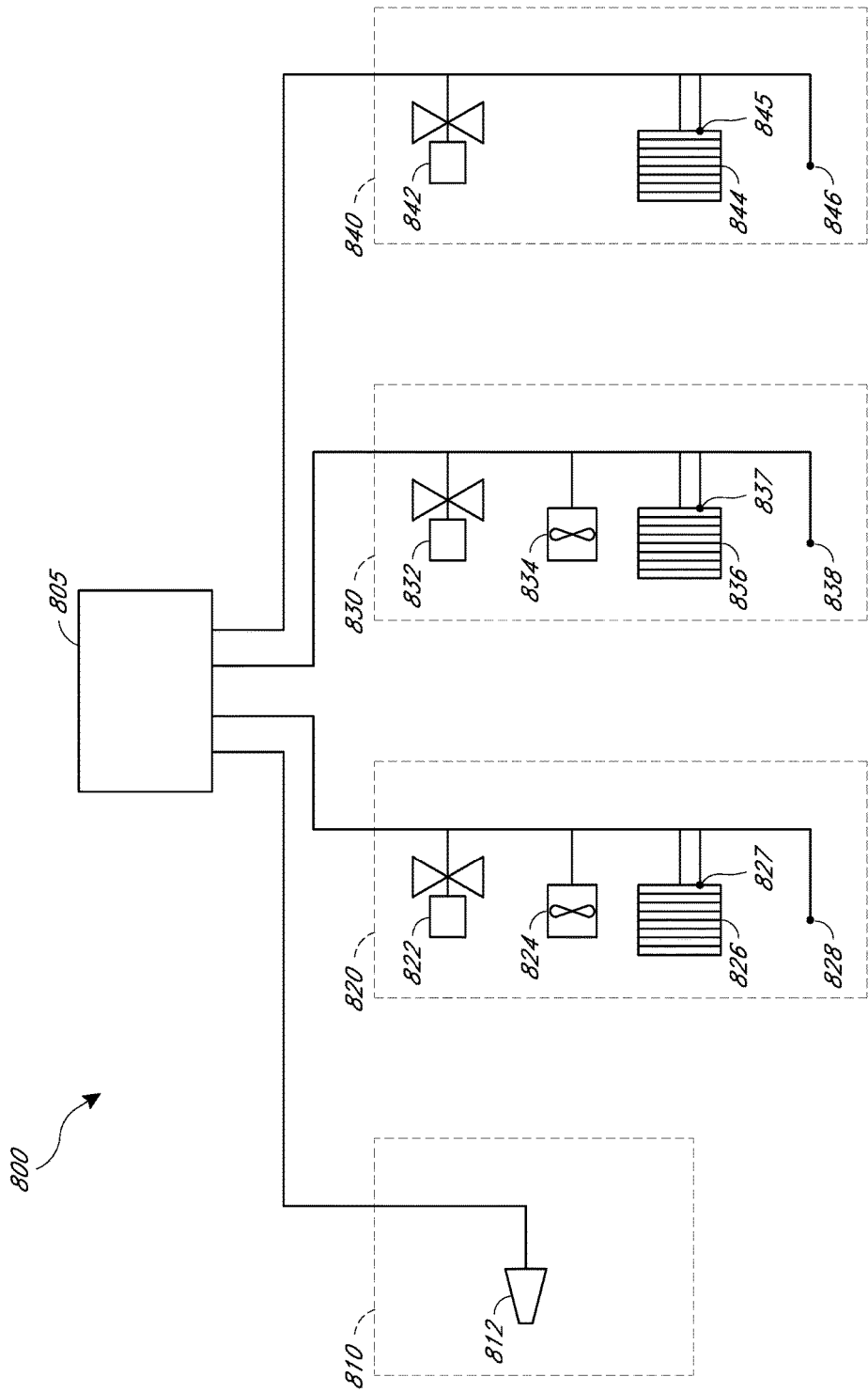
FIG. 2 is a schematic of an embodiment of a control system that may be used to control vehicle thermal conditioning systems that thermally service multiple components, such as the thermal conditioning system of FIG. 1A.

FIG. 2 is a schematic of an embodiment of a control system 800 that may be used to control a thermal conditioning system that thermally services multiple components. The control system 800 may be used for example to control the thermal conditioning system 600. In some embodiments, the control system 800 may be used for controlling the thermal output of the thermal conditioning system 600. The control system 800 may be coupled with and control various sensors and control devices. The sensors provide feedback on the thermal state of various components, and the control devices are used to adjust the provision of thermal conditioning accordingly (e.g., flow through or rate of a working fluid). The control system 800 may be used to control thermal conditioning systems according to a variety of control methods, such as those described with respect to FIGS. 4-7.

The communication among the various components of control system 800 may be accomplished via any appropriate coupling, including USB, VGA cables, coaxial cables. FireWire, serial cables, parallel cables, SCSI cables. IDE cables, SATA cables, wireless based on 802.11 or Bluetooth, or any other wired or wireless connection(s). One or more of the components in the control system 800 may also be combined into a single unit or module. In some embodiments, all of the electronic components of the control system 800 are included in a single physical unit or module.

Various components are described as being "connected," "operatively connected," and the like, to the control system 800 or components thereof. It should be appreciated that these are broad terms that include physical connections (e.g., electrical wires) and non-physical connections (e.g., radio or infrared signals). It should also be appreciated that these terms include direct connections and indirect connections (e.g., through an additional intermediate device).

As shown in FIG. 2, the control system 800 may include a controller 805. In various embodiments, the controller 805 may be a computer and may include one or more processors, one or more memories, and one or more communication mechanisms. In some embodiments, more than one controller or computer may be used to execute the modules, methods, and processes discussed herein. Additionally, the modules and processes herein may each run on one or multiple processors, on one or more computers; or the modules herein may run on dedicated hardware. The controller 805 may include or be in electrical communication with control modules of a thermal system. Such control module may include, for example, input devices such as control knobs or buttons, whether physical or touch screen display selections. The input devices may include one or more keyboards (one-handed or two-handed), mice, touch screens, voice commands and associated hardware, gesture recognition, or any other means of providing communication between a user and the controller 805. These may be adjusted, selected, etc., for instance for a user to set desired temperature levels. The controller 805 may receive this or other input from the control modules and respond by adjusting or otherwise controlling one or more components in various regions. As shown, the controller 805 may be coupled (e.g., in electrical communication) with a first region 810, a second region 820, a third region 830 and a fourth region 840. In some embodiments, the controller 805 may be coupled with fewer or more regions. The controller 805 maybe in wired or wireless communication to send and/or receive data to/from the various components with which the controller 805 is coupled.

The first region 810 may correspond to a thermal energy source, such as the thermal energy source 604, and/or a vapor compression system, such as the vapor compression system 700. The first region 810 may therefore include a miniature vapor compressor 812 to which the controller 805 is electrically coupled. The controller 805 may adjust the operation of the miniature vapor compressor 812, for example by altering the speed of the working medium. This adjustment may be based on feedback from various sensors, either within the first region 810 or within the other regions 820, 830, 840. In some embodiments, the first region 810 may include sensors for detecting the temperature, flow rate, or other data related to thermal media flowing within, into and/or out of the thermal energy source. For example, the sensors 607 and/or 608 of the thermal conditioning system 600 may be included in the first region 810 and may provide corresponding temperature data to the controller 805. These are merely some examples of how the controller 805 may be set up and interact with the first region 810 and/or other regions. Other methods of use of the control system 800 and controller 805 are discussed herein, for example with respect to FIGS. 4-7.

The controller 805 can be further coupled with and/or control various components and sensors in the second region 820. Such components and sensors may include as shown a fluid flow control device 822, a fan 824, a heat transfer device 826, and temperature sensors 827 and 828. The temperature sensor 827 is coupled (e.g., in thermal communication) with the heat transfer device 826. In some embodiments, the temperature sensor 827 may correspond with the first temperature sensor 622 and the heat transfer device 826 may correspond to the heat transfer device 616, for instance a heat exchanger, from the first region 601 of the thermal bus 600 shown in FIG. 1A. The temperature sensor 828 may be coupled (e.g., in thermal communication) with a variety of features, including the various lines of the thermal conditioning system, such as the line 626 shown in FIG. 1A. The temperature sensors 827, 828 provide temperature feedback to the controller 805 for the respective devices to which the temperature sensors 827, 828 are coupled. The controller 805 then analyzes the temperature data, along with other operating parameters or information such as a desired set temperature of a component, and if necessary adjusts the operation of one or more devices, such as the fluid flow control device 822 and/or the fan 824. The controller 805 may also adjust the operation of one or more devices in other regions, such as within the first, third or fourth regions 810, 830, 840. In some embodiments, the second region 820 may correspond to the first region 601, and the various devices and sensors therein, of the thermal bus 600 shown in FIG. 1A. These are merely some examples of how the controller 805 may be set up and interact with the second region 820 and/or other regions. Other methods of use of the control system 800 and controller 805 are discussed herein, for example with respect to FIGS. 4-7.

The controller 805 may be further coupled with and/or control various components and sensors in the third region 830. Such components and sensors may include as shown a fluid flow control device 832, a fan 834, a heat transfer device 836, and temperature sensors 837 and 838. The interaction of the controller 805 with the third region 830 may be similar to the interaction of the controller with the second region 820, as discussed above. The temperature sensor 837 is coupled (e.g., in thermal communication) with the heat transfer device 836. In some embodiments, the temperature sensor 837 may correspond with the first temperature sensor 642 and the heat transfer device 836 may correspond to the heat transfer device 636, for instance a heat exchanger, from the second region 602 of the thermal bus 600 shown in FIG. 1A. The temperature sensor 838 may be coupled (e.g., in thermal communication) with a variety of features, including the various nodes of the thermal conditioning system, such as the second thermal node 648 shown in FIG. 1A. The temperature sensors 837, 838 provide temperature feedback to the controller 805 for the respective devices to which the temperature sensors 837, 838 are coupled. The controller 805 then analyzes the temperature data, along with other operating parameters or information such as a desired set temperature of a component, and if necessary adjusts the operation of one or more devices, such as the fluid flow control device 832 and/or the fan 834. The controller 805 may also adjust the operation of one or more devices in other regions, such as within the first, second or fourth regions 810, 820, 840. In some embodiments, the third region 830 may correspond to the second region 602, and the various devices and sensors therein, of the thermal bus 600 shown in FIG. 1A. These are merely some examples of how the controller 805 may be set up and interact with the third region 830 and/or other regions. Other methods of use of the control system 800 and controller 805 are discussed herein, for example with respect to FIGS. 4-7.

The controller 805 can be further coupled with and/or control various components and sensors in the fourth region 840. Such components and sensors may include as shown a fluid flow control device 842, a heat transfer device 844, and temperature sensors 845 and 846. The interaction of the controller 805 with the fourth region 840 may be similar to the interaction of the controller with the second region 820 and third region 830, as discussed above. The temperature sensor 845 is coupled (e.g., in thermal communication) with the heat transfer device 844. In some embodiments, the temperature sensor 845 may correspond with the temperature sensor 658 and the heat transfer device 844 may correspond to the heat transfer device 656, for instance a heat exchanger, from the third region 603 of the thermal bus 600 shown in FIG. 1A. The temperature sensor 846 may be coupled (e.g., in thermal communication) with a variety of features, including the various nodes of the thermal conditioning system, such as the third thermal node 660 shown in FIG. 1A. The temperature sensors 845, 846 provide temperature feedback to the controller 805 for the respective devices to which the temperature sensors 845, 846 are coupled. The controller 805 then analyzes the temperature data, along with other operating parameters or information such as a desired set temperature of a component, and if necessary adjusts the operation of one or more devices, such as the fluid flow control device 842. The controller 805 may also adjust the operation of one or more devices in other regions, such as within the first, second or third regions 810, 820, 830. In some embodiments, the fourth region 840 may correspond to the third region 603, and the various devices and sensors therein, of the thermal bus 600 shown in FIG. 1A. These are merely some examples of how the controller 805 may be set up and interact with the fourth region 840 and/or other regions. Other methods of use of the control system 800 and controller 805 are discussed herein, for example with respect to FIGS. 3-7.

Figure 3:
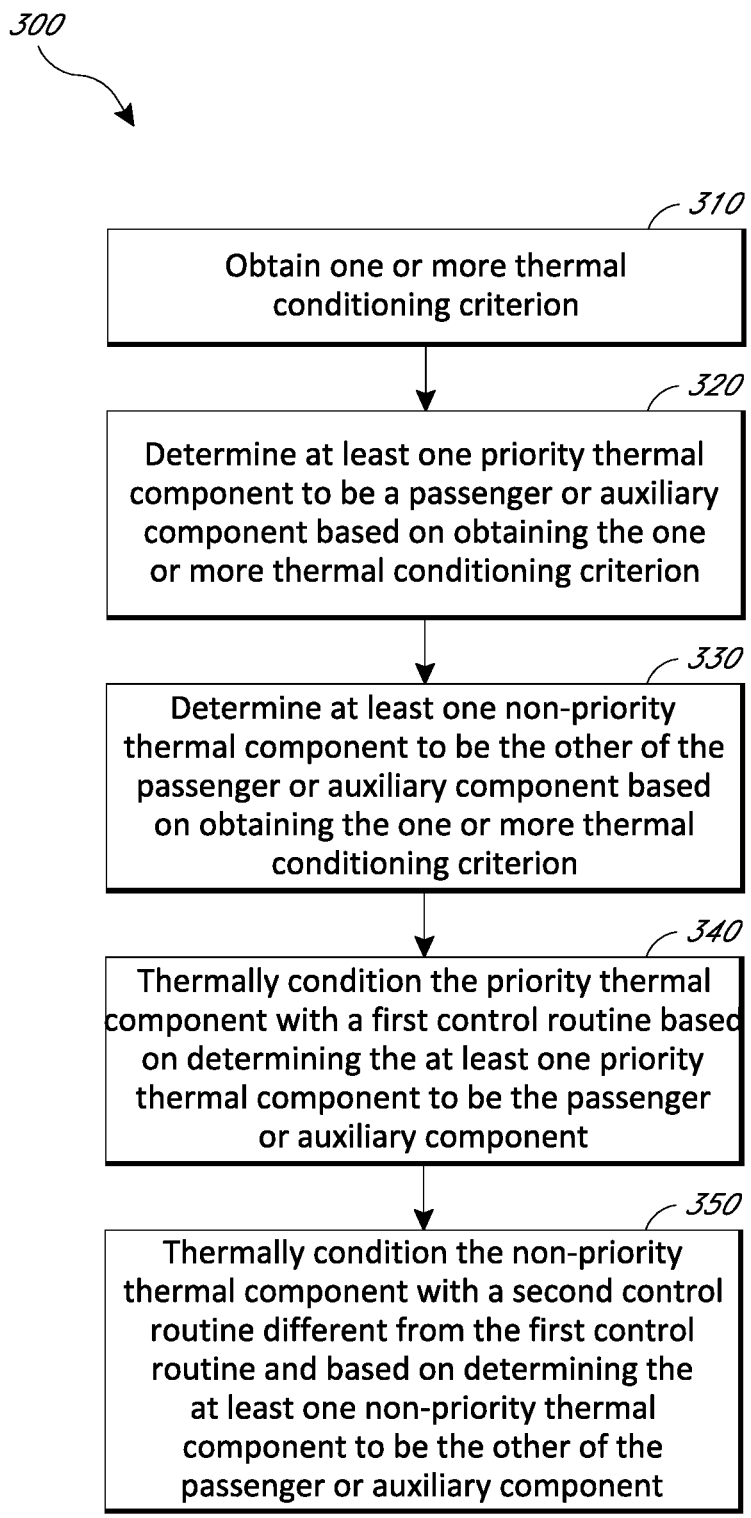
FIG. 3 is a schematic of an embodiment of a control method that may be used to control vehicle thermal conditioning systems that thermally service multiple components, such as the thermal conditioning system of FIG. 1A.

FIG. 3 is a schematic of an embodiment of a control method 300. The control method 300 may be used to control vehicle thermal conditioning systems that thermally service multiple components, such as the thermal conditioning system 600 of FIG. 1A or the thermal conditioning system 1400 of FIG. 8, other thermal conditioning systems described herein, or other suitable thermal conditioning systems. The method 300 may be performed by a variety of control systems, such as by the control system 800 of FIG. 2, other control systems described herein, or other suitable control systems. The method 300 may be a top level control method that uses various control routines described herein, such as the control methods discussed with respect to, and shown in. FIGS. 4-7B.

The method 300 may begin with step 310 wherein one or more thermal conditioning criterion are obtained. Step 310 may be performed, for example, by the controller 805 of the control system 800. In step 310, the criterion may include whether a component is enabled for thermal conditioning. For example, the criterion may include prioritizing a passenger component over an auxiliary component, where both components are enabled. Further detail of the criterion related to whether components are enable is discussed herein, for example with respect of FIG. 4. In step 310, the criterion may include a user preference. For example, a user may select or set certain preferences or settings, such as always servicing a passenger component before an auxiliary component or vice versa, prioritizing a first auxiliary component before a second auxiliary component, etc. The criterion may include an available thermal energy. For example, based on available thermal energy from a thermal energy source, it may be more efficient to thermally condition a passenger component before an auxiliary component, or vice versa, and the criterion may include prioritizing the most efficient component. The criterion may include a required thermal energy. For example, based on required thermal energy to thermally condition a passenger or auxiliary component, it may be more efficient to thermally condition the passenger component before the auxiliary component, or vice versa, and the criterion may include prioritizing the most efficient component, The criterion may include various temperature differences. For instance, the criterion may include the differences between set point temperatures of the at least one priority thermal component and the least one non-priority thermal component and, respectively, current temperatures of the at least one priority thermal component and the least one non-priority thermal component. For instance, the criterion may include comparing such differences, wherein the component having the larger or smaller difference is prioritized for conditioning. The criterion may include estimated periods to reach the set point temperatures. For example, the criterion may include estimated lengths of time to reach a set point temperature. For instance, the criterion may include comparing such periods, wherein the component having the larger or smaller period is prioritized for conditioning. The criterion may include estimated periods to reach thermal thresholds, such as thermal thresholds for a passenger or auxiliary component. For example, the criterion may include the longer or shorter of the estimated lengths of time to reach a thermal threshold, such as a "time-or-temperature" threshold, as described herein, or a given percentage or proportion of a thermal goal, such as a temperature setpoint. These are just some examples of the numerous and various types of criteria that may be used as the one or more criterion in step 310.

The criterion in step 310 may be obtained with a variety of suitable methods. In some embodiments, the criterion is a setting stored in the memory of a control system, such as memory of the controller 805 of the control system 800. Thus, the criterion may be obtained by simply querying the memory for the criterion, receiving the criterion from the memory, etc. In some embodiments, the criterion may be communicated to the control system. For example, a user may input his or her preferences to the control system 800. As another example, the criterion may be transmitted to the control system 800, such as from a wireless communications device. These are just some examples, and the one or more criterion may be obtained in a variety of other suitable manners.

The method 300 may continue with step 320 wherein at least one priority thermal component is determined to be a passenger or auxiliary component based on obtaining the one or more thermal conditioning criterion. The determination of the priority thermal component may be used to prioritize that component for thermal conditioning. In some embodiments, in step 320 determining the priority thermal component may include looking up, receiving, or otherwise simply using pre-determined settings, for example settings stored in memory of the controller 805. In some embodiments, in step 320 the controller 805 may analyze the at least one thermal conditioning criterion to determine the priority thermal component. For example, the controller 805 may use information or data related to one or more of the various thermal conditioning criteria described herein and based on that information or data may identify or otherwise determine that the passenger or auxiliary component is the priority thermal component. In step 320 the priority thermal component may be determined to be only one passenger component, or multiple passenger components, or only one auxiliary component, or multiple auxiliary components, etc. For example, in step 320 it may be determined that the at least one priority thermal component is a first seat, or a first and second seat, or a bin, or a first cup holder, or a bin and a cup holder, or a bin and two cup holders, etc. Step 320 may be performed, for example, by the controller 805 of the control system 800.

In some embodiments of the method 300, steps 310 and 320 may be combined to identify the priority thermal component for thermal conditioning. For example, the criterion may exist as a known setting and the controller 805 may simply prioritize the passenger or auxiliary component based on that known setting.

The method 300 may continue with step 330 wherein at least one non-priority thermal component is determined to be the other of the passenger or auxiliary component based on obtaining the one or more thermal conditioning criterion. Step 330 may have the same or similar features as step 320 described above but as applied to the non-priority thermal component. In some embodiments, in step 330 determining the non-priority thermal component may include looking up, receiving, or otherwise simply using pre-determined settings, for example settings stored in memory of the controller 805. In some embodiments, step 330 includes selecting the other of the passenger or auxiliary component as the non-priority component, based on the determined priority component in step 320. In some embodiments of the method 300, steps 310 and 330 may be combined to identify the non-priority thermal component for thermal conditioning. For example, the criterion may exist as a known setting and the controller 805 may simply non-prioritize the passenger or auxiliary component based on that known setting.

These are just some examples of how the priority and non-priority thermal components may be identified or otherwise determined in steps 310, 320 and 330 of the method 300. It will be appreciated that a variety of other suitable techniques for prioritizing the thermal components may be implemented in the method 300. Regardless of the technique used to determine the priority and non-priority thermal components, the various control routines described herein may be used based on that determination.

The method 300 may continue with step 340 wherein the priority thermal component is thermally conditioned using a first control routine. In step 340, the priority thermal component may be thermally conditioned using any of the thermal conditioning systems and control systems described herein, such as the thermal system 600 of FIG. 1A, the thermal system 1400 of FIG. 8, the control system 800 of FIG. 3, or other suitable thermal and control systems. In step 340, the priority thermal component may be conditioned using the various control routines described herein, such as those described with respect to FIGS. 4-7B. In step 340, the first control routine may be based on determining the at least one priority thermal component to be the passenger or auxiliary component. That is, the particular control routine used in step 340 may be based on whether the passenger or auxiliary component is identified as the priority thermal component. Thus, in step 340 the first control routine may be specific to the at least one component that is determined to be the at least one priority thermal component. For example, in step 340 it may be determined that the passenger component is the priority thermal component, in which case a control method 1000 may be performed as shown in FIG. 4, and as further described herein. In that case, in step 340 various passenger component-specific control routines and steps may be performed, as described herein. As another example, in step 340 it may be determined that the auxiliary component is the priority thermal component, in which case a variation of the control method 1000 of FIG. 4 may be performed where, for instance, a bin or cup holder is prioritized for thermal conditioning, as further described herein. In that case, in step 340 various auxiliary component-specific control routines and steps may be performed, as described herein.

The method 300 may continue with step 350 wherein the non-priority thermal component is thermally conditioned. In step 350, the non-priority thermal component may be thermally conditioned using a second control routine different from the first control routine. In step 350, the second control routine may be based on determining the at least one non-priority thermal component to be the other of the passenger or auxiliary component. That is, if the passenger component is determined in step 320 to be the priority component, then in step 350 the "other" component may be the auxiliary component, and vice versa.

Step 350 may have the same or similar features as step 340 described above, but as applied to the non-priority component. Therefore, for example, in step 350, the non-priority thermal component may be conditioned using the various control routines described herein, such as those described with respect to FIGS. 4-7B. In step 350, the second control routine may be based on determining the at least one non-priority thermal component to be the passenger or auxiliary component. That is, the particular control routine used in step 350 may be based on whether the passenger or auxiliary component is identified as the non-priority thermal component. Thus, in step 350 the second control routine may be specific to the at least one component that is determined to be the at least one non-priority thermal component. For example, in step 350 it may be determined that the auxiliary component is the non-priority thermal component, in which case a control method 1000 may be performed as shown in FIG. 4, and as further described herein. In that case, in step 350 various auxiliary component-specific control routines and steps may be performed, as described herein. As another example, in step 350 it may be determined that the passenger component is the non-priority thermal component, in which case a variation of the control method 1000 of FIG. 4 may be performed where, for instance, a passenger component is not prioritized for thermal conditioning, as further described herein. In that case, in step 350 various passenger component-specific control routines and steps may be performed, as described herein.

The overall method 300 may use or call up various other routines, subroutines, etc. as described herein, for example with respect to FIGS. 4-7B. These routines, subroutines, etc. that are used may be based on which component was prioritized and which component was not prioritized in the method 300, as further described herein, for example with respect to FIGS. 4-7B.

Figure 4A:
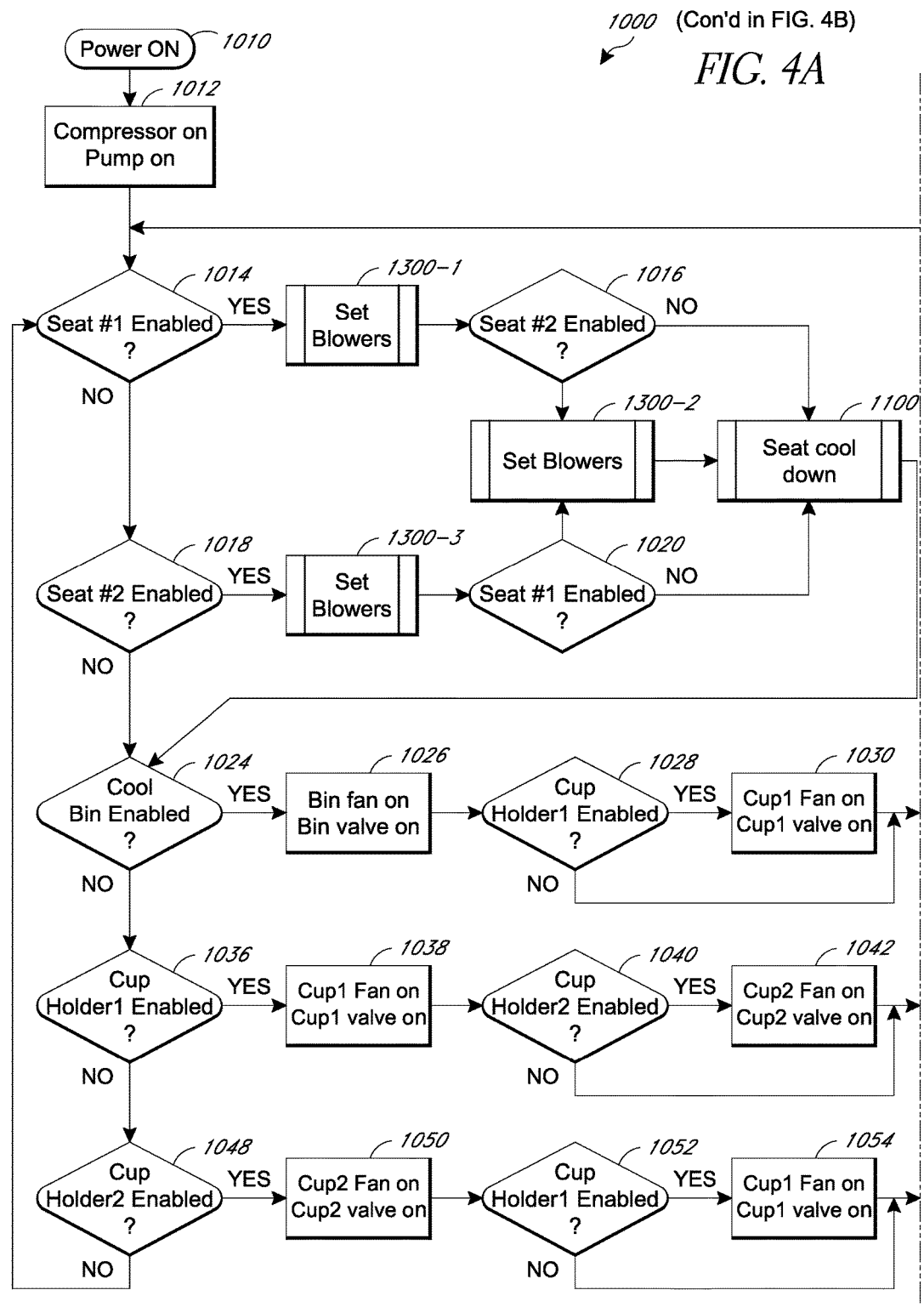
FIG. 4, as shown in FIG. 4A and continued in FIG. 4B, is a schematic of an embodiment of a control method that may be used with the control system of FIG. 2 and/or the control method of FIG. 3 to control vehicle thermal conditioning systems that thermally service multiple components, such as the thermal conditioning system of FIG. 1A.

FIG. 4, as shown in FIG. 4A and continued in FIG. 4B, is a schematic of an embodiment of a control method 1000. The control method 1000 may be used with control systems for vehicle thermal conditioning systems that thermally service multiple components. In some embodiments, the control method 1000 may be used with the control system 800 of FIG. 2. In some embodiments, the control method 1000 may be used with the control system 800 to control the vehicle thermal conditioning system 600 of FIG. 1A or system 1400 of FIG. 8. These are just some examples of the control systems and thermal systems that may be controlled using the control method 1000. Therefore, while the control method 1000 may be discussed primarily in the context of particular embodiments of control and thermal systems, it is understood that use of the control method 1000 is not limited to only those embodiments. The control method 1000 may be used with a variety of thermal conditioning systems and control systems.

The control method 1000 provides a procedure for efficient use of a multi-component thermal conditioning system, including but not limited to the thermal conditioning system 600. The control method 1000 provides for efficient use of such thermal systems, in part, because of prioritization aspects of the control method 1000 performed based on the identity of the prioritized component (for example, passenger or auxiliary), described in detail below. The control method 1000 also provides for efficient use of such thermal systems, in part, because of variability aspects of the control method 1000. For example, the control method 1000 may thermally condition prioritized components over others for delivering thermal conditioning. The prioritization may include, for example, servicing some components before others. Such determination of the prioritized and non-prioritized components may be performed by the method 300, as shown in and described with respect to FIG. 3. Thus, the method 300 may be performed before or otherwise in conjunction with the method 1000. For example, the method 300 may be performed to determine the priority and non-priority thermal component, and the thermal conditioning steps of method 300, such as steps 340 and 350, may include steps from the method 1000. Further, as described herein, the method 1000 may use various other subroutines or control methods. Thus, for example, the method 300 may be performed to determine the priority and non-priority thermal component, and the thermal conditioning steps of method 300, such as steps 340 and 350, may include steps from the method 1000 as well as steps from the various other subroutines and methods used by the method 1000, as described in detail below.

In some embodiments, the method 1000 may further analyze various thermal conditioning criteria, such as enablement. For example, some thermal components may be enabled, for example selected, for thermal conditioning, while others may not be enabled, for example not selected, for thermal conditioning, and the control method 1000 may alter the manner in which thermal conditioning is provided based on which components are enabled and which are not enabled. In some embodiments, the criteria may include determining whether the at least one passenger component is enabled, determining whether the at least one auxiliary component is enabled, and prioritizing the at least one passenger component in response to determining that the at least one passenger component is enabled. This may be performed by the method 300, for example in steps 310, 320 and/or 330, and/or by various steps of the method 100 as described below.

As further example of thermal conditioning criteria, in some embodiments, some components may have relatively higher demand for thermal conditioning (for example if set to relatively high or low desired temperatures or if there is a relatively large difference between the desired and current temperature of the component), while others may have relatively low demand for thermal conditioning (for example if set to relatively median desired temperature or if there is a relatively small difference between the desired and current temperature of the component), and the control method 1000 may alter the manner in which thermal conditioning is provided based on such varying demands. The control method 1000 may provide for prioritized and/or variable thermal servicing of multiple components in a variety of aspects, including but not limited to thermally servicing some, none or all components, thermally servicing different components simultaneously with varying levels of thermal conditioning to each component (for example, with customized fan speeds for different components based on current thermal demands of each component), thermally servicing with varying levels of power, thermally servicing with varying compressor speeds, etc. These are just some examples of the multitude of aspects and scenarios that the control method 1000 provides. Further details of the control method 1000 are provided herein.

As shown in FIG. 4, the control method 1000 begins with step 1010 wherein the control system is powered on. For example, the controller 805 of the control system 800 may have an on/off switch. The control system may be turned on manually, for example with a switch, or automatically, for example when the thermal conditioning system is turned on and/or when vehicle engine starts. In some embodiments, the control system may stay powered on even when the vehicle engine is turned off The control method 1000 next moves to step 1012 wherein the compressor and/or pump is/are turned on. In some embodiments, the compressor 812 or 710 is turned on. In some embodiments, the pump 606 is turned on. In some embodiments, the pump 672 is turned on. The compressor and/or pump may be turned on manually, for example with a switch, or automatically, for example when the thermal conditioning system is turned on and/or when vehicle engine starts. In some embodiments, the compressor and/or pump may stay turned on even when the vehicle engine is turned off. In some embodiments, the compressor and/or pump may be turned on before a particular node is active for thermal conditioning. For example, in a "pre-cool" condition, the compressor may be cooling a working fluid in preparation for thermally servicing one or more nodes. In some embodiments, the compressor and/or pump may be turned on simultaneously or after a node is activated for thermal conditioning. For example, to conserve energy, the compressor may be turned on to cool the working fluid after a node has been activated, for example selected, for thermal conditioning.

Step 1012 may also include enablement of particular thermal conditioning modes or operations. In some embodiments, thermal conditioning modes or operations may include selecting whether to thermally condition or service one or more seats, one or more bins, one or more cup holders, one or more thermal regions or zones, other components, etc. For example, a user may select one or more of the regions 810, 820, 830, 840 using the controller 805. Or, for example, a user may select one or more of the components within these or other regions for thermally conditioning. In some embodiments, one or more thermal nodes may be selected and thereby enabled for thermal conditioning. In some embodiments, a first seat, a second seat, a cool bin, a first cup holder, and/or a second cup holder may be selected and thereby enabled for thermal conditioning. For example, the first thermal node 628 (e.g. a seat), the second thermal node 648 (e.g. a bin), and/or a third thermal node 660 (for example a cup holder) may be selected and thereby enabled for thermal conditioning. As mentioned, in step 1012 the compressor and/or pump may be turned on before, during or after selection or activation of particular nodes. Thus, these various approaches to enabling particular thermal conditioning modes or operations may be performed before, during, or after turning on the compressor and/or pump.

These and other nodes or components may be enabled in a variety of suitable manners. In some embodiments, these and other nodes or components may be enabled manually or affirmatively, for example by an occupant of the vehicle. In some embodiments, these and other nodes or components may be selected automatically or passively, for example by the control system 800 in response to particular received data from various sensors. For instance, the control system 800 may detect with sensor 846 that an increase or decrease in temperature has occurred in the fourth region 840 and may automatically respond by selecting and enabling thermally conditioning the fourth region 840 by heating or cooling. In some embodiments, sensors may detect an occupant of a particular seat and thermal conditioning for that seat may be enabled. For example, the control system 800 may detect with sensor 828 a change in temperature of a seat in the second region 820 and may automatically respond by selecting and enabling thermal conditioning of the second region 820 to provide heating or cooling.

Further, the various nodes and components may be enabled for thermal conditioning at varying levels, including but not limited to varying temperatures and/or varying times to achieve desired levels (for example, varying times to reach a desired temperatures). In some embodiments, one or more components may be enabled or selected for thermally conditioning at low temperatures (i.e. cooling), medium temperatures (i.e. ambient surroundings temperature) or high temperatures (i.e. heating). In some embodiments, one or more components may be each enabled or selected for thermally conditioning at different particular temperatures, which may include freezing temperatures less than or equal to zero degrees Celsius. In sonic embodiments, one or more components may be enabled or selected for thermally conditioning in a relatively short amount of time.

In some embodiments, one or more components may be enabled or selected for thermally conditioning in a relatively long amount of time.

These are merely some examples of how particular components and regions may be selected/enabled for thermal conditioning in step 1012. Other suitable approaches and combinations of components/regions may be implemented.

After step 1012, the control method 1000 next moves to decision step 1014 wherein it is determined whether a first passenger component, such as a first seat as shown, is enabled for thermal conditioning. The method 1000 may first analyze whether the first seat is enabled based on prioritizing the first passenger component, as described above. However, in some embodiments, the auxiliary component may be prioritized, and thus the method 1000 may instead begin with analyzing whether one or more auxiliary components, such as a bin, first cup holder, and/or second cup holder, are enabled. In that case, the method 100 may instead perform decision steps 1024, 1036 or 1048 before performing decision step 1014. Therefore, the particular embodiment of the method 1000 shown is based on prioritizing the first and second passenger components, but it should be understood that variations of the method 1000 may be performed based on prioritizing one or more of the auxiliary components.

In some embodiments, in decision step 1014 it is determined whether a first seat in the first region 601 or second region 820 is enabled for thermal conditioning. In some embodiments, the control system 800 determines whether a first seat is enabled, for example by receiving inputs to the controller 805. Such inputs may be manually or automatically sent to the controller 805, for example from the temperature sensor 828. In some embodiments, a user may manually select whether to enable the first seat, for example by flipping a switch or making a selection on a touch screen display that is in communication with the controller 805. These are just some examples of how it may be determined whether a first seat is enabled for thermal conditioning. Other suitable approaches may be implemented.

If it is determined in decision step 1014 that the first seat is enabled for thermal conditioning, then the control method 1000 moves to subroutine 1300-1 wherein the speed and/or other settings are set for one or more blowers, such as a fan, for the first seat. Subroutine 1300-1 may involve the steps of method 1300A, as shown in and described herein with respect to FIG. 7A, and as applied to the blower or blowers for a first seat. In some embodiments, the speed of the fan 618 or 824 may be set.

After subroutine 1300-1, the control method 1000 next moves to decision step 1016 wherein it is determined whether a second seat is enabled for thermal conditioning. Decision step 1016 may have the same or similar features with regards to a second seat as decision step 1014 has with regards to a first seat. In some embodiments, in decision step 1016 it is determined whether a second seat in the second region 602 or third region 830 is enabled for thermal conditioning. In some embodiments, the control system 800 determines whether a second seat is enabled, for example by receiving inputs to the controller 805. Such inputs may be manually or automatically sent to the controller 805, for example from the temperature sensor 828. In some embodiments, a user may manually select whether to enable the second seat, for example by flipping a switch or making a selection on a touch screen display that is in communication with the controller 805. These are just some examples of how it may be determined whether a second seat is enabled for thermal conditioning. Other suitable approaches may be implemented.

If it is determined in decision step 1016 that the second seat is not enabled for thermal conditioning, then the control method 1000 moves to subroutine 1100, wherein the first seat only is cooled down. It is understood that subroutine 1100 may in addition or instead provide heating and/or that it may be performed for the first seat only, the second seat only, or the first and second seats, depending on the particular path taken in the control method 1000 to reach subroutine 1100. Therefore, discussion of subroutine 1100 as applied to any particular seat or seats for either cooling or heating is not meant to limit the scope of subroutine 1100 to only those contexts. Here, when subroutine 1100 is performed immediately after decision step 1016, the first seat only is cooled down. That is, when subroutine 1100 is performed immediately after decision step 1016, the subroutine 1100 is performed as it relates to the first seat. However, as mentioned, performance of subroutine 1100 after other steps in the control method 1000 may involve heating or cooling down only the first and second seat, or only the second seat, as described herein. Further details of the subroutine 1100 are shown in and described herein with respect to FIG. 5A. After subroutine 1100, the control method then moves to decision step 1024, as described below.

If it is determined in decision step 1016 that the second seat is enabled for thermal conditioning, then the control method 1000 moves to subroutine 1300-2 wherein blowers are set for one of the seats. It is understood that subroutine 1300-2 may be performed for the first or second seat, depending on the particular path taken in the control method 1000 to reach subroutine 1300-2. Therefore, discussion of subroutine 1300-2 as applied to any particular seat is not meant to limit the scope of subroutine 1300-2 to only those contexts. Here, when performing subroutine 1300-2 after decision step 1016, the subroutine 1300-2 may be performed as it relates to the second seat. That is, when subroutine 1300-2 is performed after decision step 1016, the speed or other settings are set for one or more blowers, such as a fan, for the second seat. Subroutine 1300-2 may involve the steps of method 1300A, as shown in and described herein with respect to FIG. 7A, and as applied to the blower or blowers for the second seat. In some embodiments, the speed of the fan 638 or 834 may be set.

After subroutine 1300-2, the control method 1000 moves to subroutine 1100, wherein one or more seats are cooled down. As mentioned, the subroutine 1100 may in addition or instead provide heating and/or it may be performed for the first seat only, the second seat only, or the first and second seats, depending on the particular path taken in the control method 1000 to reach subroutine 1100. Here, when subroutine 1100 is performed after subroutine 1300-2, the subroutine 1100 is performed as it relates to the first and second seats. That is, when subroutine 1100 is performed after subroutine 1300-2, the first and second seats are cooled down. However, as mentioned, performance of subroutine 1100 after other steps in the control method 1000 may involve heating or cooling down only the first or second seat, as described herein. Further details of the subroutine 1100 are shown in and described herein with respect to FIG. 5A. After subroutine 1100, the control method then moves to decision step 1024, as described below.

If it is determined in decision step 1014 that the first seat is not enabled for thermal conditioning, then the control method 1000 moves to decision step 1018 wherein it is determined whether the second seat is enabled for thermal conditioning. Decision step 1018 may have the same or similar features as decision step 1016. If it is determined in decision step 1018 that the second seat is not enabled for thermal conditioning, then the control method 1000 moves to decision step 1024, as described below.

Further, decision step 1018 may be performed after decision step 1014 based on prioritizing the first seat overall and based on prioritizing the second seat after the first seat. However, in some embodiments, and as discussed above with respect to decision step 1014, the first seat may not be prioritized, nor may the second seat be prioritized after the first seat. For example, the second seat may be prioritized, in which case the method 1000 may begin with decision step 1018. As another example, the auxiliary components may be prioritized, in whith case decision steps 1024, 1036, and/or 1048 may be performed before decision step 1018. As another example, the second seat may be prioritized over the first seat, which may be prioritized over the auxiliary components. In that case, decision step 1018 may first be performed, then decision step 1014, and then one or more of the decision steps 1024, 1036 and/or 1048 may be performed. Therefore, as mentioned, the particular embodiment of the method 1000 shown in FIG. 4 is just an example, and many other variations may be implemented based on which components are prioritized or not prioritized relative to each other.

If it is determined in decision step 1018 that the second seat is enabled for thermal conditioning, then the control method 1000 moves to subroutine 1300-3 wherein the speed and/or other settings are set for one or more blowers, such as a fan, for the second seat. In some embodiments, the subroutine 1300-3 may have the same or similar features as the subroutine 1300-2 as performed after decision step 1016 (discussed above). For example, subroutine 1300-3 may involve the steps of method 1300A, as shown in and described herein with respect to FIG. 7A, and as applied to the blower or blowers for a second seat. In some embodiments, in subroutine 1300-3 the speed of the fan 638 or 834 may be set.

After subroutine 1300-3, the control method 1000 next moves to decision step 1020 wherein it is determined whether a first seat is enabled for thermal conditioning. Decision step 1020 may have the same or similar features as decision step 1014. Further, even it was determined in previous step 1014 that the first seat was not enabled, it may be determined in decision step 1020 that the first seat is enabled. For example, when decision step 1014 is performed, the first seat may not be enabled, but when decision step 1020 is later performed the first seat may then be enabled. Thus, the first seat may be enabled at different time points during the performance of the control method 1000. In some embodiments, a user may first enable thermal conditioning for the second seat and then enable thermal conditioning for the first seat. Under this scenario, it may be possible that decision step 1014 is performed before the first seat was enabled and that decision step 1020 was performed after the first seat was enabled. This is merely one example and other scenarios may apply.

If it is determined in decision step 1020 that the first seat is not enabled for thermal conditioning, then the control method 1000 moves to subroutine 1100, wherein one or more seats are cooled down. As mentioned, the subroutine 1100 may in addition or instead provide heating and/or it may be performed for the first seat only, the second seat only, or the first and second seats, depending on the particular path taken in the control method 1000 to reach subroutine 1100. Here, when subroutine 1100 is performed immediately after decision step 1020, the subroutine 1100 is performed as it relates to the second seat only. That is, when subroutine 1100 is performed immediately after decision step 1020, the second seat only is cooled down. Further details of the subroutine 1100 are shown in and described herein with respect to FIG. 5A. After subroutine 1100, the control method then moves to decision step 1024, as described below.

If it is determined in decision step 1020 that the first seat is enabled for thermal conditioning, then the control method 1000 moves to subroutine 1300-2 wherein blowers are set for one of the seats. As mentioned, the subroutine 1300-2 may be performed for the first or second seat, depending on the particular path taken in the control method 1000 to reach subroutine 1300-2. Here, when performing subroutine 1300-2 after decision step 1020, the subroutine 1300-2 is performed as it relates to the first seat. That is, when subroutine 1300-2 is performed after decision step 1020, the speed or other settings are set for one or more blowers, such as a fan, for the first seat. Subroutine 1300-2 may involve the steps of method 1300A, as shown in and described herein with respect to FIG. 7A, and as applied to the blower or blowers for the first seat. In some embodiments, the speed of the fan 618 or 824 may be set. In some embodiments, the subroutine 1300-2 as performed after decision step 1020 may have the same or similar features as subroutine 1300-1, which is described above.

After subroutine 1300-2, the control method 1000 moves to subroutine 1100, wherein one or more of the seats are cooled down. As mentioned, the subroutine 1100 may in addition or instead provide heating and/or it may be performed for the first seat only, the second seat only, or the first and second seats, depending on the particular path taken in the control method 1000 to reach subroutine 1100. Here, when subroutine 1100 is performed after subroutine 1300-2, the subroutine 1100 is performed as it relates to the first and second seats. That is, when subroutine 1100 is performed after subroutine 1300-2, the first and second seat are cooled down. Further details of the subroutine 1100 are shown in and described herein with respect to FIG. 5A. After subroutine 1100, the control method then moves to decision step 1024, as described below.

Prioritization of Bin

At decision step 1024, it is determined whether bin cooling is enabled. In some embodiments, it may be determined whether bin heating is enabled. Thus, here and elsewhere throughout this disclosure, discussion of thermal conditioning in the context of cooling is not meant to limit the scope of the disclosure to only cooling. Determination of whether bin cooling is enabled in decision step 1024 may be performed in a variety of ways. In some embodiments, decision step 102.4 as applied to the bin may have the same or similar features as decision steps 1014 or 1018 as applied to, respectively, the first or second seats. In some embodiments, in decision step 1024 it is determined whether a bin in the second region 602 or third region 830 is enabled for cooling. In some embodiments, the control system 800 determines whether the bin is enabled, for example by receiving inputs to the controller 805. Such inputs may be manually or automatically sent to the controller 805, for example from the temperature sensor 838. In some embodiments, such inputs may be sent a controller from the temperature sensor 644. In some embodiments, a user may manually select whether to enable the bin, for example by flipping a switch or making a selection on a touch screen display that is in communication with the controller 805. These are just some examples of how it may be determined whether the bin is enabled for thermal conditioning, such as cooling. Other suitable approaches may be implemented.

Further, decision step 1024 may be performed after decision step 1018 based on prioritizing the seats over the auxiliary components. However, in some embodiments, and as discussed above with respect to decision steps 1014 and 1018, the seats may not be prioritized. For example, the cool bin may be prioritized, in which case the method 1000 may begin with decision step 1024. Therefore, as mentioned, the particular embodiment of the method 1000 shown in FIG. 4 is just an example, and many other variations may be implemented based on which components are prioritized or not prioritized relative to each other.

If it is determined in decision step 1024 that bin cooling is enabled, then the control method 1000 moves to step 1026, described below. If it is determined in decision step 1024 that bin cooling is not enabled, then the control method 1000 moves to decision step 1036, described below.

At step 1026, the fan and valve for the bin are switched on. In some embodiments of step 1026, the fan is switched on to move air and the valve is switched on to allow or otherwise regulate flow of thermal media through the valve. In some embodiments of step 1026, the fan 638 is turned on and the valve 634 is opened. By "opened" it is meant that thermal media is allowed to flow through the valve. After step 1026, the control method then moves to decision step 1028, described below.

At decision step 1028, it is determined whether a first cup holder is enabled for thermal conditioning, for example enabled for cooling and/or heating. Determination of whether a first cup holder is enabled for thermal conditioning in decision step 1036 may be performed in a variety of ways. In some embodiments, decision step 1036 as applied to a first cup holder may have the same or similar features as decision step 1024 as applied to a bin or decision steps 1014 or 1018 as applied to, respectively, the first or second seats. In some embodiments, in decision step 1036 it is determined whether a first cup holder in the third region 603 or fourth region 840 is enabled for thermal conditioning. In some embodiments, the control system 800 determines whether a first cup holder is enabled, for example by receiving inputs to the controller 805. Such inputs may be manually or automatically sent to the controller 805, for example from the temperature sensor 846. In some embodiments, a user may manually select whether to enable the first cup holder, for example by flipping a switch or making a selection on a touch screen display that is in communication with the controller 805. These are just some examples of how it may be determined whether a first cup holder is enabled for thermal conditioning. Other suitable approaches may be implemented.

If it is determined in decision step 1028 that thermal conditioning of the first cup holder is enabled, then the control method 1000 moves to step 1030, described below. If it is determined in decision step 1028 that thermal conditioning of the first cup holder is not enabled, then the control method 1000 bypasses step 1030 and moves to decision step 1032, described below.

At step 1030, the fan and valve for the first cup holder are switched on. Therefore, the first cup holder may be thermally conditioned using convective heat transfer. However, in some embodiments, the first cup holder may be thermally conditioned using conductive heat transfer. For example, the fan may be replaced with a conductive plate, which may be, for instance, the heat exchanger 656 used to conductively thermally condition the third node 660 as shown in and described with respect to FIG. 1A. As shown in FIG. 4A, thermal conditioning of the first cup holder may use a fan. In some embodiments of step 1030, the fan is switched on to move air and the valve is switched on to allow or otherwise regulate flow of thermal media through the valve. In some embodiments of step 1030, the valve 654 is opened, By "opened" it is meant that thermal media is allowed to flow through the valve.

At decision step 1032, it is determined whether a second cup holder is enabled for thermal conditioning, for example enabled for cooling and/or heating. Determination of whether a second cup holder is enabled for thermal conditioning in decision step 1032 may be performed in a variety of ways. In some embodiments, decision step 1032 as applied to a second cup holder may have the same or similar features as decision step 1024 as applied to a bin or decision steps 1014 or 1018 as applied to, respectively, the first or second seats. In some embodiments, in decision step 1032 it is determined whether a second cup holder in the third region 603 or fourth region 840 is enabled for thermal conditioning. In some embodiments, the control system 800 determines whether a second cup holder is enabled, for example by receiving inputs to the controller 805. Such inputs may be manually or automatically sent to the controller 805, for example from the temperature sensor 846. In some embodiments, a user may manually select whether to enable the second cup holder, for example by flipping a switch or making a selection on a touch screen display that is in communication with the controller 805. These are just some examples of how it may be determined whether a second cup holder is enabled for thermal conditioning. Other suitable approaches may be implemented.

If it is determined in decision step 1032 that thermal conditioning of the second cup holder is enabled, then the control method 1000 moves to step 1034, described below. If it is determined in decision step 1032 that thermal conditioning of the second cup holder is not enabled, then the control method 1000 bypasses step 1034 and moves to subroutine 1200-1, described below.

At step 1034, the fan and valve for the second cup holder are switched on. Therefore, the second cup holder may be thermally conditioned using convective heat transfer. However, in some embodiments, the second cup holder may be thermally conditioned using conductive heat transfer. For example, the fan may be replaced with a conductive plate, which may be, for instance, the heat exchanger 656 used to thermally condition the third node 660 as shown in and described with respect to FIG. 1A. Step 1034 as applied to the second cup holder may have the same or similar features as the step 1028 as applied to the first cup holder. As shown in FIG. 4A, thermal conditioning of the second cup holder may use a fan. In some embodiments of step 1034, the fan is switched on to move air and the valve is switched on to allow or otherwise regulate flow of thermal media through the valve. In some embodiments of step 1034, the valve 654 is opened. By "opened" it is meant that thermal media is allowed to flow through the valve. After step 1034, the control method 1000 next moves to subroutine 1200-1.

At subroutine 1200-1, the temperature is controlled for the bin and for neither, either or both of the first and second cup holders. Subroutine 1200-1 may involve the steps of method 1200, as shown in and described herein with respect to FIG. 6, and as applied to the bin and to neither, either or both of the first and second cup holders. As further discussed with respect to the method 1200, the temperature may be controlled in a variety of aspects, including varying the compressor speed. Therefore, in some embodiments of subroutine 1200-1, a compressor speed is selected to control the temperature for the bin and for neither, either or both of the first and second cup holders. After subroutine 1200-1, the control method 1000 moves back to decision step 1014, and proceeds as described above.

In some embodiments of subroutine 1200-1, the temperature is controlled for the bin and not for either of the first or second cup holders. For example, it may be determined at previous decision step 1028 that the first cup holder is not enabled for thermal conditioning and at previous decision step 1032 that the second cup holder is not enabled for thermal conditioning. In sonic embodiments of subroutine 1200-1, the temperature is controlled for the bin and the first cup holder but not for the second cup holder. For example, it may be determined at previous decision step 1028 that the first cup holder is enabled for thermal conditioning and at previous decision step 1032 that the second cup holder is not enabled for thermal conditioning. In some embodiments of subroutine 1200-1, the temperature is controlled for the bin and for both the first and second cup holders. For example, it may be determined at previous decision step 1028 that the first cup holder is enabled for thermal conditioning and at previous decision step 1032 that the second cup holder is enabled for thermal conditioning.

Prioritization of First Cup Holder

At decision step 1036, it is determined whether a first cup holder is enabled for thermal conditioning, for example enabled for cooling and/or heating. Decision step 1036 may have the same or similar features as decision step 1028, described above.

Further, decision step 1036 may be performed after decision step 1024 based on prioritizing the first cup holder over other auxiliary components, such as the bin or second cup holder. However, in some embodiments, there may be a different priority of auxiliary components. For example, the first cup holder may be prioritized, in which case decision step 1036 may be performed before decision step 1024. Further, as mentioned with respect to steps 1014, 1018 and 1024, the auxiliary components may be prioritized over the passenger components. In that case, the method 1000 may begin with the decision step 1036, assuming the first cup holder is prioritized over the other auxiliary components. Therefore, as mentioned, the particular embodiment of the method 1000 shown in FIG. 4 is just an example, and many other variations may be implemented based on which components are prioritized or not prioritized relative to each other.

If it is determined in decision step 1036 that thermal conditioning of the first cup holder is enabled, then the control method 1000 moves to step 1038, described below. If it is determined in decision step 1036 that thermal conditioning of the first cup holder is not enabled, then the control method 1000 moves to decision step 1048, described below.

At step 1038, the fan and valve for the first cup holder are switched on. Step 1038 may have the same or similar features as step 1030, described above. After step 1038, the control method next moves to decision step 1040, described below.

At decision step 1040, it is determined whether a second cup holder is enabled for thermal conditioning. Decision step 1040 may have the same or similar features as decision step 1032, described above. If it is determined in decision step 1040 that thermal conditioning of the second cup holder is enabled, then the control method 1000 moves to step 1042, described below. If it is determined in decision step 1040 that thermal conditioning of the second cup holder is not enabled, then the control method 1000 bypasses step 1042 and moves to decision step 1044, described below.

At step 1042, the fan and valve for the second cup holder are switched on. Step 1042 may the same or similar features as step 1034, described above. After step 1042, the control method 1000 next moves to decision step 1044, described below.

At decision step 1044, it is determined whether bin cooling is enabled. Decision step 1044 may have the same or similar features as decision step 1024, described above. If it is determined in decision step 1044 that bin cooling is enabled, then the control method 1000 moves to step 1046, described below. If it is determined in decision step 1044 that bin cooling is not enabled, then the control method 1000 bypasses step 1046 and proceeds to subroutine 1200-2, described below.

At step 1046, the fan and valve for the bin are switched on. Step 1046 may the same or similar features as step 1026, described above. After step 1046, the control method 1000 then moves to subroutine 1200-2, described below.

At subroutine 1200-2, the temperature is controlled for the first cup holder and for neither, either or both of the second cup holder and the bin. Subroutine 1200-2 may involve the steps of method 1200, as shown in and described herein with respect to FIG. 6, and as applied to the first cup holder and to neither, either or both of the second cup holder and the bin. As further discussed with respect to the method 1200, the temperature may be controlled in a variety of aspects, including varying the compressor speed. Therefore, in some embodiments of subroutine 1200-2, a compressor speed is selected to control the temperature for the first cup holder and for neither, either or both of the second cup holder and the bin. After subroutine 1200-2, the control method 1000 moves back to decision step 1014, and proceeds as described above.

In some embodiments of subroutine 1200-2, the temperature is controlled for the first cup holder but is not controlled for either of the second cup holder and bin. For example, it may be determined at previous decision step 1040 that the second cup holder is not enabled for thermal conditioning and at previous decision step 1044 that the bin is not enabled for thermal conditioning. In some embodiments of subroutine 1200-2, the temperature is controlled for the first and second cup holders but not for the bin. For example, it may be determined at previous decision step 1040 that the second cup holder is enabled for thermal conditioning and at previous decision step 1044 that the bin is not enabled for thermal conditioning. In some embodiments of subroutine 1200-2, the temperature is controlled for the bin and for both the first and second cup holders. For example, it may be determined at previous decision step 1040 that the second cup holder is enabled for thermal conditioning and at previous decision step 1044 that the bin is enabled for thermal conditioning.

Prioritization of Second Cup Holder

At decision step 1048, it is determined whether a second cup holder is enabled for thermal conditioning, for example enabled for cooling and/or heating. Decision step 1048 may have the same or similar features as decision step 1032, described above.

Further, decision step 1048 may be performed after decision step 1036 based on prioritizing the second cup holder over other auxiliary components, such as the bin or first cup holder. However, in some embodiments, there may be a different priority of auxiliary components. For example, the second cup holder may be prioritized, in which case decision step 1048 may be performed before decision steps 1024 and 1036. Further, as mentioned with respect to steps 1014, 1018, 1024, and 1036, the auxiliary components may be prioritized over the passenger components. In that case, the method 1000 may begin with the decision step 1048, assuming the second cup holder is prioritized over the other auxiliary components. Therefore, as mentioned, the particular embodiment of the method 1000 shown in FIG. 4 is just an example, and many other variations may be implemented based on which components are prioritized or not prioritized relative to each other.

If it is determined in decision step 1048 that thermal conditioning of the second cup holder is enabled, then the control method 1000 moves to step 1050, described below. If it is determined in decision step 1048 that thermal conditioning of the second cup holder is not enabled, then the control method 1000 moves back to decision step 1014 and proceeds as described above.

At step 1050, the fan and valve for the second cup holder are switched on. Step 1050 may the same or similar features as step 1042, described above. After step 1050, the control method 1000 next moves to decision step 1052, described below.

At decision step 1052, it is determined whether thermal conditioning of the first cup holder is enabled. Decision step 1052 may have the same or similar features as decision step 1028, described above. If it is determined in decision step 1052 that thermal conditioning of the first cup holder is enabled, then the control method 1000 moves to step 1054, described below. If it is determined in decision step 1052 that thermal conditioning of the first cup holder is not enabled, then the control method 1000 bypasses step 1054 and proceeds to decision step 1056, described below.

At step 1054, the fan and valve for the first cup holder are switched on. Step 1054 may the same or similar features as step 1030, described above. After step 1054, the control method 1000 then moves to decision step 1056, described below.

At decision step 1056, it is determined whether bin cooling is enabled. Decision step 1056 may have the same or similar features as decision step 1024, described above. If it is determined in decision step 1056 that bin cooling is enabled, then the control method 1000 moves to step 1058, described below. If it is determined in decision step 1056 that bin cooling is not enabled, then the control method 1000 bypasses step 1058 and proceeds to subroutine 1200-3, described below.

At step 1058, the fan and valve for the bin are switched on. Step 1058 may the same or similar features as step 1026, described above. After step 1058, the control method 1000 then moves to subroutine 1200-3, described below.

At subroutine 1200-3, the temperature is controlled for the second cup holder and for neither, either or both of the first cup holder and the bin. Subroutine 1200-3 may involve the steps of method 1200, as shown in and described herein with respect to FIG. 6, and as applied to the second cup holder and to neither, either or both of the first cup holder and the bin. As further discussed with respect to the method 1200, the temperature may be controlled in a variety of aspects, including varying the compressor speed. Therefore, in some embodiments of subroutine 1200-3, a compressor speed is selected to control the temperature for the second cup holder and for neither, either or both of the first cup holder and the bin. After subroutine 1200-3, the control method 1000 moves back to decision step 1014, and proceeds as described above.

In some embodiments of subroutine 1200-3, the temperature is controlled for the second cup holder but is not controlled for either of the first cup holder and bin. For example, it may be determined at previous decision step 1052 that the first cup holder is not enabled for thermal conditioning and at previous decision step 1056 that the bin is not enabled for thermal conditioning. In some embodiments of subroutine 1200-3, the temperature is controlled for the first and second cup holders but not for the bin. For example, it may be determined at previous decision step 1052 that the first cup holder is enabled for thermal conditioning and at previous decision step 1056 that the bin is not enabled for thermal conditioning. In some embodiments of subroutine 1200-3, the temperature is controlled for both the first and second cup holders and for the bin. For example, it may be determined at previous decision step 1052 that the first cup holder is enabled for thermal conditioning and at previous decision step 1056 that the bin is enabled for thermal conditioning.

Figure 5A:
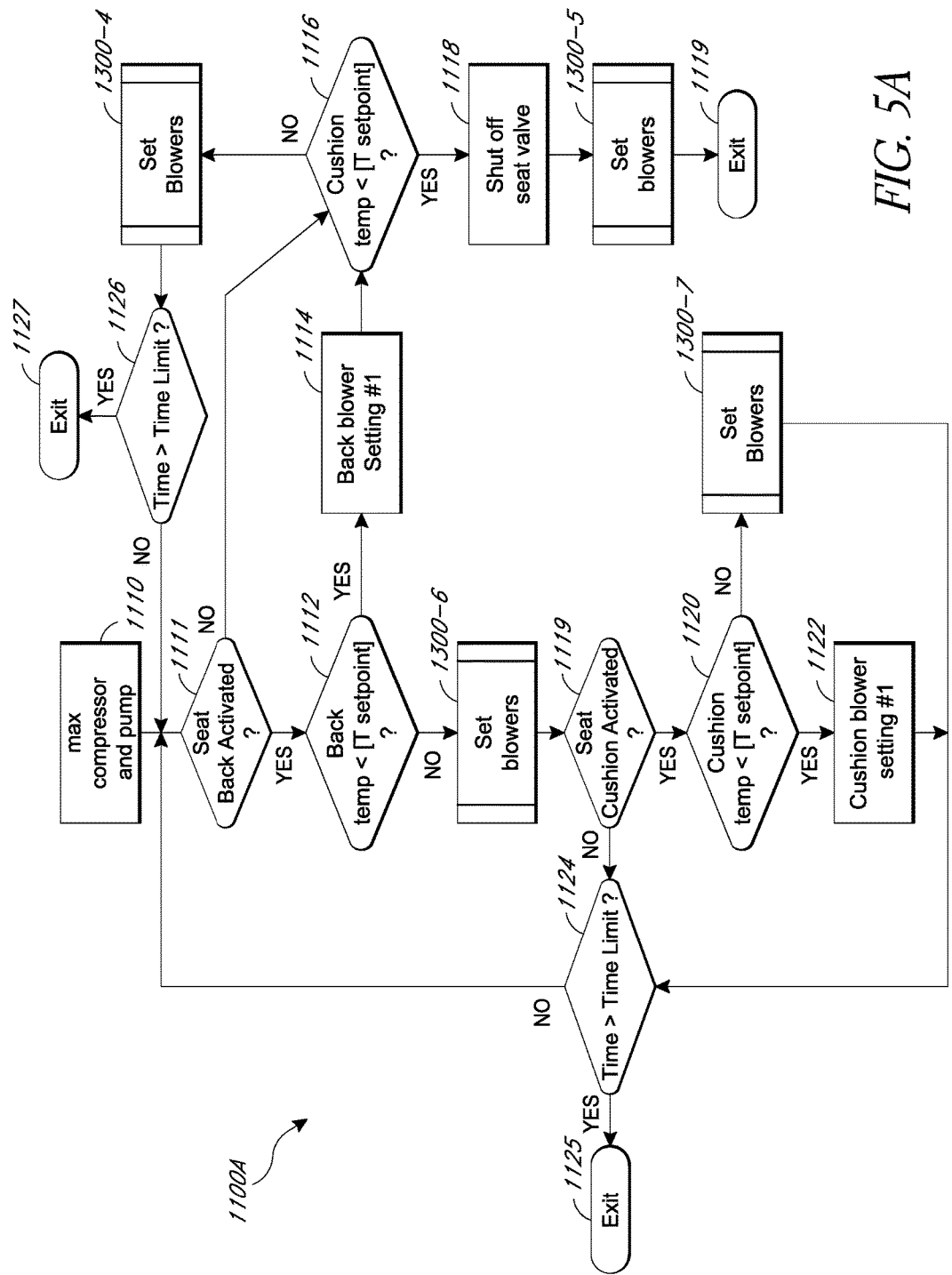
FIG. 5A is a schematic of an embodiment of a control method for cooling a seat that may be used with the control method of FIG. 4.
Figure 5B:
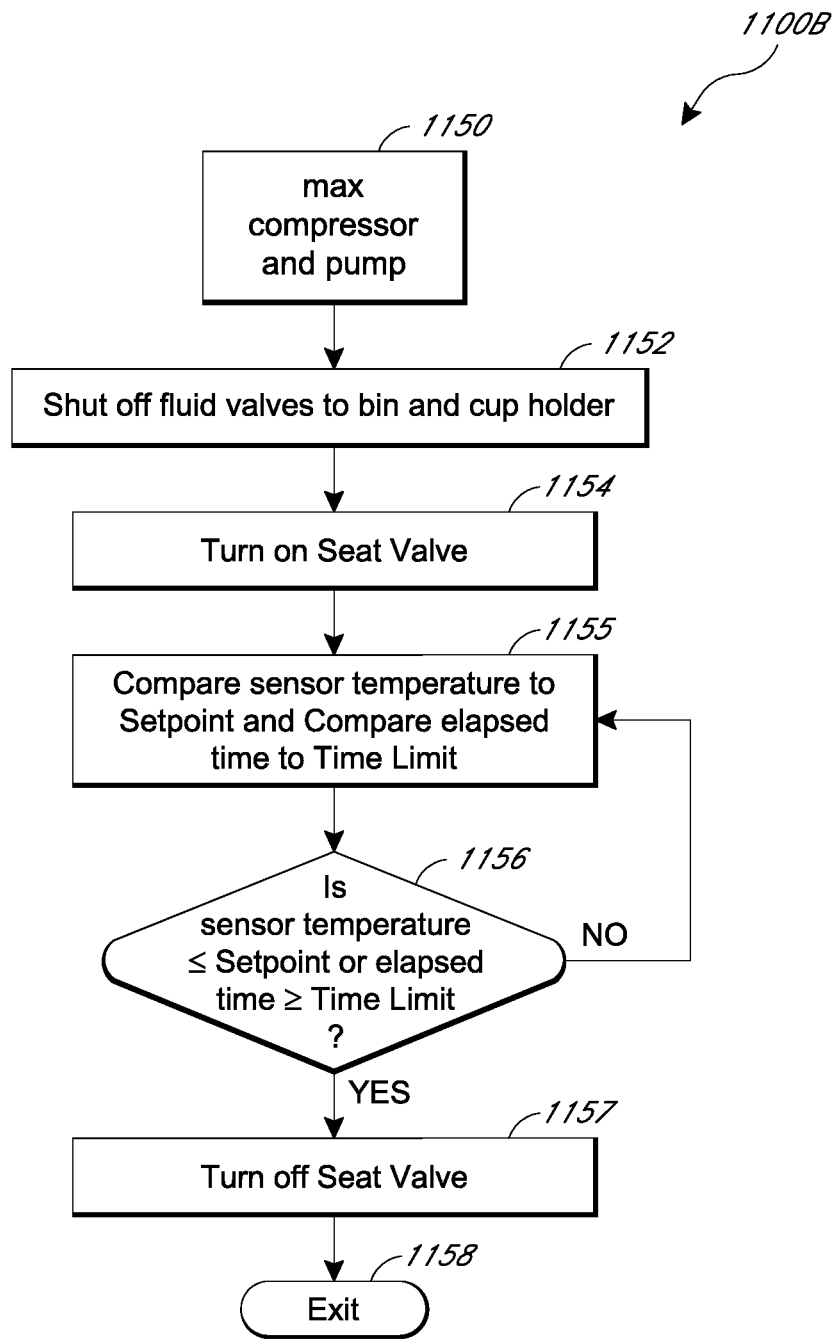
FIG. 5B is a schematic of another embodiment of a control method for cooling a seat that may be used with the control method of FIG. 4.

FIG. 5A is a schematic of an embodiment of a control method 1100AA for cooling a seat. FIG. 5B is a schematic of another embodiment of a control method 1100AB for cooling a seat. The methods 1100A, 1100B may be used with the various control methods described herein, for example with the control method 1000 shown in and described with respect to FIG. 4. In some embodiments, the methods 1100A, 1100B of FIGS. 5A and 5B are performed as a subroutine or subcontrol method in other methods describe herein, for example as the subroutine 1100 within the method 1000 of FIG. 4.

As shown in FIG. 5A, the method 1100A may begin with step 1110 wherein a compressor and pump are switched to maximum speeds. The compressor and pump may be switched to maximum speeds automatically or manually. In sonic embodiments of step 1110, a compressor within the thermal energy source 604 is switched to maximum speed. In some embodiments of step 1110, the compressor 710 or 812 is switched to maximum speed. In some embodiments of step 1110, the pump 606 is switched to maximum speed. In some embodiments of step 1110, thermal conditioning of one or more seats is prioritized over thermal conditioning of other components, such as a bin and one or more cup holders. In some embodiments of step 1110, the valves servicing these or other components are shut off or otherwise closed. In some embodiments of step 1110, the valves servicing these or other components are mostly closed. "Mostly closed" as used herein may indicate, for example, that the valve or other device is more than 50% closed, or is 60%, 75%, 80%, 85%, 90%, 95%, or 99% etc. closed, or other percentages closed. In some embodiments of step 1110, the valves 634 and/or 654 are closed or are mostly closed. In some embodiments of step 1110, the valves 832 and/or 842 are closed or are mostly closed. After step 1110, the method 1100A next moves to decision step 1111, describe below.

At decision step 1111, it is determined whether the seatback is activated for thermal conditioning. In some embodiments, it is determined whether the seatback is activated using a control system, such as the control system 800. In some embodiments, a user may choose to activate the seatback using a controller, for example the controller 805. In some embodiments, the seatback may be activated automatically, for example by sensing that a passenger is sitting in the seat and/or leaning against the seatback. In some embodiments, the seat back may be a portion of the first thermal node 628, for example a back portion of a vehicle seat, or any other similar nodes or seatback portions described herein. In some embodiments, a seat cushion may be assessed for activation followed by assessment of the seatback for activation later in the method 1100AA. If it is determined in decision step 1111 that the seatback or other portion is not activated, then the method 1100AA next moves to decision step 1116, described below. If it is determined in decision step 1111 that the seat back or other portion is activated, then the method 1100AA next moves to decision step 1112, described below.

At decision step 1112, the current temperature of a first portion of the seat is compared to a desired or set temperature. As shown, in some embodiments of decision step 1112, the current temperature of a seatback portion of the seat is compared to a desired or set temperature. In some embodiments of decision step 1112, the current temperature of a bottom or other portion of the seat may be compared to a desired or set temperature. For instance, a seat cushion temperature may be compared to a setpoint followed by comparison of a seatback temperature with a setpoint later in the method 1100A.

In some embodiments of decision step 1112, the current temperature may he compared to a set temperature using a control system, such as the control system 800. In some embodiments of decision step 1112, the current temperature of a first portion of the seat is compared to a desired or set temperature using a controller and temperature sensor, such as the controller 805 and the sensor 828. In some embodiments of decision step 1112, the sensor 828 senses the current temperature of a first seat portion and data relating to the sensed current temperature is received by the controller 805, which compares such data to other data relating to a desired or set temperature of the first seat portion.

If it is determined in decision step 1112 that the current temperature of the first seat portion is less than the desired or set temperature of the first seat portion, then the method 1100A next moves to step 1114, described below. If it is determined in decision step 1112 that the current temperature of the first seat portion is not less than the desired or set temperature of the first seat portion, then the method 1100A next moves to subroutine 1300-6, described below.

At step 1114, a blower such as a fan for this first seat portion is set to a maximum speed setting. As shown, in some embodiments, the blower may be servicing the seatback portion of the first seat. In some embodiments, the blower may be servicing the bottom or other portion of the first seat. In some embodiments, the blower may have multiple settings. In some embodiments, the blower may have four settings, with setting #1 indicating maximum speed and setting #4 indicating minimum speed. Therefore, as shown, in some embodiments of step 1114, the blower may be set to setting #1. After step 1114, the method 1100A next moves to decision step 1116, described below.

At decision step 1116, the current temperature of a second portion of the seat is compared to a desired or set temperature. Decision step 1116 as applied to a second seat portion may have the same or similar features as decision step 1112 as applied to the first seat portion. As shown, in some embodiments of decision step 1116, the current temperature of a bottom or cushion portion of the seat is compared to a desired or set temperature. In some embodiments of decision step 1116, the current temperature of a seatback or other portion of the seat may be compared to a desired or set temperature.

In some embodiments of decision step 1116, the current temperature may be compared to a set temperature using a control system, such as the control system 800. In some embodiments of decision step 1116, the current temperature of a second portion of the seat is compared to a desired or set temperature using a controller and temperature sensor, such as the controller 805 and the sensor 828. In some embodiments of decision step 1116, the sensor 828 senses the current temperature of a second seat portion and data relating to the sensed current temperature is received by the controller 805, which compares such data to other data relating to a desired or set temperature of the second seat portion.

If it is determined in decision step 1116 that the current temperature of the second seat portion is less than the desired or set temperature of the second seat portion, then the method 1100A next moves to step 1118, described below. If it is determined in decision step 1116 that the current temperature of the second seat portion is not less than the desired or set temperature of the second seat portion, then the method 1100A next moves to subroutine 1300-4, described below.

At subroutine 1300-4, the speed and/or other settings are set for one or more blowers, such as a fan, for the second seat portion, which may be a bottom or cushion portion of the seat. Subroutine 1300-4 may involve the steps of method 1300A, as shown in and described herein with respect to FIG. 7A, and as applied to the blower or blowers for the second seat portion. In some embodiments of subroutine 1300-4, the speed of a blower servicing the seat bottom portion may be set. In some embodiments of subroutine 1300-4, the speed of a blower servicing the seatback or other portion may be set. In some embodiments of subroutine 1300-4, the speed of the fan 618 or 824 may be set. After subroutine 1300-4, the method 1100A next moves to decision step 1126.

At decision step 1126, it is determined whether an accrued time satisfies a time limit threshold. As shown, this may include determination of whether the accrued time is greater than a time limit. It may also include determination of whether the accrued time limit is equal to the time limit, or within some range of the time limit, etc. The accrued time may be the total time spent on performing the method 1100A each time it is called by another method or otherwise performed. In some embodiments, the control system 800 may track the amount of time each time the method 1100A is begun. The tracked or accrued time may then be compared with a time limit or other threshold in decision step 1126 to determine whether the threshold is satisfied.

If it is determined in decision step 1126 that the time limit threshold is satisfied, e.g. if the accrued time is greater than the time limit, then the method 1100A next moves to step 1127 and exits the method 1100A. If in the method 1100A it is determined in decision step 1126 that the time limit threshold is satisfied, e.g. if the accrued time is not greater than the time limit, then the method 1100A returns to decision step 1111 and proceeds as described herein with respect to decision step 1111.

At step 1127, the method 1100A ends. Step 1127 may be the same or similar as step 1119 described below. In some embodiments, at step 1127 the process may return to another method, for example to the method 1000 at decision step 1024.

At step 1118, the valve to the seat is shut off or otherwise closed. In some embodiments of step 1118, the valve to the seat is mostly closed. In some embodiments of step 1118, the valve 614 or the valve 822 is closed or mostly closed. After step 1118, the method 1100A next moves to subroutine 1300-5, described below.

At subroutine 1300-5, the speed and/or other settings are set for one or more blowers, such as a fan, for the second seat portion, which may be a bottom or cushion portion of the seat. Subroutine 1300-5 may have the same or similar features as subroutine 1300-4, described above. After subroutine 1300-5, the method 1100A next moves to step 1119, as described below.

At step 1119, the method 1100A ends. As mentioned, the method 1100A may be a subroutine performed within the control method 1000. At step 1119, the method 1100A may therefore be exited and the control method 1000 may then be performed starting at the appropriate location of the control method 1000. In some embodiments, the method 1100.A may be exited and the control method 1000 may then continue at decision step 1024, as described above. Step 1119 may be the same or similar as the step 1127 described above.

At subroutine 1300-6, the speed and/or other settings are set for one or more blowers, such as a fan, for the first seat portion, which may be the seatback portion. Subroutine 1300-6 may involve the steps of method 1300A, as shown in and described herein with respect to FIG. 7A, and as applied to the blower or blowers for the first seat portion. In some embodiments of subroutine 1300-6, the speed of a blower servicing the seatback portion may be set. In some embodiments of subroutine 1300-6, the speed of a blower servicing the seat bottom or other portion may be set. In some embodiments of subroutine 1300-6, the speed of the fan 618 or 824 may be set. After subroutine 1300-6, the method 1100A next moves to decision step 1120, described below.

At decision step 1120, it is determined whether the seat cushion is activated for thermal conditioning. Decision step 1120 may have the same or similar features as decision step 1111 described above but as applied to a second seat portion, such as the seat cushion. In some embodiments, a seatba.ck may be assessed for activation after assessment of the seat cushion for activation previously in the method 1100A. If it is determined in decision step 1120 that the seat cushion or other portion is not activated, then the method 1100A next moves to decision step 1124, described below. If it is determined in decision step 1120 that the seat cushion or other portion is activated, then the method 1100A next moves to decision step 1121, described below.

At decision step 1121, the current temperature of a second portion of the seat is compared to a desired or set temperature. Decision step 1121 may have the same or similar features as decision step 1112 or 1116, described above, as applied to the second seat portion. As shown, in some embodiments of decision step 1121, the current temperature of a bottom or cushion portion of the seat is compared to a desired or set temperature. In some embodiments of decision step 1121, the current temperature of a seatback or other portion of the seat may be compared to a desired or set temperature.

In some embodiments of decision step 1121, the current temperature may be compared to a set temperature using a control system, such as the control system 800. In some embodiments of decision step 1121, the current temperature of a second portion of the seat is compared to a desired or set temperature using a controller and temperature sensor, such as the controller 805 and the sensor 828. In some embodiments of decision step 1121, the sensor 828 senses the current temperature of a second seat portion and data relating to the sensed current temperature is received by the controller 805, which compares such data to other data relating to a desired or set temperature of the second seat portion.

If it is determined in decision step 1121 that the current temperature of the second seat portion does not satisfy a temperature threshold, for example if the current temperature is less than the desired or set temperature of the second seat portion, then the method 1100A next moves to step 1122, described below. If it is determined in decision step 1121 that the current temperature of the second seat portion does satisfy a temperature threshold, for example if the current temperature is not less than the desired or set temperature of the second seat portion, then the method 1100A next moves to subroutine 1300-7, described below.

At step 1122, a blower such as a fan for this seat portion is set to a maximum speed setting. As shown, in some embodiments of step 1122, the blower may be servicing the bottom or cushion portion of the first seat. In some embodiments, the blower may be servicing the seatback or other portion of the first seat. In some embodiments, the blower may have multiple settings. In some embodiments, the blower may have four settings, with setting #1 indicating maximum speed and setting #4 indicating minimum speed. Therefore, as shown, in some embodiments of step 1122, the blower may be set to setting #1. After step 1122, the method 1100A next moves to decision step 1124.

At subroutine 1300-7, the speed and/or other settings are set for one or more blowers, such as a fan, for the second seat portion, which may be a bottom or cushion portion of the seat. Subroutine 1300-7 may have the same or similar features as subroutine 1300-4, described above. Subroutine 1300-7 may involve the steps of method 1300A, as shown in and described herein with respect to FIG. 7A, and as applied to the blower or blowers for the second seat portion. In some embodiments of subroutine 1300-7, the speed of a blower servicing the seat bottom portion may be set. In some embodiments of subroutine 1300-7, the speed of a blower servicing the seatback or other portion may be set. In sonic embodiments of subroutine 1300-7, the speed of the fan 618 or 824 may be set. After subroutine 1300-7, the method 1100A next moves to decision step 1124.

At decision step 1124, it is determined whether an accrued time satisfies a time limit threshold. Decision step 1124 may the same or similar features as decision step 1126 described above. Thus, for example, decision step 1124 may include determination of whether the accrued time is greater than a time limit, equal to the time limit, or within some range of the time limit, etc.

If it is determined in decision step 1124 that the time limit threshold is satisfied, e.g. if the accrued time is greater than the time limit, then the method 1100A next moves to step 1125 and exits the method 1100A. At step 1125, the method 1100A ends. Step 1125 may be the same or similar as step 1119 or 1127 described above. In some embodiments, at step 1125 the process may return to another method, for example to the method 1000 at decision step 1024.

If it is determined in decision step 1124 that the time limit threshold is satisfied, e.g. if the accrued time is not greater than the time limit, then the method 1100A returns to decision step 1111 and proceeds as described herein with respect to decision step 1111.

As mentioned. FIG. 513 is a schematic of another embodiment of a control method 1100B for cooling a seat. As shown, the method 1100B may begin with step 1150 wherein a compressor and pump are switched to maximum speeds. Step 1150 may have the same or similar features as step 1110 of the method 1100A as described herein, for example with respect to FIG. 5A. After step 1150, the method 1100B then moves to step 1152.

At step 1152, the valves for the bin and at least one cup holder are closed or mostly closed. In some embodiments, the valves for the bin and all cup holders (which may be two cup holders) are closed or mostly closed. In some embodiments, the valves affected are closed completely. In some embodiments of step 1152, the valves 634 and/or 654 are closed or are mostly closed. In some embodiments of step 1152, the valves 832 and/or 842 are closed or are mostly closed. In some embodiments of step 1152, the control system 800 and/or controller 805 are used to close the valves. After step 1152, the method 1100B then moves to step 1154.

At step 1154, the seat valve is turned on. In some embodiments, the seat valve is opened completely or is mostly opened. "Mostly opened" as used herein may indicate, for example, that the valve or other device is more than 50% opened, or is 60%, 75%, 80%, 85%, 90%, 95%, or 99% etc. opened, or other percentages opened. In some embodiments, the valve 614 or 822 is opened or mostly opened. In some embodiments of step 1152, the control system 800 and/or controller 805 are used to open the valves. After step 1154, the method 1100B then moves to step 1155.

At step 1155, the sensor temperature is compared to a setpoint temperature and the accrued or elapsed time is compared to a time limit. The sensor temperature may be a temperature corresponding to a portion or portions of the seat, such as the seatback and/or seat cushion. For example, the temperature of the various seat portions may be detected using the sensor 622, 624, 827 or 828. The sensed temperature is then compared to a temperature setpoint for assessment of whether the sensed temperature satisfies the setpoint threshold. The accrued time is also analyzed. In some embodiments, the accrued time is analyzed in parallel with the temperature comparison. In some embodiments, the accrued time is measured from the start of the method 1100B and/or from the performance of step 1150, 1152 and/or 1154. The comparison of the accrued time with the time limit may have the same or similar features as the decision steps 1124 or 1126 of the method 1100A as described, for example, with respect to FIG. 5A. The temperature and time comparisons in step 115 may be performed by the various control systems described herein, for example the control system 800. After step 1155, the method 1100B next moves to decision step 1156.

At decision step 1156, it is determined whether the sensor temperature satisfies a temperature setpoint threshold and whether the elapsed or accrued time satisfies a time limit threshold. In some embodiments, it is determined whether the sensor temperature is less than or equal to a temperature setpoint and whether the elapsed time is greater than or equal to a time limit. Other threshold criteria may be implemented, including determining whether the sensor temperature is less than a temperature setpoint and/or whether the elapsed time is greater than a time limit, or whether the sensor temperature and accrued time are within respective threshold ranges for each parameter. The sensor temperature and elapsed time may be analyzed using the various control systems described herein, for example the control system 800. If it is determined in decision step 1156 that the sensor temperature does not satisfy the temperature setpoint threshold and that the accrued time does not satisfy the time limit threshold, then the method moves back to step 1155, and proceeds as described above. If it is determined in decision step 1156 that the sensor temperature satisfies the temperature setpoint threshold or that the accrued time satisfies the time limit threshold, then the method moves to step 1157. Therefore, satisfaction of either criterion will suffice to move the method 1100B along to step 1157. In some embodiments, only the timing criterion is analyzed.

At step 1157, the seat valve is turned off. In some embodiments, the seat valve is closed completely or is mostly closed. In some embodiments, the valve 614 or 822 is closed or mostly closed. In some embodiments of step 1157, the control system 800 and/or controller 805 are used to close the valves. After step 1157, the method 1100B then moves to step 1158. At step 1158, the method 1100B ends and is exited. Step 1158 may be the same or similar as step 1119, 1125 or 1127 of the method 1100.A as described, for example, with respect to FIG. 5A. In some embodiments, at step 1158 the process may return to another method, for example to the method 1000 at decision step 1024.

Figures 6, 6A:
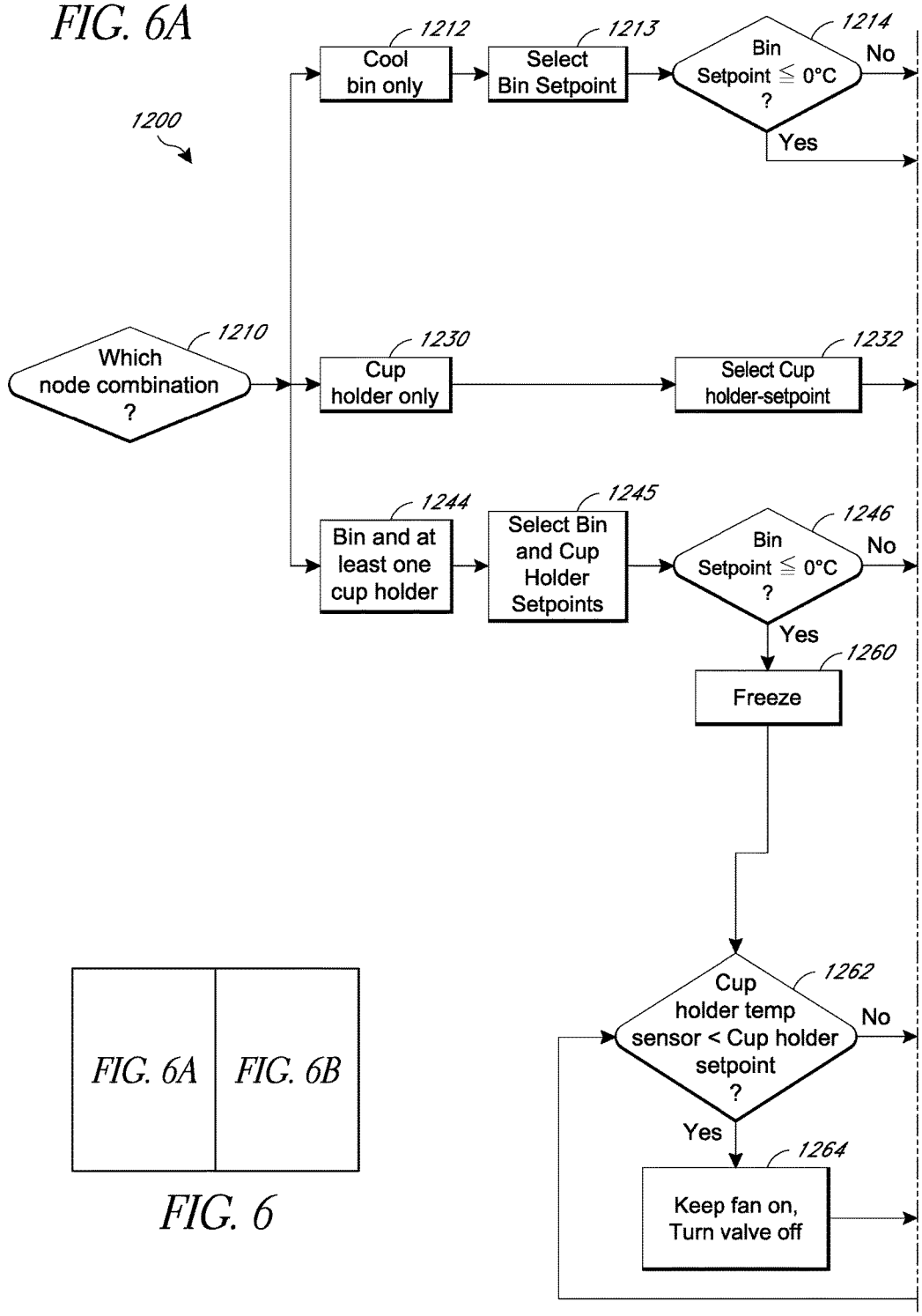
FIG. 6, as shown in FIG. 6A and continued in FIG. 6B, is a schematic of an embodiment of a control method for controlling temperature that may be used with the control method of FIG. 4.
Figure 6B:
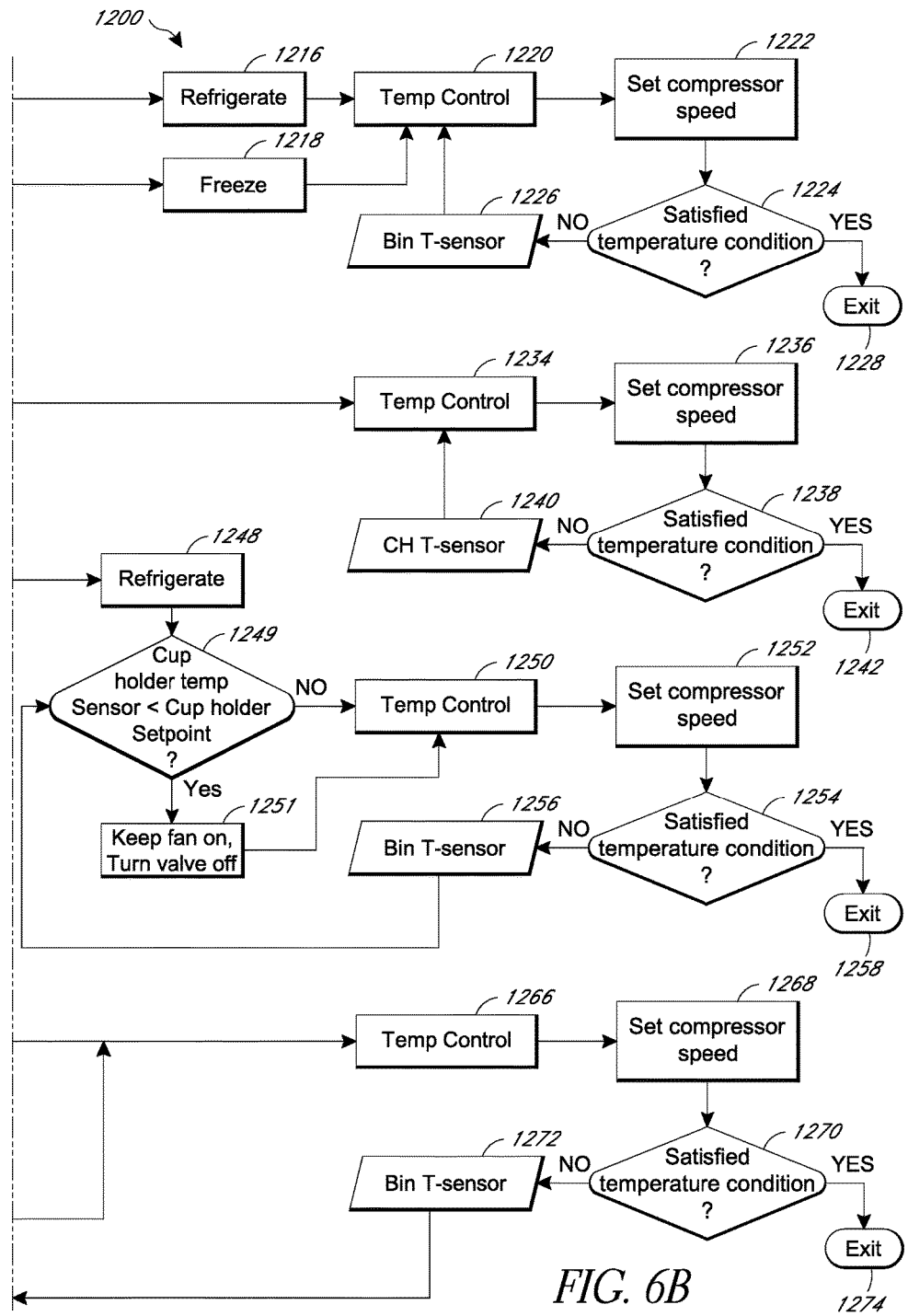
FIG. 6C is a schematic of another embodiment of a control method for controlling temperature that may be used with the control method of FIG. 4.

FIG. 6, as shown in FIG. 6A and continued in FIG. 6B, is a schematic of an embodiment of a control method 1200 for controlling temperature of one or more components that may be used with the various control systems and methods described herein. In some embodiments, the method 1200 of FIG. 6 is performed as the subroutine 1200-1, 1200-2 and/or 1200-3 within the method 1000 of FIG. 4.

The method 1200 begins with decision step 1210, wherein it is determined which node combination to perform. "Node" refers to which components of the system or aspects thereof are to be thermally serviced. For instance, the node may refer to the second thermal node 648, the third thermal node 660 or 1460 (described herein), and/or the fourth thermal node 1462 (described herein). In some embodiments, the first thermal node 628 or 820 may be implemented into the method 1200. The method 1200 may be performed in different node combinations. The various node combinations may depend on the inputs to the method 1200. In some embodiments, the control method 1000 may provide inputs to subroutine 1200-1, 1200-2 or 1200-3, which may then perform the method 1200 corresponding to those inputs. For example, the method 1200 may be performed as subroutine 1200-1, 1200-2 and/or 1200-3 in method 1000, where only a first component is being thermally serviced, where only a second component is being thermally serviced, where a first and second component are being thermally serviced, where a first and third component are being thermally serviced, where a first, second and third component are being thermally serviced, etc. In some embodiments, more than three components may be serviced.

At decision step 1210 one or more of the various nodes may be selected for thermal conditioning. In some embodiments, only a bin only may be selected, only a cup holder may be selected, or a bin and at least one cup holder may be selected. These exemplary selections and combinations are described in further detail below. Other selections and combinations of nodes may be implemented, and these are merely provided as some examples of possible node combinations.

After the method 1200 has been performed, for example as subroutine 1200-1, 1200-2 and/or 1200-3 in method 1000, the method 1200 may end and then the method 1000 may continue at the appropriate step, as discussed in further detail herein.

Bin Only

In some embodiments of decision step 1210, it may be determined that only a bin is to be thermally conditioned. For example, in control method 1000 it may be determined that only a bin is enabled for thermal conditioning, in which case subroutine 1200-1, 1200-2 or 1200-3 may receive such input and then perform the method 1200 for thermally conditioning only the bin. If it is determined in decision step 1210 that only the bin is being thermally conditioned, the method 1200 may then move to step 1212.

At step 1212, the node combination for thermally conditioning the bin only may be selected. In some embodiments, the second node 648 may be selected. In some embodiments, the flow control device 634 may be opened to allow the flow of thermal working fluid through the third branch 652 servicing the second node 648. In some embodiments, the fan 638, that services the second node 648, may be activated. In some embodiments, the flow control devices 614 and 634 may be shut to prevent or otherwise reduce the flow of thermal working fluid through the first and second branches 612 and 632 servicing the first and third nodes 628 and 660. After step 1212, the method 1200 may then move to step 1213.

At step 1213, a thermal setpoint for the bin is selected. In some embodiments, a particular temperature or temperature range may be selected for the bin. This may be done by a user selecting a particular temperature value. Or, a user may select a setting such as "low," "medium" or "high," and the controller 805 may then determine the corresponding temperature or temperature range for the setpoint. These are merely some examples of how the setpoint may be selected, and other suitable approaches may be implemented. These and other approaches may be input by a user, for example, by using a display in communication with a controller, as described herein. For example, the controller 805 may generate data related to the setpoint for the first or second cup holder temperature. Such data may be used later in the method 1200, such as in step 1234 in a control algorithm. After step 1213, the method 1200 then moves to decision step 1214.

At decision step 1214, it is determined whether the selected thermal setpoint, for example the desired or set temperature, for the bin is less than or equal to 0° C., i.e. less than or equal to a freezing temperature for water. In some embodiments, the controller 805 compares the selected thermal setpoint to 0° C. and determines whether the selected thermal setpoint is less than 0° C. If it is determined in decision step 1214 that the selected thermal setpoint for the bin is not less than or equal to 0° C., then the method 1200 moves to step 1216 to set refrigeration control parameters, described below. For example, the thermal setpoint may be selected as 1° C., 2° C., 3° C., 4° C., 5° C., 10° C., 15° C. or any lower, intermediate or higher refrigeration temperatures, or any ranges including any such refrigeration temperatures. If it is determined in decision step 1214 that the selected thermal setpoint for the bin is less than or equal to 0° C., then the method 1200 moves to step 1218 to set freezing control parameters, described below. For example, the thermal setpoint may be selected as −1° C., −2° C., −3° C., −4° C., −5° C., −10° C., −15'C. or any lower, intermediate or higher freezing temperatures, or any ranges including any such freezing temperatures.

At step 1216, an indicated thermal conditioning control mode is set to refrigerate. In some embodiments, one or more of various system parameters may be adjusted or otherwise set to achieve the refrigeration setpoint. Some system parameters include compressor speed, compressor selection (for example where more than one thermal energy source is included), fan speed and/or selection, valve percentage open, and other suitable system parameters. For example, the compressor may be slowed down or sped up, the same or a different thermal energy source may be selected, the fan may be slowed down or sped up, other fans in addition or alternatively may be turned on or slowed down or sped up, the valve may be opened up more or closed more, etc. These and other system parameters may be set based on achieving the desired refrigeration setpoint. These are just some examples of system parameters that may be set and others not explicitly recited may in addition or alternatively be implemented.

In some embodiments of step 1216, various parameters for a controller may be set for a refrigeration control mode. In some embodiments, as discussed below, a PID controller may be implemented, and thus in step 1216 the proportional, integrative and/or derivative terms for the PID controller may be defined for a refrigeration control mode. This is merely one example and many other types of suitable controllers and thus many other controller parameters may be set in step 1216. The various parameters may be based on the particular mode (e.g. freezing or refrigeration), on the particular component being serviced, on the difference in temperature between the current temperature of the component and the desired thermal setpoint, on the desired speed at which the component is to reach the thermal setpoint, on power saving or efficiency considerations, etc. After step 1216, the method 1200 then moves to step 1220, described below.

At step 1218, an indicated thermal conditioning control mode is set to freeze. In some embodiments of step 1218, one or more of various system parameters may be adjusted or otherwise set to achieve the freezing setpoint. Step 1218 may be similar to step 1216 except that step 1218 is for freezing instead of refrigeration. Thus, some system parameters include compressor speed, compressor selection (for example where more than one thermal energy source is included), fan speed and/or selection, valve percentage open, and other suitable system parameters. For example, the compressor may be slowed down or sped up, the same or a different thermal energy source may be selected, the fan may be slowed down or sped up, other fans in addition or alternatively may be turned on or slowed down or sped up, the valve may be opened up more or closed more, etc. These and other system parameters may be set based on achieving the desired freezing setpoint. These are just some examples of system parameters that may be set and others not explicitly recited may in addition or alternatively be implemented.

In some embodiments, various parameters for a controller are set for a freezing control mode. Step 1218 may be similar to step 1216 except that it sets the parameters for the freezing mode instead of refrigeration. Therefore, any features or functionalities discussed with respect to refrigeration in step 1216 may be applied in step 1218 but with respect to freezing. Thus various controllers and various parameters thereof may be used and set based on a variety of considerations, as discussed above. After step 1218, the method 1200 then moves to step 1220, described below.

At step 1220, a temperature control algorithm is performed. In some embodiments of step 1220, a proportional-integrative-derivative ("PID") control algorithm is performed. A PID control algorithm such as those known in the art may be used. In sonic embodiments, the PID control algorithm is a feedback control loop wherein an error value is calculated as the difference between a measured temperature and a desired or set temperature. In some embodiments, a sensor may provide data relating to a current temperature which may be compared to data received in previous steps 1214, 1216 and/or 1218. For example, a set freezing temperature for the bin may be received after step 1218 and then compared in step 1220 to a current temperature of the bin, as received from step 1226 (described below). As another example, a set refrigeration temperature for the bin may be received after step 1216 and then compared in step 1220 to a current temperature of the bin as received from step 1226 (described below). The control algorithm may be performed in step 1220, for example, by the controller 805. In some embodiments of step 1220, an output error value is generated and used in other steps of the method 1200 to produce control outputs to adjust the temperature, for example by determining a compressor speed. After step 1220, the method 1200 then moves to step 1222, described below.

At step 1222, a compressor speed may be set. In some embodiments, the speed of compressor 710 or 812 may be set. In some embodiments, a compressor of the thermal energy source 604 may be set. In some embodiments, the speed of a compressor may be set based on control inputs received from step 1220. For example, the controller 805 may calculate an error and corresponding compressor speed in step 1220, which may then be used in step 1222 to set the speed of the compressor. In some embodiments, the compressor may be set to a higher speed. In some embodiments, the compressor may be set to a lower speed. In some embodiments, multiple compressor speeds may be set, for example if more than one thermal energy source is used. After step 1222, the method 1200 then moves to decision step 1224, described below.

At decision step 1224, it is determined whether the desired or set temperature condition is satisfied. In sonic embodiments, the controller 805 analyzes temperature data from the sensor 644 or 838. If it is determined in step 1224 that the desired or set temperature condition is satisfied, then the method 1200 moves to step 1228, described below. If it is determined in step 1224 that the desired or set temperature condition is not satisfied, then the method 1200 moves to step 1226, described below.

At step 1226, the temperature of the bin is sensed. In sonic embodiments, the temperature of the bin in the second region 602 or the third region 830 is sensed with the sensor 838. Data related to the sensed temperature in step 1226 may then be provided to the controller for further determination and/or calculation of an error in step 1220. Thus, after step 1226, the method 1200 then moves back to step 1220 and proceeds as described above.

At step 1228, the method 1200 ends. As mentioned, the method 1200 may be a subroutine performed within the control method 1000. At step 1228, the method 1200 may therefore be exited and the control method 1000 may then be performed starting at the appropriate location of the control method 1000. In some embodiments of step 1228, the method 1200 may be exited and the control method 1000 may then continue at decision step 1014, as described above.

Cup Holder Only

In some embodiments of decision step 1210, it may be determined that only a cup holder is to be thermally conditioned. For example, in control method 1000 it may be determined that only a first or second cup holder is enabled for thermal conditioning, in which case subroutine 1200-1, 1200-2 or 1200-3 may receive such input and then perform the method 1200 for thermally conditioning only the first or second cup holder. If it is determined in decision step 1210 that only the first or second cup holder is being thermally conditioned, the method 1200 may then move to step 1230, described below.

At step 1230, the node combination for thermally conditioning only a cup holder may be selected. In some embodiments, the third node 660 the third node 1460, or the fourth thermal node 1462 may be selected. The nodes 1460 and 1462 are discussed in further detail herein, for example with respect to FIG. 8. In some embodiments, the flow control device 654 may be opened to allow the flow of thermal working fluid through the third branch 652 servicing the third node 660. In some embodiments, the flow control device 1454 may be opened to allow the flow of thermal working fluid through the branch 1452 servicing the third and fourth nodes 1460, 1462. In some embodiments, each of the third and fourth nodes 1460, 1462 may have a separate valve that can be opened. In some embodiments, one or more fans, such as fans 1461 and/or 1463 (discussed in further detsail herein, for example with respect to FIG. 8) may be turned on. In some embodiments, the flow control devices 614, 634, 1414 or 1434 may be shut to prevent or otherwise reduce the flow of thermal working fluid through, respectively, the branches 612, 632, 1412 or 1432 servicing, respectively, the nodes 628, 648, 1478 or 1448. After step 1230, the method 1200 may then move to step 1232, described below.

At step 1232, a cup holder thermal setpoint is selected. In some embodiments, a particular temperature or temperature range may be selected for one or more of the cup holders. If multiple cup holders are selected, then this branch of the method 1200 may be performed for each cup holder. A particular temperature or temperature range may be selected by a user selecting a particular temperature value. Or, a user may select a setting such as "low," "medium" or "high," and the controller 805 may then determine the corresponding temperature or temperature range for the setpoint. These are merely some examples of how the setpoint may be selected, and other suitable approaches may be implemented. These and other approaches may be input by a user, for example, by using a display in communication with the controller 805, as described herein. setpointFor example, the controller 805 may generate data related to the setpoint for the first or second cup holder temperature. Such data may be used later in the method 1200, such as in step 1234 in a control algorithm. After step 1232, the method 1200 then moves to step 1234.

At step 1234, a control algorithm is performed. Step 1234 may have the same or similar features as step 1220 but as applied to the first or second cup holder. In some embodiments of step 1234, a PID control algorithm is performed. In some embodiments, a sensor may provide data relating to a current temperature which may be compared to data received in previous step 1232. For example, a set temperature for the first or second cup holder may be received after step 1232 and then compared in step 1234 to a current temperature of the first or second cup holder, as received from step 1240 (described below). The control algorithm may be performed in step 1234, for example, by the controller 805. In some embodiments of step 1234, an output error value is generated and used in other steps of the method 1200 to adjust the temperature, for example by determining a compressor speed. After step 1234, the method 1200 then moves to step 1236, described below.

At step 1236, a compressor speed may be set. Step 1236 may have the same or similar features as step 1222, described above. In some embodiments, the speed of a compressor may be set based on inputs received from step 1234. For example, the controller 805 may calculate an error and corresponding compressor speed in step 1234, which may then be used in step 1236 to set the speed of the compressor. After step 1236, the method 1200 then moves to decision step 1238.

At decision step 1238, it is determined whether the desired or set temperature condition is satisfied. Decision step 1238 may have the same or similar features as decision step 1224, described above. In some embodiments, the controller 805 analyzes temperature data from the sensor 846. If it is determined in step 1238 that the desired or set temperature condition is satisfied, then the method 1200 moves to step 1242, described below. If it is determined in step 1238 that the desired or set temperature condition is not satisfied, then the method 1200 moves to step 1240.

At step 1240, the temperature of the first or second cup holder is sensed. In some embodiments, the temperature of the first or second cup holder in the third region 603 or the fourth region 840 is sensed with the sensor 846. Data related to the sensed temperature in step 1240 may then be provided to the controller for further determination and/or calculation of an error in step 1234. Thus, after step 1240, the method 1200 then moves back to step 1234 and proceeds as described herein.

At step 1242, the method 1200 ends. Step 1242 may have the same or similar features as step 1228, described above. In some embodiments of step 1242, the method 1200 may be exited and the control method 1000 may then continue at decision step 1014, as described above.

Bin and At Least One Cup Holder

In some embodiments of decision step 1210, it may be determined that a bin and at least one cup holder are to be thermally conditioned. For example, in control method 1000 it may be determined that a bin and at least one cup holder are enabled for thermal conditioning, in which case subroutine 1200-1, 1200-2 or 1200-3 may receive such input and then perform the method 1200 for thermally conditioning the bin and at least one cup holder. If it is determined in decision step 1210 that the bin and at least one cup holder are being thermally conditioned, the method 1200 may then move to step 1244, described below.

At step 1244, the node combination for thermally conditioning a bin and at least one cup holder may be selected In some embodiments, the second node 648 and the third node 660 may be selected. In some embodiments, the flow control devices 634 and 654 may be opened to allow the flow of thermal working fluid through the branches 632 and 652 servicing the nodes 648 and 660. In some embodiments, one or more fans, such as fans 1461 and/or 1463 (discussed in further detail herein, for example with respect to FIG. 8) may be turned on. In some embodiments, the flow control devices 614 and 634 may be shut to prevent or otherwise reduce the flow of thermal working fluid through the first and second branches 612 and 632 servicing the first and second nodes 628 and 648. After step 1244, the method 1200 then moves to decision step 1245.

At step 1245, thermal setpoints for the bin and the at least one cupholder are selected. In some embodiments, a particular temperature or temperature range may be selected for one or more of the cup holders. If multiple cup holders are selected, then this branch of the method 1200 may be performed for each cup holder. A particular temperature or temperature range may be selected by a user selecting a particular temperature value. Or, a user may select a setting such as "low," "medium" or "high," and the controller 805 may then determine the corresponding temperature or temperature range for the setpoint. These are merely some examples of how the setpoint may be selected, and other suitable approaches may be implemented. These and other approaches may be input by a user, for example, by using a display in communication with the controller 805, as described herein. setpointFor example, the controller 805 may generate data related to the setpoint for the first or second cup holder temperature. Such data may be used later in the method 1200, such as in step 1234 in a control algorithm. After step 1232, the method 1200 then moves to step 1234, described below.

At decision step 1246, it is determined whether the desired or set temperature for the bin is less than or equal to 0° C., i.e. less than or equal to a freezing temperature for water. Decision step 1246 may have the same or similar features as decision step 1214 described above. If it is determined in decision step 1246 that the desired or set temperature for the bin is not less than or equal to 0° C., then the method 1200 moves to step 1248, described below. If it is determined in decision step 1246 that the desired or set temperature for the bin is less than or equal to 0° C., then the method 1200 moves to step 1260, described below.

Bin Refrigeration Sub-Mode

At step 1248, an indicated thermal conditioning control mode for the bin is set to refrigerate. Step 1248 may have the same or similar features and functionalities as step 1216 described herein. Thus, various system and/or controller parameters may be set or otherwise adjusted, as discussed, in order to achieve the refrigeration thermal setpoint. After step 1248, the method 1200 then moves to step 1249.

At step 1249, it is determined whether the sensed temperature of a cup holder satisfies the thermal setpoint threshold for that cup holder. Step 1249 may have the same or similar features as step 1262. described herein. If it is determined in decision step 1249 that the sensed temperature of the cup holder satisfies, for example is less than, the setpoint temperature threshold for that cup holder, then the method 1200 moves to step 1251. If it is determined in decision step 1249 that the sensed temperature of the cup holder does not satisfy, for example is not less than, the setpoint temperature threshold for that cup holder, then the method 1200 moves to step 1250, described below.

At step 1251, thermal conditioning of the cup holder is at least partially disabled. In some embodiments, the fan servicing the cup holder is kept on and the valve servicing the cup holder is turned off. Step 1251 may have the same or similar features as step 1264 described herein. After step 1251, the method 1200 then proceeds to step 1250, described below.

At step 1250, a control algorithm is performed. Step 1250 may have the same or similar features as step 1220, described above. In some embodiments of step 1250, a control algorithm is performed, which may be performed by a PM controller, to calculate the error between a current and set temperature of the bin. After step 1250, the method 1200 then moves to step 1252, described below.

At step 1252, a compressor speed may be set. Step 1252 may have the same or similar features as step 1222, described above. After step 1252, the method 1200 then moves to decision step 1254, described below.

At decision step 1254, it is determined whether the desired or set temperature condition is satisfied. Decision step 1254 may have the same or similar features as decision step 1224, described above. If it is determined in decision step 1254 that the desired or set temperature condition is satisfied, then the method 1200 moves to step 1258, described below. If it is determined in step 1254 that the desired or set temperature condition is not satisfied, then the method 1200 moves to step 1256, described below.

At step 1256, the temperature of the bin is sensed. Step 1256 may have the same or similar features as step 1226, described above. Data related to the sensed temperature in step 1256 may then be provided to the controller for further determination and/or calculation of an error in step 1250. Thus, after step 1256, the method 1200 then moves back to step 1250 and proceeds as described above.

At step 1258, the method 1200 ends. Step 1258 may have the same or similar features as step 1228, described above. In some embodiments of step 1258, the method 1200 may be exited and the control method 1000 may then continue at decision step 1014, as described above.

Bin Freezing Sub-Mode

At step 1260, an indicated thermal conditioning control mode is set to freeze. Step 1260 may have the same or similar features of step 1218 discussed above. Thus, various system and/or controller parameters may be set or otherwise adjusted, as discussed, in order to achieve the freezing thermal setpoint. After step 1260, the method 1200 then moves to decision step 1262, described below.

At decision step 1262, it is determined whether the sensed temperature of a cup holder satisfies the thermal setpoint threshold for that cup holder. Thus, the cup holder thermal status may be addressed before addressing the bin thermal status. For instance, it may be determined in step 1262 whether the sensed temperature of the cupholder is less than the thermal setpoint. In some embodiments, it may be determined in step 1262 whether the sensed temperature of the cupholder is less than or equal to the thermal setpoint, whether the sensed temperature of the cupholder is within some range of the thermal setpoint, etc. In some embodiments of step 1262, data related to the temperature of a first or second cup holder is received by the controller 805 from the sensor 846. In some embodiments, the controller 805 compares the temperature of the cup holder to a desired or set temperature or range. If it is determined in decision step 1262 that the sensed temperature of the cup holder satisfies, for example is less than, the setpoint temperature threshold for that cup holder, then the method 1200 moves to step 1264, described below. If it is determined in decision step 1262 that the sensed temperature of the cup holder does not satisfy, for example is not less than the setpoint temperature threshold for that cup holder, then the method 1200 moves to step 1266, described below.

At step 1264, thermal conditioning of the cup holder is at least partially disabled. In some embodiments of step 1264, the fan servicing the cup holder, such as the cup holder 660, may be kept on. In some embodiments of step 1264, the valve servicing the cup holder, such as the valve 654 or 842, may be closed or otherwise turned off. In some embodiments of step 1264, the valve servicing the cup holder may be mostly closed. After step 1264, the method 1200 then proceeds to step 1266.

At step 1266, a temperature control algorithm is performed. Step 1266 may have the same or similar features as step 1220, described above. In some embodiments of step 1266, a control algorithm is performed to calculate the error between a current and set temperature of the bin. After step 1266, the method 1200 then moves to step 1268, described below.

At step 1268, a compressor speed may be set. Step 1268 may have the same or similar features as step 1222, described above. After step 1286, the method 1200 then moves to decision step 1270, described below.

At decision step 1270, it is determined whether the desired or set temperature condition is satisfied. Decision step 1270 may have the same or similar features as decision step 1224, described above. If it is determined in decision step 1270 that the desired or set temperature condition is satisfied, then the method 1200 moves to step 1274, described below. If it is determined in step 1270 that the desired or set temperature condition is not satisfied, then the method 1200 moves to step 1272, described below.

At step 1272, the temperature of the bin is sensed. Step 1272 may have the same or similar features as step 1226, described above. However, step 1272 differs from step 1226 in that data related to the sensed temperature in step 1256 may not be provided directly to the controller. After step 1256, the method 1200 then moves back to step 1262 and proceeds as described above. The sensed temperature in step 1272 may then be provided to the controller in step 1266 after step 1262 (and possibly also after step 1264), as described above.

At step 1274, the method 1200 ends. Step 1274 may have the same or similar features as step 1228, described above. In some embodiments of step 1274, the method 1200 may be exited and the control method 1000 may then continue at decision step 1014, as described above.

Figure 6C:
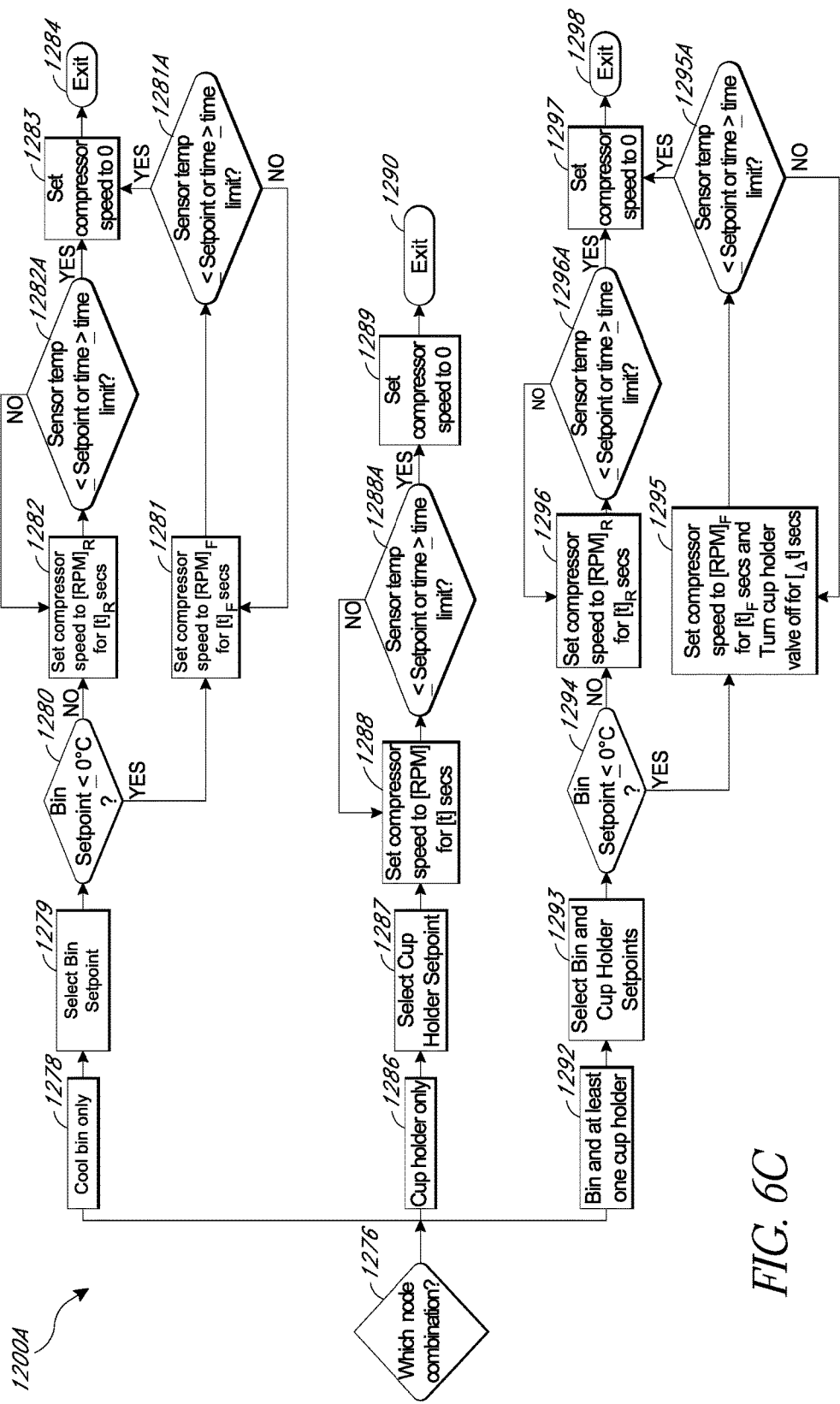

FIG. 6C is a schematic of an embodiment of a control method 1200, for controlling temperature that may be used with the various control systems and methods described herein. The control method 1200A may have the same or similar features as the method 1200 except for the differences discussed herein. In some embodiments, the method 1200A includes a time analysis. The method 1200A may include a temperature and time analysis as described herein and as shown in FIG. 6C. In some embodiments, the method 1200A may only include a time analysis, as discussed herein. In some embodiments, the method 1200A of FIG. 6C is performed as the subroutine 1200-1, 1200-2 and/or 1200-3 within the method 1000 of FIG. 4. Thus, in some embodiments, the method 1000 may use the method 1200 or 1200B. Further, the method 1000 may use portions of the method 1200 and portions of the method 1200B. For example, in some embodiments, the method 1000 may use the "bin only" combination 1212 of the method 1200 and the "cup only" 1230 and "bin and cup" 1244 combinations of the method 1200A, etc. After the method 1200A has been performed, for example as subroutine 1200-1, 1200-2 and/or 1200-3 in method 1000, the method 1200A may end and then the method 1000 may continue at the appropriate step, as discussed in further detail herein.

The method 1200A begins with decision step 1276 wherein it is determined which node combination to perform. Step 1276 may have the same or similar features as step 1210 of the method 1200 described herein.

Bin Only—Time Analysis

In some embodiments of decision step 1276, it may be determined that only a bin is to be thermally conditioned. If it is determined in decision step 1276 that only the bin is being thermally conditioned, the method 1200A then moves to step 1278. Step 1278 may have the same or similar features as step 1212 of the method 1200 described herein. After step 1278, the method 1200A then moves to step 1279, wherein a thermal setpoint for the bin is selected. Step 1279 may have the same or similar features as step 1213 of the method 1200 described herein. After step 1279, the method 1200A then moves to decision step 1280, wherein it is determined whether the selected thermal setpoint, for example the desired or set temperature, for the bin is less than or equal to 0° C., i.e. less than or equal to a freezing temperature for water. Decision step 1280 may have the same or similar features as decision step 1214 of the method 1200 described herein. If it is determined in decision step 1280 that the selected thermal setpoint for the bin is not satisfied, for example is not less than or equal to 0° C., then the method 1200A moves to step 1282, described below. If it is determined in decision step 1280 that the selected thermal setpoint for the bin is less than or equal to 0° C., then the method 1200A moves to step 1281.

At step 1281, the compressor is set at a given speed $[RPM]_F$ for a given amount of time $[t]_F$ seconds to achieve freezing temperatures in the bin. In some embodiments, the speed and timing of compressor 710 or 812 may be set. In some embodiments, the speed and timing of a compressor of the thermal energy source 604 may be set. In some embodiments, multiple compressor speeds and timings may be set, for example if more than one thermal energy source is used. In some embodiments, the compressor may be set to a higher speed. In some embodiments, the compressor may be set to a lower speed. In some embodiments, the compressor may maintain its current speed. In some embodiments, the compressor may be set at a particular speed for varying amounts of time. The compressor may be set at a particular speed for relatively short times, long times, for shorter or longer times than previously used, for the same amount of time as previously used, etc. In some embodiments, multiple speeds and times may be set. For example, the compressor may be set at a particular speed for a set time, and then at another speed for another set time, etc. In some embodiments, the speed and timing of a compressor or compressors may be set based on control inputs received from step 1281A described below. For example, in following step 1281A the controller 805 may calculate a temperature error or difference and calculate corresponding compressor speed(s) and timing(s), which may then be used in step 1281 to set the speed(s) and timing(s) of the compressor. After step 1281, the method 1200A then moves to decision step 1281A.

At decision step 1281A, it is determined whether the sensor temperature satisfies a freezing temperature setpoint threshold and whether the elapsed or accrued time satisfies a time limit threshold. Decision step 1281A may have the same or similar features as decision step 1156 of the method 1100B, described for example with respect to FIG. 5B. If it is determined in decision step 1281A that the sensor temperature does not satisfy the temperature setpoint threshold and that the accrued time does not satisfy the time limit threshold, then the method 1200A moves back to step 1281, and proceeds as described above. If it is determined in decision step 1281A that the sensor temperature satisfies the temperature setpoint threshold or that the accrued time satisfies the time limit threshold, then the method 1200A moves to step 1283, as described below. Therefore, satisfaction of either criterion will suffice to move the method 1200A along to step 1283. In some embodiments, only the timing criterion is analyzed.

At step 1282, the compressor is set at a given speed $[RPM]_R$ for a given amount of time $[t]_R$ seconds to achieve refrigeration temperatures in the bin. Step 1282 may have the same or similar features as step 1281 as described above with the exception that the speed(s) and timing(s) are set to achieve refrigeration, as opposed to freezing, of the bin. In some embodiments, the speed and tinting of a compressor or compressors may be set based on control inputs received from step 1282A described below. For example, in following step 1282A the controller 805 may calculate a temperature error or difference and calculate corresponding compressor speed(s) and timing(s), which may then be used in step 1282 to set the speed(s) and timing(s) of the compressor. After step 1282, the method 1200A then moves to decision step 1282A.

At decision step 1282A, it is determined whether the sensor temperature satisfies a refrigeration temperature setpoint threshold and whether the elapsed or accrued time satisfies a time limit threshold. Decision step 1282A may have the same or similar features as decision step 1281A, described herein, except as applied to refrigeration temperatures and time limits. If it is determined in decision step 1282A that the sensor temperature does not satisfy the temperature setpoint threshold and that the accrued time does not satisfy the time limit threshold, then the method 1200A moves back to step 1282, and proceeds as described above. If it is determined in decision step 1282A that the sensor temperature satisfies the temperature setpoint threshold or that the accrued time satisfies the time limit threshold, then the method 1200A moves to step 1283, as described below. Therefore, satisfaction of either criterion will suffice to move the method 1200A along to step 1283. In sonic embodiments, only the timing criterion is analyzed.

At step 1283, the compressor or compressors are set to zero speed. In some embodiments, the compressor or compressors are turned off. In some embodiments, the compressor or compressors are set to a very low speed. After step 1283, the method 1200A then moves to step 1284 wherein the method 1200A ends. As mentioned, the method 1200A may be a subroutine performed within the control method 1000. At step 1228, the method 1200A may therefore be exited and the control method 1000 may then be performed starting at the appropriate location of the control method 1000. In some embodiments of step 1283, the method 1200A may be exited and the control method 1000 may then continue at decision step 1014, as described above.

Cup Holder Only—Time Analysis

In some embodiments of decision step 1276, it may be determined that only a cup holder is to be thermally conditioned. If it is determined in decision step 1276 that only the cup holder is to be thermally conditioned, the method 1200A then moves to step 1286. Step 1286 may have the same or similar features as step 1230 of the method 1200 described herein. After step 1286, the method 1200A then moves to step 1287, wherein a thermal setpoint for the cup holder is selected. Step 1287 may have the same or similar features as step 1232 of the method 1200 described herein. After step 1287, the method 1200A then moves to step 1288.

At step 1288, the compressor is set at a given speed [RPM] for a given amount of time [t] seconds to satisfy the cup holder thermal setpoint threshold. Step 1288 may have the same or similar features as steps 1281 or 1282 except that the speed and timing are set for the cup holder and corresponding cup holder temperatures. In some embodiments, the speed(s) and timing(s) of a compressor or compressors may be set based on control inputs received from step 1288A described below. For example, in following step 1288A the controller 805 may calculate a temperature error or difference and calculate corresponding compressor speed (s) and timing(s), which may then be used in step 1288 to set the speed(s) and timing(s) of the compressor. After step 1288, the method 1200A then moves to decision step 1288A.

At decision step 1288A, it is determined whether the cup holder sensor temperature satisfies a temperature setpoint threshold and whether the elapsed or accrued time satisfies a time limit threshold. Decision step 1288A may have the same or similar features as decision steps 1281A or 1282A. If it is determined in decision step 1288A that the cup holder sensor temperature does not satisfy the temperature setpoint threshold and that the accrued time does not satisfy the time limit threshold, then the method 1200A moves back to step 1288, and proceeds as described above. If it is determined in decision step 1288A that the sensor temperature satisfies the temperature setpoint threshold or that the accrued time satisfies the time limit threshold, then the method 1200A moves to step 1289, as described below. Therefore, satisfaction of either criterion will suffice to move the method 1200A along to step 1289. In some embodiments, only the timing criterion is analyzed.

At step 1289, the compressor or compressors are set to zero speed. Step 1289 may have the same or similar features as step 1283 described herein. After step 1289, the method 1200A then moves to step 1290 wherein the method 1200A ends and is exited. Step 1289 may have the same or similar features as step 1284 described herein.

Bin and Cup Holder—Time Analysis

In some embodiments of decision step 1276, it may be determined that a bin and a cup holder are to be thermally conditioned. If it is determined in decision step 1276 that a bin and a cup holder are to be thermally conditioned, the method 1200A then moves to step 1292. Step 1292 may have the same or similar features as step 1244 of the method 1200 described herein. After step 1292, the method 1200A then moves to step 1293, wherein a thermal setpoints for the bin and the at least one cup holder are selected. In some embodiments, thermal setpoints for the bin and for two cup holders are selected. Step 1293 may have the same or similar features as step 1245 of the method 1200 described herein. After step 1293, the method 1200A then moves to decision step 1294.

At decision step 1294, it is determined whether the selected bin thermal setpoint threshold, for example the desired or set temperature for the bin, is less than or equal to 0° C., i.e. less than or equal to a freezing temperature for water. Decision step 1294 may have the same or similar features as decision step 1280. If it is determined in decision step 1294 that the selected thermal setpoint threshold for the bin is not satisfied, for example is not less than or equal to 0° C. then the method 1200A moves to step 1282, described below.

If it is determined in decision step 1294 that the selected thermal setpoint threshold for the bin is satisfied, for example is less than or equal to 0° C., then the method 1200A moves to step 1295.

At step 1295, the compressor is set at a given speed $[RPM]_F$ for a given amount of time $[t]_F$ seconds to achieve freezing temperatures in the bin. Step 1295 may have the same or similar features as step 1281 described herein. In some embodiments, the speed(s) and timing(s) of a compressor or compressors may be set based on control inputs received from step 1295A described below. For example, in following step 1295A the controller 805 may calculate a temperature error or difference and calculate corresponding compressor speed(s) and timing(s), which may then be used in step 1295 to set the speed(s) and timing(s) of the compressor(s). After step 1295, the method 1200A then moves to decision step 1295A.

At decision step 1295A, it is determined whether the sensor temperature satisfies a freezing temperature setpoint threshold and whether the elapsed or accrued time satisfies a time limit threshold. Decision step 1295A may have the same or similar features as decision step 1281A described herein. If it is determined in decision step 1295A that the sensor temperature does not satisfy the temperature setpoint threshold and that the accrued time does not satisfy the time limit threshold, then the method 1200A moves back to step 1295, and proceeds as described above. If it is determined in decision step 1295A that the sensor temperature satisfies the temperature setpoint threshold or that the accrued time satisfies the time limit threshold, then the method 1200A moves to step 1297, as described below. Therefore, satisfaction of either criterion will suffice to move the method 1200A along to step 1297. In some embodiments, only the timing criterion is analyzed.

At step 1296, the compressor is set at a given speed $[RPM]_R$ for a given amount of time $[t]_R$ seconds to achieve refrigeration temperatures in the bin. Step 1296 may have the same or similar features as step 1282 as described herein. In some embodiments, the speed(s) and timing(s) of a compressor or compressors may be set based on control inputs received from step 1296A described below. For example, in following step 1296A the controller 805 may calculate a temperature error or difference and calculate corresponding compressor speed(s) and timing(s), which may then be used in step 1296 to set the speed(s) and timing(s) of the compressor. After step 1296, the method 1200A then moves to decision step 1296A.

At decision step 1296A, it is determined whether the sensor temperature satisfies a refrigeration temperature setpoint threshold and whether the elapsed or accrued time satisfies a time limit threshold. Decision step 1296A may have the same or similar features as decision step 1282A. If it is determined in decision step 1296A that the sensor temperature does not satisfy the refrigeration temperature setpoint threshold and that the accrued time does not satisfy the time limit threshold, then the method 1200A moves back to step 1296, and proceeds as described above. If it is determined in decision step 1296A that the sensor temperature satisfies the refrigeration temperature setpoint threshold or that the accrued time satisfies the time limit threshold, then the method 1200A moves to step 1297, as described below. Therefore, satisfaction of either criterion will suffice to move the method 1200A along to step 1297. In some embodiments, only the timing criterion is analyzed.

At step 1297, the compressor or compressors are set to zero speed. Step 1297 may have the same or similar features as step 1283 described herein. After step 1297, the method 1200A then moves to step 1298 wherein the method 1200A ends. As mentioned, the method 1200A may be a subroutine performed within the control method 1000. At step 1298, the method 1200A may therefore be exited and the control method 1000 may then be performed starting at the appropriate location of the control method 1000. In some embodiments of step 1298, the method 1200A may be exited and the control method 1000 may then continue at decision step 1014, as described above.

Figure 7A:
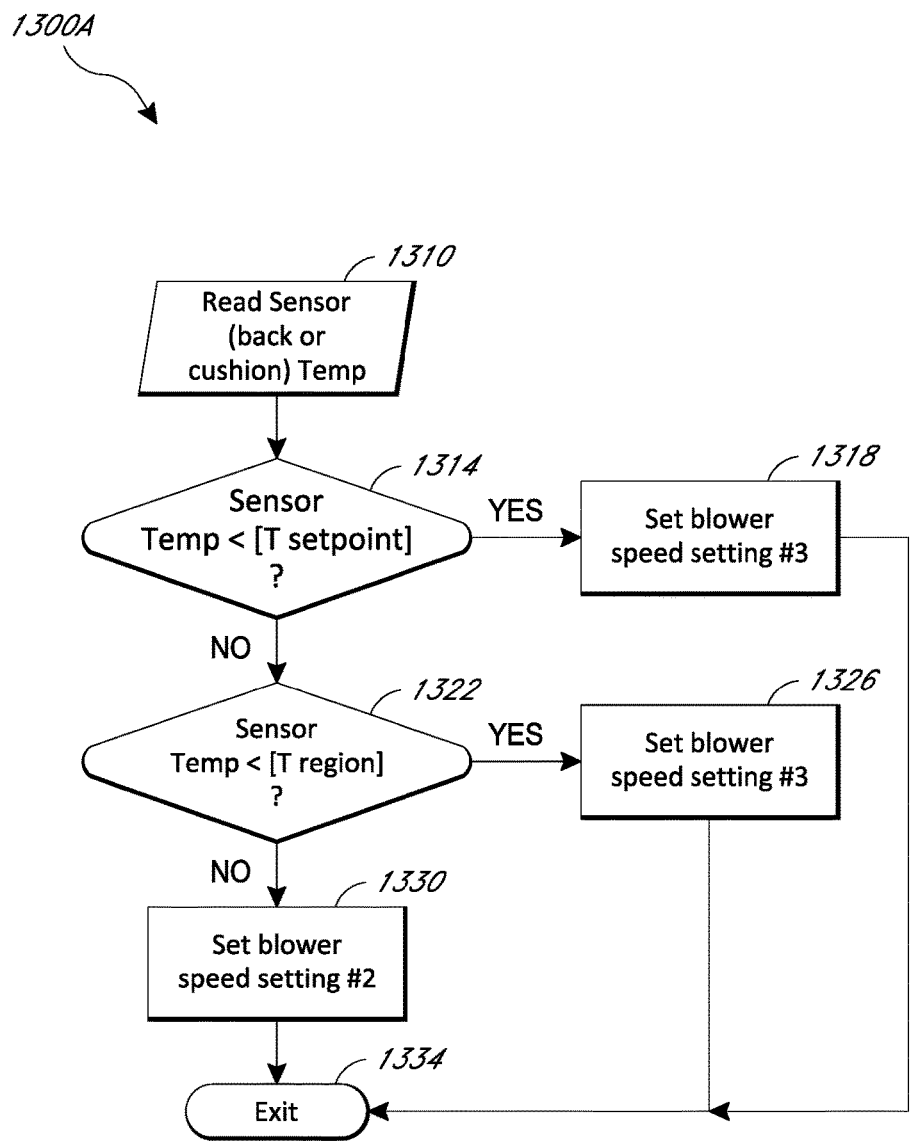
FIG. 7A is a schematic of an embodiment of a control method for setting blower speeds that may be used with the control method of FIG. 4.

FIG. 7A is a schematic of an embodiment of a method 1300A for setting blower speeds that may be used with the various control systems and methods described herein, for example the method 1000 shown in FIG. 4. In some embodiments, the method 1300A of FIG. 7A is performed as a subroutine within other methods described herein. In some embodiments, the method 1300A of FIG. 7A is performed as the subroutine 1300-1, 1300-2 and/or 1300-3 within the method 1000 of FIG. 4. In some embodiments, the method 1300A of FIG. 7A is performed as the subroutine 1300-4, 1300-6, 1300-6 and/or 1300-7 within the method 1100A of FIG. 5A.

As shown in FIG. 7A, the method 1300A begins with step 1310 wherein data or information relating to temperature of a seat or seat portion is received from or otherwise provided by a sensor. In some embodiments of step 1310, data from a temperature sensor of a first or second seat is received. In some embodiments, data from the sensor 828 or the sensor 624 is received by the controller 805. In some embodiments of step 1310, the data received relates to the temperature of a portion of a seat, such as a seatback portion, a seat bottom or cushion portion, or other portions. After step 1310, the method 1300A then moves to decision step 1314.

At decision step 1314, the temperature sensed in a previous step is compared to the setpoint temperature for the seat or seat portion. In some embodiments of step 1314, the temperature sensed in step 13010 is compared to a setpoint temperature for the seat or seat portion. The setpoint temperature may be desired or set by a user, as described herein. In some embodiments, a user may select a setting for the seat or seat portion, such as "low," "median," "high," etc., and a controller, such as the controller 805, may determine the corresponding setpoint temperature for that setting. The controller, such as the controller 805, may then compare the setpoint temperature to the sensed temperature. If it is determined in step 1314 that the sensed temperature is less than the setpoint temperature, then the method 1300A moves to step 1318, described below. If it is determined in step 1314 that the sensed temperature is not less than the setpoint temperature, then the method 1300A moves to step 1322, described below.

At step 1318, the blower, such as a fan, for the corresponding seat or seat portion is set to a relatively high speed setting. The blower may service any of the seats or seat portions described herein. In some embodiments, the blower may have a lowest speed setting #1, a slightly higher speed setting #2, an even higher speed setting #3, and a highest speed setting #4. Thus, in some embodiments of step 1318, the blower may be set to speed setting #3. This is merely one example, and other gradations of speed settings may be implemented. For instance, there may be speed settings from the lowest #1 to the highest #10, wherein in step 1318 the blower is set to speed setting #8, for example. After step 1318, the method 1300A then moves to step 1334, as described below, At decision step 1322, the temperature sensed in a previous step is compared to the setpoint temperature of a region containing the seat. In some embodiments of step 1314, the temperature sensed in step 13010 is compared to a setpoint temperature for the region containing the seat. The region may be, for example, the first region 601 or the second region 820. The setpoint temperature may be desired or set by a user, as described herein. In some embodiments, a user may select a setting, such as "low," "median," "high," etc., and a controller, such as the controller 805, may determine the corresponding setpoint temperature for that setting. The controller, such as the controller 805, may then compare the setpoint temperature to the sensed temperature of the region. If it is determined in step 1322 that the sensed temperature of the region is less than the setpoint temperature, then the method 1300A moves to step 1326, described below. If it is determined in step 1322 that the sensed temperature is not less than the setpoint temperature, then the method 1300A moves to step 1330, described below.

At step 1326, the blower, such as a fan, for the corresponding seat or seat portion is set to a relatively high speed setting. Step 1326 may have the same or similar features as step 1318, described above. Thus, in some embodiments of step 1326, the blower for the corresponding seat or seat portion may be set to speed setting #3. After step 1326, the method 1300A then moves to step 1334, as described below.

At step 1330, the blower, such as a fan, for the corresponding seat or seat portion is set to a relatively low speed setting. The blower may service any of the seats or seat portions described herein. In some embodiments, the blower may have a lowest speed setting #1, a slightly higher speed setting #2, an even higher speed setting #3, and a highest speed setting #4. Thus, in some embodiments of step 1330, the blower may be set to speed setting #2. This is merely one example, and other gradations of speed settings may be implemented. For instance, there may be speed settings from the lowest #1 to the highest #10, wherein in step 1330 the blower is set to a relatively low speed setting on that scale. After step 1318, the method 1300A then moves to step 1334, as described below.

At step 1334, the method 1300A ends. As mentioned, method 1300A may be performed as a subroutine within another method described herein. Thus, at step 1334, the method 1300A may be exited and another method disclosed herein may then continue. In some embodiments, the method 1300A may be performed as the subroutine 1300-1 within the control method 1000, and thus at step 1334 the method 1300A may be exited and the control method 1000 may then continue at decision step 1016, described above. In some embodiments, the method 1300A may be performed as the subroutine 1300-2 within the control method 1000, and thus at step 1334 the method 1300A may be exited and the control method 1000 may then continue at subroutine 1100, described above. In some embodiments, the method 1300A may be performed as the subroutine 1300-3 within the control method 1000, and thus at step 1334 the method 1300A may be exited and the control method 1000 may then continue at decision step 1020, described above. In some embodiments, the method 1300A may be performed as the subroutine 1300-4 within the method 1100A, and thus at step 1334 the method 1300A may be exited and the method 1100A may then continue at decision step 1112, described above. In some embodiments, the method 1300A may be performed as the subroutine 1300-5 within the method 1100A, and thus at step 1334 the method 1300A may be exited and the method 1100A may then continue at step 1119, described above. In some embodiments, the method 1300A may be performed as the subroutine 1300-6 within the method 1100A, and thus at step 1334 the method 1300A may be exited and the method 1100A may then continue at decision step 1121, described above. In some embodiments, the method 1300A may be performed as the subroutine 1300-7 within the method 1100A, and thus at step 1334 the method 1300A may be exited and the method 1100A may then continue at decision step 1112, described above.

Figure 7B:
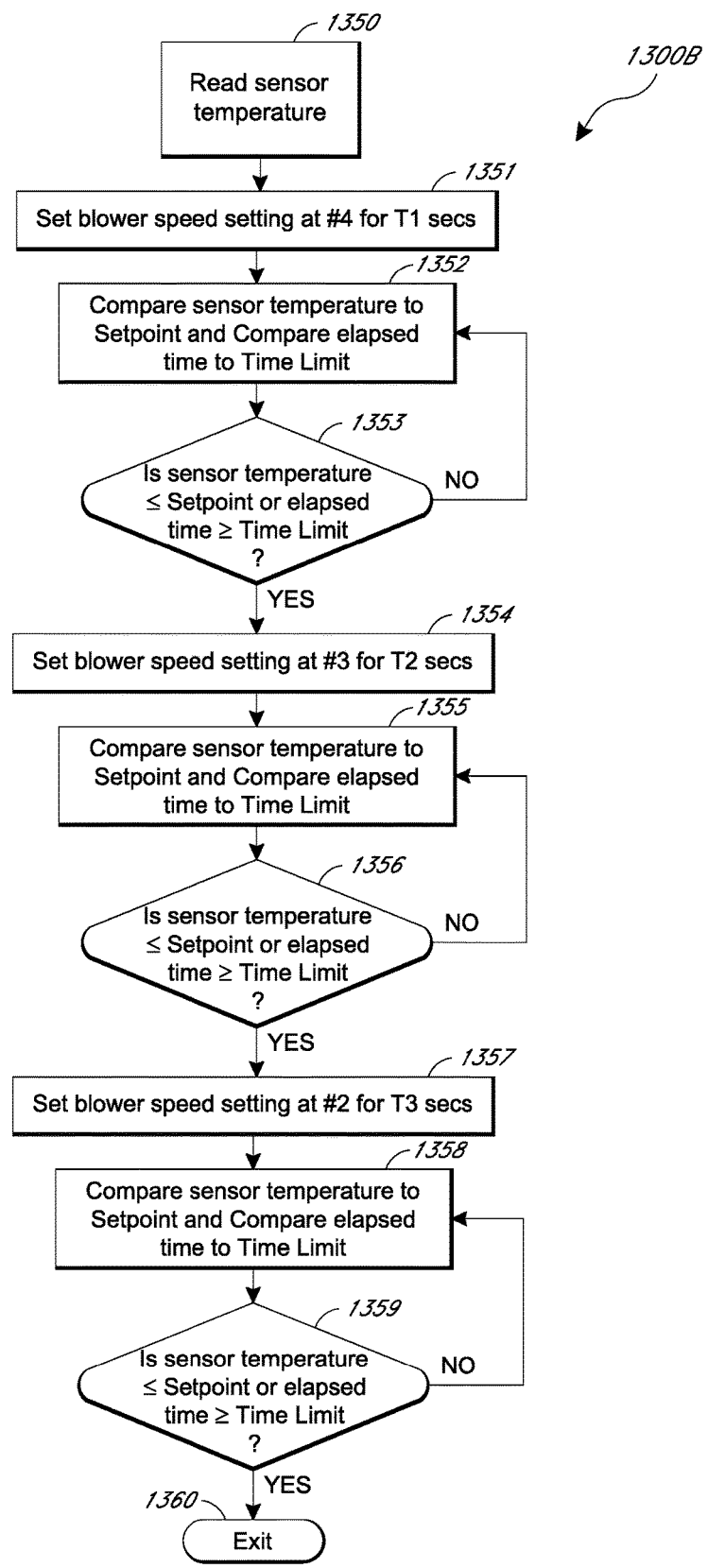
FIG. 7B is a schematic of another embodiment of a control method for setting blower speeds that may be used with the control method of FIG. 4.

FIG. 7B is a schematic of an embodiment of a control method 1300B for setting blower speeds that may be used with the various control systems and methods described herein, for example the method 1000 shown in FIG. 4. In some embodiments, the method 1300B of FIG. 7B is performed as a subroutine within other methods described herein. In some embodiments, the method 1300B of FIG. 7B is performed as the subroutine 1300-1, 1300-2 and/or 1300-3 within the method 1000 of FIG. 4. In some embodiments, the method 1300B of FIG. 713 is performed as the subroutine 1300-4, 1300-6, 1300-6 and/or 1300-7 within the method 1100A of FIG. 5A.

As shown in FIG. 7B, the method 1300B begins with step 1350 wherein data or information relating to temperature of a seat or seat portion is received from or otherwise provided by a sensor. Step 1350 may have the same or similar features as step 1310 of the method 1300A described herein. After step 1350, the method 130013 then moves to step 1351.

At step 1351, the blower, such as a fan, for the corresponding seat or seat portion is set to a relatively high speed setting for a given amount of time, such as T1 seconds. The blower may service any of the seats or seat portions described herein. In some embodiments, the blower may have a lowest speed setting #1, a slightly higher speed setting #2, an even higher speed setting #3, and a highest speed setting #4, Thus, in some embodiments of step 1351, the blower may be set to speed setting #4. This is merely one example, and other gradations of speed settings may be implemented. For instance, there may be speed settings from the lowest #1 to the highest #10, wherein in step 1351 the blower is set to speed setting #9 or #10, for example. The time T1 may be any amount of time as needed to cool the seat or seat portion. The time T1 may be a few seconds, a minute, a couple minutes, a few minutes, five minutes, ten minutes, or any smaller, in between or larger periods of time. After step 1351, the method 1300A then moves to step 1352.

At step 1352, the sensor temperature is compared to a setpoint temperature and the accrued or elapsed time is compared to a time limit. Step 1352 may have the same or similar features as step 1155 of the method 1100B, as described herein, for example, with respect to FIG. 5B. After step 1352, the method 1300B next moves to decision step 1353.

At decision step 1353, it is determined whether the sensor temperature satisfies a temperature setpoint threshold and whether the elapsed or accrued time satisfies a time limit threshold. Decision step 1353 may have the same or similar features as decision step 1156 of the method 1100B, as described herein, for example, with respect to FIG. 5B. If it is determined in decision step 1353 that the sensor temperature does not satisfy the temperature setpoint threshold and that the accrued time does not satisfy the time limit threshold, then the method moves back to step 1352, and proceeds as described above. If it is determined in decision step 1353 that the sensor temperature satisfies the temperature setpoint threshold or that the accrued time satisfies the time limit threshold, then the method moves to step 1354. Therefore, satisfaction of either criterion will suffice to move the method 1300B along to step 1354. In some embodiments, only the timing criterion is analyzed. The method 1300B may be described in terms of stages. For example, the steps 1351-1353 may be considered a "first stage" of the method 1300B.

At step 1354, the blower, such as a fan, for the corresponding seat or seat portion is set to a lower speed setting (as compared to step 1352) for a given time T2. The speed setting in step 1354 may be lower than the speed setting applied in step 1351. In some embodiments, the speed is set to setting #3, a lower speed setting than #4, as described above. The time T2 may be the same or different as the time T1. After step 1354, the method 1300B next moves to step 1355.

At step 1355, the sensor temperature is compared to a setpoint temperature and the accrued or elapsed time is compared to a time limit. Step 1355 may have the same or similar features as step 1352. After step 1355, the method 1300B next moves to decision step 1356.

At decision step 1356, it is determined whether the sensor temperature satisfies a temperature setpoint threshold and whether the elapsed or accrued time satisfies a time limit threshold. Decision step 1356 may have the same or similar features as decision step 1353. If it is determined in decision step 1356 that the sensor temperature does not satisfy the temperature setpoint threshold and that the accrued time does not satisfy the time limit threshold, then the method moves back to step 1355, and proceeds as described above. If it is determined in decision step 1356 that the sensor temperature satisfies the temperature setpoint threshold or that the accrued time satisfies the time limit threshold, then the method moves to step 1357. Therefore, satisfaction of either criterion will suffice to move the method 1300B along to step 1357. In some embodiments, only the timing criterion is analyzed. The method 1300B may be described in terms of stages. For example, the steps 1354-1356 may be considered a "second stage" of the method 1300B.

At step 1357, the blower, such as a fan, for the corresponding seat or seat portion is set to a lower speed setting (as compared to step 1354) for a given time T3. The speed setting in step 1357 may be lower than the speed setting applied in step 1354. In some embodiments, the speed is set to setting #2, a lower speed setting than #3 and #4, as described above. The time T3 may be the same or different as the times T1 and T2. After step 1357, the method 1300B next moves to step 1358.

At step 1358, the sensor temperature is compared to a setpoint temperature and the accrued or elapsed time is compared to a time limit. Step 1358 may have the same or similar features as step 1352. After step 1358, the method 1300B next moves to decision step 1359.

At decision step 1359, it is determined whether the sensor temperature satisfies a temperature setpoint threshold and whether the elapsed or accrued time satisfies a time limit threshold. Decision step 1359 may have the same or similar features as decision step 1353. If it is determined in decision step 1359 that the sensor temperature does not satisfy the temperature setpoint threshold and that the accrued time does not satisfy the time limit threshold, then the method moves back to step 1358, and proceeds as described above. If it is determined in decision step 1359 that the sensor temperature satisfies the temperature setpoint threshold or that the accrued time satisfies the time limit threshold, then the method moves to step 1360. Therefore, satisfaction of either criterion will suffice to move the method 1300B along to step 1360. In some embodiments, only the timing criterion is analyzed. The method 1300B may be described in terms of stages. For example, the steps 1357-1359 may be considered a "third stage" of the method 1300B. The method 1300 may have only a single stage or more than three stages.

At step 1360, the method 1300B ends and is exited. Step 1360 may be the same or similar as step 1334 of the method 1100A as described, for example, with respect to FIG. 7A. Thus, at step 1360, the method 1300B may be exited and another method disclosed herein may then continue.

Figure 8:
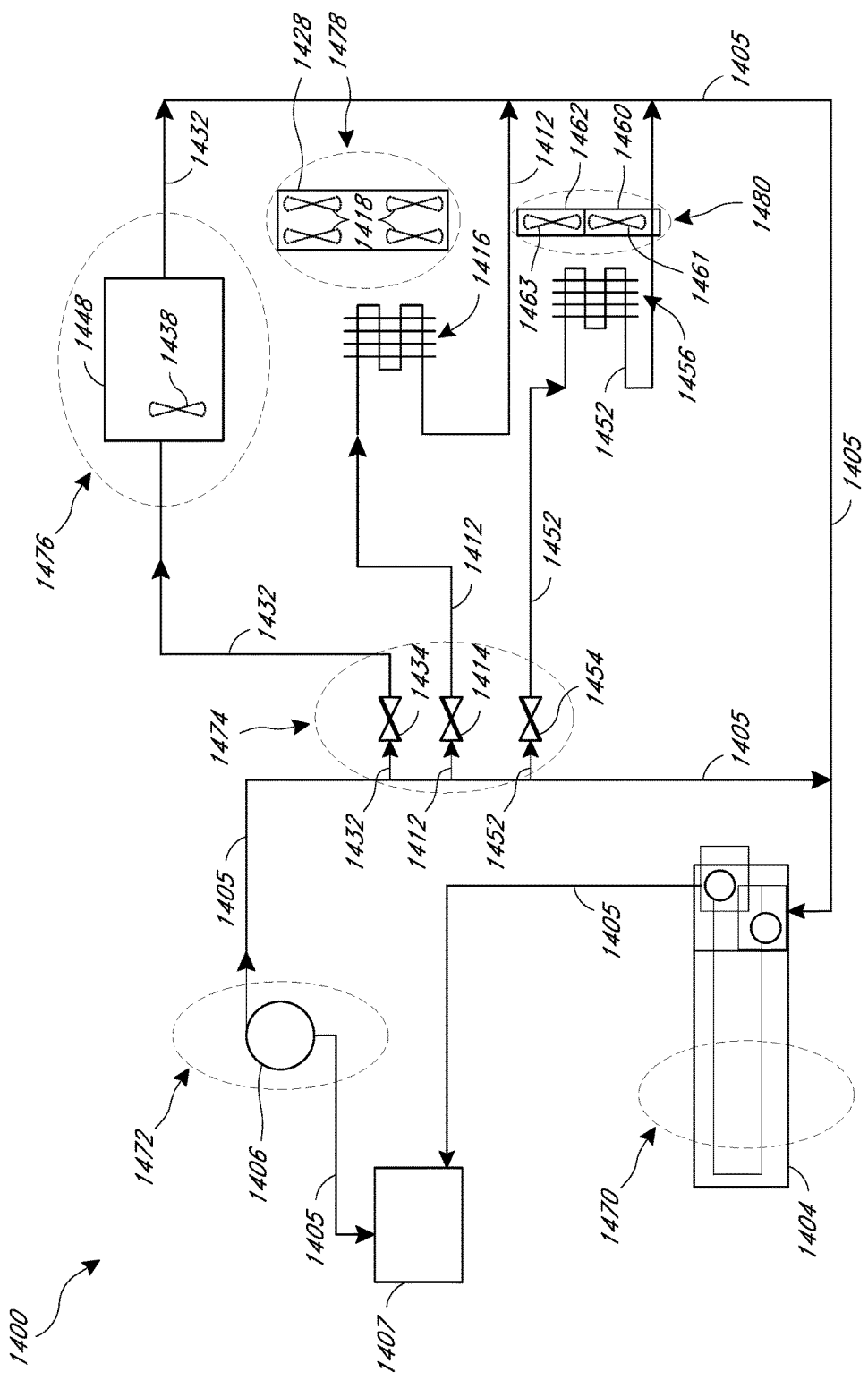
FIG. 8 is a schematic of an embodiment of a thermal conditioning system that may be controlled using the control systems and methods of FIGS. 2-7B.

FIG. 8 is a schematic of another embodiment of a thermal conditioning system 1400 for thermally servicing multiple components. The thermal conditioning system 1400 may be controlled using the control systems and methods of FIGS. 2-7. The system 1400 may have the same or similar features as the system 600 described herein, unless otherwise stated.

The system 1400 may have components that are analogous, i.e have the same or similar feature as, components of the system 600. As shown, the system 1400 may have a thermal energy source 1404, which may be analogous to the thermal energy source 604. In some embodiments, the thermal energy source 1404 may be a chilling unit that cools thermal media inside the main line or circuit 1405, which maybe analogous to the line 605.

The system 1400 may have a coolant tank 1407, which may store coolant, such as a glycol. The tank 1407 may also be implemented with the system 600 in FIG. 1A, for example in between the thermal energy source 604 and the pump 606 along the line 605. In FIG. 8, the line 1405 may be connected to the tank 1407 on one end and on another end connect the tank 1407 to a pump 1472. The pump 1472 may be analogous to the pump 606. The line 1405 may then continue to branches 1432, 1412 and 1452, which may be analogous, respectively, to branches 632, 612 and 652.

The branches 1432, 1412 and 1452 may contain valves 1434, 1414 and 1454, respectively, which may be analogously, respectively, to valves 634, 614 and 654. The branch 1432 may connect to a first auxiliary component or first thermal node 1448, which may be analogous to the second thermal node 648. The first thermal node 1448 may thermally condition a bin or other storage container. As shown, the first thermal node 1448 may contain a fan 1438 for providing thermal conditioning. The fan 1438 may be analogous to the fan 638 or 834. Further, any discussion herein of use of the fan 638 or 834, such use in the various control techniques described herein, applies equally to the fan 1438. The branch 1432 then continues and connects back with the main line 1405, which then connects back to the thermal energy source 1404.

The branch 1412 may connect to a heat transfer device 1416 that services a passenger component or second thermal node 1428, which components may be analogous, respectively, to the heat transfer device 616 and the first thermal node 628. The second thermal node 1428 may thermally condition one or more seats or portions thereof. In some embodiments, the second thermal node 1428 may include one or more fans 1418. As shown, there may be four fans 1418. In some embodiments, each portion of a seat may use one of the fans 1418. For example, there may be two seats, each having two portions, such as a bottom or cushion portion and a seatback portion. A single fan 1418 may be used for each of the four portions in that example. In some embodiments, there may be more or fewer than four fans 1418 and distributed in a variety of configurations among the seats or portions thereof. The fans 1418 may be analogous to the fan 618 or 824. Further, any discussion herein of use of the fan 618 or 824, such use in the various control techniques described herein, applies equally to the fan 1418. The branch 1412 then continues and connects back with the main line 1405, which then connects back to the thermal energy source 1404.

The branch 1452 may connect to a heat transfer device 1456 that services a third and fourth thermal node 1460 and 1462, which may be second and third auxiliary components respectively. The heat transfer device 1456 may be analogous to the heat transfer device 656. The third and fourth thermal nodes 1460 and 1462 may each be analogous to the first thermal node 628. In some embodiments, the third and fourth thermal nodes 1460 and 1462 may be, respectively, first and second cup holders. As shown, the third thermal node 1460 may include one or more fans 1461, and the fourth thermal node 1462 may include one or more fans 1463. Thus, one difference between the system 1400 and the system 600 is that the system 1400 may use convection to provide thermal conditioning to cup holder components. Further, any discussion herein of use of a fan with the third region 603 or the fourth region 840 may employ the arrangement as shown in the system 1400. In particular, any discussion herein of use of the various control techniques to thermally condition one or more cup holder components using one or more blowers, such as a fan, may employ the third thermal node 1460 as the first cup holder and the fourth thermal node 1462 as the second cup holder, along with corresponding fans 1461 and 1463. The branch 1452 then continues and connects back with the main line 1405, which then connects back to the thermal energy source 1404.

Further illustrated in FIG. 8 are various control points 1470, 1472, 1474, 1476, 1478 and 1480. The control points indicate components of the system 1400 that may be controlled using any of the control techniques and methods described herein. In some embodiments, the control point 1470 may be controlled for instance to control a thermal energy source. For example, a compressor speed may be adjusted. Other components of the thermal energy source may be controlled. Therefore, any discussion herein of control of the thermal energy source or components thereof may be performed by applying the various control methods herein to the control point 1470.

In some embodiments, the control point 1472 may be controlled for instance to control a pump. For example, a pump speed may be adjusted. Therefore, any discussion herein of control of a pump may be performed by applying the various control methods herein to the control point 1472.

In some embodiments, the control point 1474 may be controlled for instance to control one or more valves. For example, a valve may be opened or closed. Therefore, any discussion herein of control of a valve may be performed by applying the various control methods herein to the control point 1474, In some embodiments, the control point 1476 may be controlled for instance to control thermal conditioning of a first thermal node or components thereof. For example, one or more blower speeds may be adjusted for controlling thermal conditioning of a bin. Other components of the first thermal node may be controlled. Therefore, any discussion herein of control of a first thermal node or components thereof may be performed by applying the various control methods herein to the control point 1476.

In some embodiments, the control point 1478 may be controlled for instance to control thermal conditioning of a second thermal node or components thereof. For example, one or more blower speeds may he adjusted for controlling thermal conditioning of a seat. Other components of the second thermal node may be controlled. Therefore, any discussion herein of control of a second thermal node or components thereof may be performed by applying the various control methods herein to the control point 1478.

In some embodiments, the control point 1480 may be controlled for instance to control thermal conditioning of a third and/or fourth thermal node or components thereof. For example, one or more blower speeds may be adjusted for controlling thermal conditioning of one or more cup holders. Other components of the third and/or fourth thermal nodes may be controlled. Therefore, any discussion herein of control of a third and/or fourth thermal node or components thereof may be performed by applying the various control methods herein to the control point 1480.

Example Embodiments

The following is a list of some example embodiments of the control methods, systems and techniques described herein.

An embodiment is a method of controlling a vehicle thermal conditioning system, where the system is configured to thermally condition at least a first component and a second component, and the method comprises determining whether the first component is enabled for thermal conditioning; determining whether the second component is enabled for thermal conditioning; thermally conditioning the first component if it is determined that the first component is enabled for thermal conditioning; and thermally conditioning the second component if it is determined that the second component is enabled for thermal conditioning.

Another embodiment is a method of controlling a vehicle thermal conditioning system, where the system is configured to thermally condition at least a first main component, a second main component, and an auxiliary component, and the method comprises determining whether the first main component is enabled for thermal conditioning; determining whether the second main component is enabled for thermal conditioning; determining whether the auxiliary component is enabled for thermal conditioning; thermally conditioning the first main component if it is determined that the first main component is enabled for thermal conditioning; thermally conditioning the second main component if it is determined that the second main component is enabled for thermal conditioning; and thermally conditioning the auxiliary component if it is determined that the auxiliary component is enabled for thermal conditioning.

Another embodiment is a method of controlling a vehicle thermal conditioning system, where the system is configured to thermally condition at least a first component and a second component and comprises a thermal energy source that includes a miniature vapor compressor, and the method comprises determining whether the first component is enabled for thermal conditioning; determining whether the second component is enabled for thermal conditioning; prioritizing thermal conditioning of the first or second component based at least in part on whether either, neither or both of the first and second components are enabled for thermal conditioning; and varying the speed of the compressor based at least in part on whether the first or second component was prioritized for thermal conditioning.

Another embodiment is a method of controlling a vehicle thermal conditioning system, where the system is configured to thermally condition at least a first component and a second component using first and second blowers and comprising a thermal energy source that includes a miniature vapor compressor, and the method comprises determining whether the first component is enabled for thermal conditioning; determining whether the second component is enabled for thermal conditioning; prioritizing thermal conditioning of the first or second component based at least in part on whether either, neither or both of the first and second components are enabled for thermal conditioning; setting a speed of the first blower based at least in part on whether the first or second component was prioritized for thermal conditioning; setting a speed of the second blower based at least in part on whether the first or second component was prioritized for thermal conditioning; and varying the speed of the compressor based at least in part on whether the first or second component was prioritized for thermal conditioning.

Another embodiment is a method of controlling a vehicle thermal conditioning system, where the system is configured to thermally condition a first seat, a second seat, a first cup holder, a second cup holder and an enclosure and comprises a thermal energy source that includes a miniature vapor compressor, and the method comprises determining whether the first seat is enabled for thermal conditioning; determining whether the second seat is enabled for thermal conditioning; setting a first seat blower speed based at leak in part on whether the first seat was enabled for thermal conditioning; setting a second seat blower speed based at least in part on whether the second seat was enabled for thermal conditioning; determining whether the first cup holder is enabled for thermal conditioning; determining whether the second cup holder is enabled for thermal conditioning; determining whether the enclosure is enabled for thermal conditioning; and varying the speed of the compressor based at least in part on whether the first cup holder, the second cup holder or the enclosure are enabled for thermal conditioning.

Another embodiment is a method of controlling a vehicle thermal conditioning system, where the system is configured to thermally condition at least a first component and a second component, and the method comprises determining whether the first component is enabled for thermal conditioning; determining whether the second component is enabled for thermal conditioning; thermally conditioning the first component if it is determined that the first component is enabled for thermal conditioning, wherein thermally conditioning the first component comprises thermally conditioning the first component until at least (i) a first temperature of the first component satisfies a first temperature threshold or (ii) a first accrued amount of time while thermally conditioning the first component satisfies a first time threshold; and thermally conditioning the second component if it is determined that the second component is enabled for thermal conditioning, wherein thermally conditioning the second component comprises thermally conditioning the second component until at least (i) a second temperature of the second component satisfies a second temperature threshold or (ii) a second accrued amount of time while thermally conditioning the second component satisfies a second time threshold. In some embodiments, the first temperature of the first component satisfies the first temperature threshold based at least in part on the first temperature being less than or equal to a first thermal setpoint. In some embodiments, the first accrued amount of time while thermally conditioning the first component satisfies the first time threshold based at least in part on the first amount of time spent thermally conditioning the first component being greater than or equal to a first set time limit. In some embodiments, the second temperature of the second component satisfies the second temperature threshold based at least in part on the second temperature being less than or equal to a second thermal setpoint. In some embodiments, the second accrued amount of time while thermally conditioning the second component satisfies the second time threshold based at least in part on the second amount of time spent thermally conditioning the second component being greater than or equal to a second set time limit.

Another embodiment is a vehicle thermal conditioning system in communicating connection with a control system configured to control the thermal conditioning system. The thermal conditioning system comprises a thermal energy source comprising a vapor compressor; first and second components to be thermally conditioned; a first conduit comprising a first thermal fluid in thermal communication with the thermal energy source, a pump that controls the flow of the first thermal fluid through the first conduit; first and second heat transfer devices in thermal communication with the first thermal fluid of the first conduit and in thermal communication with, respectively, the first and second component; first and second valves that control the flow of the first thermal fluid through the first conduit between, respectively, the first and second heat transfer devices and the thermal energy source; and a first blower that controls the flow of a second thermal fluid through a second conduit between the first heat transfer device and the first component. The control system is in communicating connection with the thermal energy source, the first and second valves, the pump, and the first blower, and is configured to thermally condition the first component in response to determining that the first component is enabled for thermal conditioning; and thermally condition the second component in response to determining that the second component is enabled for thermal conditioning. Thermally conditioning the first component comprises adjusting the second valve to reduce flow of the first thermal fluid to the second component; adjusting the first valve to increase flow of the first thermal fluid to the first component; setting the vapor compressor to a first maximum speed; setting the pump to a second maximum speed; comparing a first detected temperature of the first component with a first temperature threshold; comparing a first accrued runtime for thermal conditioning of the first component with a first runtime threshold; setting a speed of the first blower in response to comparing the first detected temperature of the first component with the first temperature threshold; and further adjusting the first valve in response to comparing the first detected temperature of the first component with the first temperature threshold or in response to comparing the first accrued runtime for thermal conditioning of the first component with the first runtime threshold. Thermally conditioning the second component comprises setting the vapor compressor speed to a first operating speed for a first time period; comparing a second detected temperature of the second component with a second temperature threshold; and reducing the vapor compressor speed in response to comparing the second detected temperature of the second component with the second temperature threshold.

In some embodiments, thermally conditioning the second component further comprises comparing a second accrued runtime for thermal conditioning of the second component with a second runtime threshold; and reducing the vapor compressor speed in response to comparing the second detected temperature of the second component with the second temperature threshold or in response to comparing the second accrued runtime for thermal conditioning of the second component with the second runtime threshold.

In some embodiments, setting the speed of the first blower comprises setting the speed of the first blower to a first speed in response to determining that the first detected temperature of the first component satisfies the first temperature threshold; and setting the speed of the first blower to a second speed in response to determining that the first detected temperature of the first component does not satisfy the first temperature threshold, wherein the first speed is less than the second speed. In some embodiments, the first temperature threshold comprises a selected temperature setpoint for the first component. In some embodiments, the first temperature threshold comprises a temperature of a region of the vehicle comprising the first component.

In some embodiments, setting the speed of the first blower comprises setting the speed of the first blower in response to comparing the first detected temperature of the first component with the first temperature threshold or in response to comparing the first accrued runtime for thermal conditioning of the first component with the first runtime threshold. In some embodiments, setting the speed of the first blower comprises setting the speed of the first blower in response to determining that the first detected temperature of the first component satisfies the first temperature threshold or in response to determining that the first accrued runtime for thermal conditioning of the first component satisfies the first runtime threshold. In some embodiments, the first detected temperature of the first component satisfies the first temperature threshold when the first detected temperature of the first component is lower than or equal to the first temperature threshold, and wherein the first accrued runtime for thermal conditioning of the first component satisfies the first runtime threshold when the first accrued runtime for thermal conditioning of the first component is greater than or equal to the first runtime threshold.

In some embodiments, adjusting the first valve comprises closing the first valve to decrease the flow of the first thermal fluid to the first component in response to determining ij that the first detected temperature of the first component satisfies the first temperature threshold or ii) that the first accrued runtime for thermal conditioning of the first component satisfies the first runtime threshold.

In some embodiments, reducing the vapor compressor speed comprises reducing the vapor compressor speed in response to determining ij that the second detected temperature of the second component satisfies the second temperature threshold or ii) that the second accrued runtime for thermal conditioning of the second component satisfies the second runtime threshold. In some embodiments, reducing the vapor compressor speed comprises setting the vapor compressor speed to zero.

In some embodiments, the first component is a first seat and the second component is a cup holder. In some embodiments, the first component is a first seat and the second component is an enclosure.

The vehicle thermal conditioning system of claim 1, wherein the control system is configured to thermally condition the first component and then thermally condition the second component in response to determining that the first and second components are enabled for thermal conditioning.

In some embodiments, the vehicle thermal conditioning system further comprises a third component to be thermally conditioned; a third heat transfer device in thermal communication with the first thermal fluid of the first conduit and with the third component; a third valve that controls the flow of the first thermal fluid through the first conduit between the third heat transfer device and the thermal energy source; and a third blower that controls thermal communication between the third heat transfer device and the third component, The control system is in communicating connection with the third valve and the third blower, and the control system is further configured to thermally condition the third component in response to determining that the third component is enabled for thermal conditioning. Thermally conditioning the third component comprises adjusting the second valve to reduce the flow of the first thermal fluid to the second component; adjusting the third valve to increase the flow of the first thermal fluid to the third component; setting the vapor compressor to a first maximum speed; setting the pump to a second maximum speed; comparing a third detected temperature of the third component with a third temperature threshold; comparing a third accrued runtime for thermal conditioning of the third component with a third runtime threshold; setting a speed of the third blower in response to comparing the third detected temperature of the third component with the third temperature threshold; and further adjusting the third valve in response to comparing the third detected temperature of the third component with the third temperature threshold or in response to comparing the third accrued runtime for thermal conditioning of the third component with the third runtime threshold. In some embodiments, the first component is a first seat, the second component is a cup holder, and the third component is a second seat. In some embodiments, the first component is a first seat, the second component is an enclosure, and the third component is a second seat. In some embodiments, the control system is configured to thermally condition the first component and then thermally condition the third component and then thermally condition the second component in response to determining that the first, second and third components are enabled for thermal conditioning.

In some embodiments, the vehicle thermal conditioning system further comprises a fourth component to be thermally conditioned; a fourth heat transfer device in thermal communication with the first thermal fluid of the first conduit and with the third component; and a fourth valve that controls the flow of the first thermal fluid through the first conduit between the fourth heat transfer device and the thermal energy source. The control system is in communicating connection with the fourth valve and is configured to thermally condition the fourth component in response to determining that the fourth component is enabled for thermal conditioning. Thermally conditioning the fourth component comprises setting the vapor compressor speed to a second operating speed for a second time period; comparing a fourth detected temperature of the fourth component with a fourth temperature threshold; and reducing the vapor compressor speed in response to comparing the fourth detected temperature of the fourth component with the fourth temperature threshold. In some embodiments, the first component is a first seat, the second component is a first cup holder, the third component is a second seat, and the fourth component is a second cup holder. In some embodiments, the control system is configured to thermally condition the first component and then thermally condition the third component and then thermally condition the second component and then thermally condition the fourth component in response to determining that the first, second, third and fourth components are enabled for thermal conditioning.

Another embodiment is a method of controlling a vehicle thermal conditioning system comprising first and second components to be thermally conditioned, a vapor compressor, a first conduit, a pump, first and second heat transfer devices, first and second valves, and a first blower, where the method comprises thermally conditioning the first component in response to determining that the first component is enabled for thermal conditioning and thermally conditioning the second component in response to determining that the second component is enabled for thermal conditioning, Thermally conditioning the first component comprises adjusting the second valve to reduce flow of a first thermal fluid to the second component; adjusting the first valve to increase flow of the first thermal fluid to the first component; setting the vapor compressor to a first maximum speed; setting the pump to a second maximum speed; comparing a first detected temperature of the first component with a first temperature threshold; comparing a first accrued runtime for thermal conditioning of the first component with a first runtime threshold; setting a speed of the first blower in response to comparing the first detected temperature of the first component with the first temperature threshold; and further adjusting the first valve in response to comparing the first detected temperature of the first component with the first temperature threshold or in response to comparing the first accrued runtime for thermal conditioning of the first component with the first runtime threshold. Thermally conditioning the second component comprises setting the vapor compressor speed to a first operating speed for a first time period; comparing a second detected temperature of the second component with a second temperature threshold; and reducing the vapor compressor speed in response to comparing the second detected temperature of the second component with the second temperature threshold.

In some embodiments, thermally conditioning the second component further comprises comparing a second accrued runtime for thermal conditioning of the second component with a second runtime threshold; and reducing the vapor compressor speed in response to comparing the second detected temperature of the second component with the second temperature threshold or in response to comparing the second accrued runtime for thermal conditioning of the second component with the second runtime threshold. In some embodiments, setting the speed of the first blower comprises setting the speed of the first blower to a first speed in response to determining that the first detected temperature of the first component satisfies the first temperature threshold; and setting the speed of the first blower to a second speed in response to determining that the first detected temperature of the first component does not satisfy the first temperature threshold, wherein the first speed is less than the second speed.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone. A and B together. A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone. A and B together. A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A method of controlling a vehicle thermal conditioning system, the system comprising a thermal energy source in thermal communication with a main line for circulating thermal medium, the system configured to thermally service at least one passenger component and at least one auxiliary component via respective branches fluidly coupled with the main circulation line, the method comprising:
    obtaining at least one thermal conditioning criterion;
    determining at least one priority thermal component and at least one non-priority thermal component for thermal conditioning based on the at least one thermal conditioning criterion, the at least one priority thermal component comprising the at least one passenger or auxiliary component, and the at least one non-priority thermal component comprising the other of the at least one passenger or auxiliary component;
    thermally conditioning the at least one priority thermal component using a first control routine, the first control routine based on determining the at least one passenger or auxiliary component as the at least one priority thermal component; and
    thermally conditioning the at least one non-priority thermal component using a second control routine, the second control routine different from the first control routine and based on determining the at least one passenger or auxiliary component as the at least one non-priority thermal component,
    wherein thermally conditioning the at least one priority thermal component comprises:
        determining the at least one priority thermal component is the at least one passenger component; and
        setting a blower speed for one or more stages, each of the one or more stages comprising operating the blower at a stage-dependent blower speed and for a stage-dependent period of time, wherein the blower speed and period of time are based on analyses of thermal and accrued time thresholds.

2. The method of claim 1, wherein thermally conditioning the at least one priority thermal component further comprises:
    in a first stage:
        setting the blower speed at a first speed setting for a first time period;
        comparing a first detected temperature of the at least one passenger component with a first temperature threshold;
        comparing a first accrued runtime for thermal conditioning of the at least one passenger component with a first runtime threshold; and
        entering a second stage based on determining i) that the first detected temperature satisfies the first temperature threshold or ii) that the first accrued runtime for thermal conditioning of the at least one passenger component satisfies the first runtime threshold, and in the second stage:
setting the blower speed at a second speed setting for a second time period, wherein the second speed setting is less than the first speed setting;
comparing a second detected temperature of the at least one passenger component with a second temperature threshold;
comparing a second accrued runtime for thermal conditioning of the at least one passenger component with a second runtime threshold; and
exiting the second stage based on determining i) that the second detected temperature satisfies the second temperature threshold or ii) that the second accrued runtime for thermal conditioning of the at least one passenger component satisfies the second runtime threshold.

3. The method of claim 1, wherein thermally conditioning the at least one priority thermal component further comprises:
analyzing a thermal setpoint threshold for the at least one passenger component and an accrued runtime threshold; and
thermally conditioning the at least one passenger component based on analyzing the thermal setpoint threshold and the accrued runtime threshold.

4. The method of claim 3, wherein thermally conditioning the at least one passenger component further comprises:
increasing a rate of transfer of thermal energy to the at least one passenger component;
determining that a detected temperature of the at least one passenger component satisfies the thermal setpoint threshold;
reducing the rate of transfer of thermal energy to the at least one passenger component in response to determining that the detected temperature of the at least one passenger component satisfies the thermal setpoint threshold; and
thermally conditioning the at least one auxiliary component in response to determining that the detected temperature of the at least one passenger component satisfies the thermal setpoint threshold.

5. The method of claim 3, wherein thermally conditioning the at least one passenger component further comprises:
increasing a rate of transfer of thermal energy to the at least one passenger component;
determining that a detected temperature of the at least one passenger component does not satisfy the thermal setpoint threshold;
determining that an accrued runtime satisfies the accrued runtime threshold; and
thermally conditioning the at least one auxiliary component in response to determining that the accrued runtime satisfies the accrued runtime threshold.

6. The method of claim 3, wherein thermally conditioning the at least one passenger component further comprises adjusting a rate of transfer of thermal energy to the at least one passenger component based on analysis of i) a temperature threshold for the at least one passenger component and ii) an accrued runtime.

7. The method of claim 6, further comprising:
increasing the rate of transfer of thermal energy to the at least one passenger component;
determining that i) a detected temperature associated with the at least one passenger component satisfies the temperature threshold or that ii) the accrued runtime satisfies an accrued runtime threshold; and
decreasing the rate of transfer of thermal energy to the at least one passenger component in response to determining that i) the detected temperature associated with the at least one passenger component satisfies the temperature threshold or that ii) the accrued runtime satisfies the accrued runtime threshold.

8. The method of claim 6, wherein adjusting the rate of transfer of thermal energy to the at least one passenger component comprises increasing the flow of thermal medium to a heat transfer device associated with the at least one passenger component.

9. The method of claim 6, further comprising adjusting a rate of transfer of thermal energy to the at least one auxiliary component.

10. The method of claim 9, wherein adjusting a rate of transfer of thermal energy to the at least one auxiliary component comprises decreasing the rate of transfer of thermal energy to the at least one auxiliary component.

11. The method of claim 10, wherein decreasing the rate of transfer of thermal energy to the at least one auxiliary component comprises decreasing the flow of thermal medium to a heat transfer device associated with the at least one auxiliary component.

12. The method of claim 1, further comprising:
determining the at least one priority thermal component is the at least one auxiliary component, wherein the at least one auxiliary component includes a single thermal component to be thermally conditioned;
determining, for a period of time lasting at least until a thermal threshold for the at least one auxiliary component has been satisfied, one or more differences between a current temperature of the at least one auxiliary component and a thermal set point for the at least one auxiliary component;
thermally conditioning the at least one auxiliary component by operating the compressor at a plurality of speeds over at least the period of time, each speed of the plurality of speeds based at least in part on one of the determined differences; and
thermally conditioning the at least one passenger component in response to determining that the thermal threshold for the at least one auxiliary component has been satisfied.

13. The method of claim 12, wherein the at least one auxiliary component is a bin or a cup holder.

14. The method of claim 1, the method further comprising:
determining the at least one priority thermal component includes first and second auxiliary components, wherein the first auxiliary component is a convective thermal component and the second auxiliary component is a conductive thermal component;
thermally conditioning the convective component by setting thermal parameters of the thermal conditioning system based on determining that the convective component is set to either a freeze or a refrigerate control mode;
thermally conditioning the conductive component after setting the thermal parameters for the convective component; and
thermally conditioning the at least one passenger component after thermally conditioning the convective and conductive auxiliary components.

15. The method of claim 14, further comprising thermally conditioning the at least one passenger component in response to determining that thermal thresholds for the first and second auxiliary components have been satisfied.

16. The method of claim 14, further comprising thermally conditioning the at least one passenger component in response to determining i) that thermal thresholds for the first and second auxiliary components have been satisfied or ii) that an accrued runtime for thermally conditioning the first and second auxiliary components satisfies an accrued runtime threshold.

17. The method of claim 14, wherein the convective thermal component is a bin and the conductive thermal component is at least one cup holder.

18. A vehicle thermal conditioning system comprising:
- at least one passenger component to be thermally conditioned by the system;
- at least one auxiliary component to be thermally conditioned by the system;
- a thermal energy source in thermal communication with the at least one passenger and auxiliary components, the thermal energy source configured to provide thermal energy for thermally conditioning the at least one passenger and auxiliary components; and
- a controller in communication with the thermal energy source, the controller configured to:
  - receive at least one thermal conditioning criterion;
  - determine at least one priority thermal component and at least one non-priority thermal component for thermal conditioning based on the at least one thermal conditioning criterion, the at least one priority thermal component comprising the at least one passenger or auxiliary component, and the at least one non-priority thermal component comprising the other of the at least one passenger or auxiliary component;
  - thermally condition the at least one priority thermal component using a first control routine, the first control routine based on determining the at least one passenger or auxiliary component as the at least one priority thermal component; and
  - thermally condition the at least one non-priority thermal component using a second control routine, the second control routine different from the first control routine and based on determining the at least one passenger or auxiliary component as the at least one non-priority thermal component,
- wherein the controller is further configured to:
  - determine the at least one priority thermal component is the at least one passenger component; and
  - set a blower speed for one or more stages, each of the one or more stages comprising operating the blower at a stage-dependent blower speed and for a stage-dependent period of time, wherein the blower speed and period of time are based on analyses of thermal and accrued time thresholds.

19. The system of claim 18, the controller further configured to:
- determine the at least one priority thermal component is the at least one auxiliary component, wherein the at least one auxiliary component includes a single thermal component to be thermally conditioned;
- determine, for a period of time lasting at least until a thermal threshold for the at least one auxiliary component has been satisfied, one or more differences between a current temperature of the at least one auxiliary component and a thermal set point for the at least one auxiliary component;
- thermally condition the at least one auxiliary component by operating the compressor at a plurality of speeds over at least the period of time, each of the plurality of speeds based at least in part on one of the determined differences; and
- thermally condition the at least one passenger component in response to determining that the thermal threshold for the at least one auxiliary component has been satisfied.

20. The system of claim 18, the controller further configured to:
- determine the at least one priority thermal component includes first and second auxiliary components, wherein the first auxiliary component is a convective thermal component and the second auxiliary component is a conductive thermal component;
- thermally condition the convective component by setting thermal parameters of the thermal conditioning system based on determining that the convective component is set to either a freeze or a refrigerate control mode;
- thermally condition the conductive component after setting the thermal parameters for the convective component; and
- thermally condition the at least one passenger component after thermally conditioning the convective and conductive auxiliary components.

* * * * *